US012800406B2

(12) United States Patent
Karp

(10) Patent No.: US 12,800,406 B2
(45) Date of Patent: Nov. 17, 2026

(54) ENHANCED TECHNIQUES FOR CARGO COMPARTMENT FIRE DETECTION

(71) Applicant: The United States of America, as represented by the Administrator of the Federal Aviation Administration, Atlantic City Airport, NJ (US)

(72) Inventor: Matthew Eugene Karp, Ventnor City, NJ (US)

(73) Assignee: The United States of America, as represented by the Administrator of the Federal Aviation Administration, Washington, DC (US)

( * ) Notice: Subject to any disclaimer, the term of this patent is extended or adjusted under 35 U.S.C. 154(b) by 265 days.

(21) Appl. No.: 18/925,165

(22) Filed: Oct. 24, 2024

(65) Prior Publication Data

US 2025/0224279 A1 Jul. 10, 2025

Related U.S. Application Data

(60) Provisional application No. 63/618,955, filed on Jan. 9, 2024.

(51) Int. Cl.

*G01K 3/10* (2006.01)
*G01K 1/02* (2021.01)
*G01K 1/024* (2021.01)

(52) U.S. Cl.

CPC ............... *G01K 3/10* (2013.01); *G01K 1/024* (2013.01); *G01K 1/026* (2013.01)

(58) Field of Classification Search

CPC ........... G01K 3/10; G01K 1/024; G01K 1/026
See application file for complete search history.

(56) References Cited

U.S. PATENT DOCUMENTS

2023/0127651 A1* 4/2023 Cella .......................... B25J 9/16 705/7.11
2023/0132449 A1* 5/2023 Cella .................. G05B 13/0265 705/7.13
2023/0137578 A1* 5/2023 Cella ................... G06F 16/2455 705/28
2023/0325766 A1* 10/2023 Cella ...................... B25J 9/1682 705/7.22

* cited by examiner

*Primary Examiner* — Laura Martin Sweeney
*Assistant Examiner* — Julia Fitzpatrick
(74) *Attorney, Agent, or Firm* — Antonio Papageorgiou; Christopher M. Crane

(57) ABSTRACT

Improved methods and systems are provided for fire detection in a first unit load device (ULD) from a plurality of ULDs all located in a cargo compartment, which generally entails measuring a plurality of instances of temperature of the first ULD over a first period of time using at least one first RFID sensor installed on or within the first ULD; measuring a plurality of instances of temperature of one or more reference ULDs using at least one second RFID sensor installed on or within the one or more reference ULDs. A computing device executes a multiple time-series-based, trend-following algorithm over a period of time and determines therefrom a rate of rise (ROR) temperature differential between the plurality of instances of temperature from the at least one first RFID sensor and the plurality of instances of temperature from the at least one second RFID. This differential may be used to generate a control signal for triggering a fire warning alarm based on the ROR temperature differential exceeding a fire detection activation threshold.

20 Claims, 22 Drawing Sheets

| | |
|---|---|
| ULD 1 | ULD 2 |
| ULD 3 | ULD 4 |
| ULD 5 | ULD 6 |

ENHANCED TECHNIQUES FOR CARGO COMPARTMENT FIRE DETECTION

RELATED APPLICATION

This application claims the benefit of U.S. Provisional Application No. 63/618,955, entitled "ENHANCED TECHNIQUES FOR CARGO COMPARTMENT FIRE DETECTION", filed Jan. 9, 2024, which is incorporated herein by reference.

BACKGROUND

The present application relates to systems and methods for fire detection, and more specifically heat sensor-based systems for detecting fires in cargo compartments.

Timely fire detection within aircraft cargo compartments, particularly those involving fires originating within unit load devices (ULDs), remains a persistent challenge in the aviation industry. ULDs serve primarily to secure cargo inside an aircraft or vessel so that the shipment does not move during transport, e.g., flight. ULDs also make loading and unloading cargo more efficient. Typical ULDs include shipping pallets or containers. Pallet type ULDs usually have an aluminum base with a flexible cover made of a high-strength synthetic materials, such as nylon or polyester, to securely contain and protect the cargo therein. Container type ULDs further incorporate framing, typically of aluminum, with wall and roof panels made from relatively rigid materials, including aluminum, polycarbonate, or composite materials. Container type ULDs typically provide access using a fabric door, which also provides an area for smoke to more readily escape in the event of a fire therein.

Fire-hardening is possible for both pallet and container-type ULDs. A fire-hardened pallet uses a fire containment cover (FCC), and a fire-hardened container is considered a fire-resistant container (FRC). Typically, these FCCs and FRCs consist of fire-resistant polymer composites, which undergo testing to ensure their materials meet applicable flammability requirements. Previous Federal Aviation Administration (FAA) experiments have demonstrated that the FCC and FRC can suppress class-A fires for four hours but may not suppress fire associated with bulk shipments of lithium batteries.

The design of ULDs inherently hinders the timely detection of fires using traditional methodologies that locate smoke detectors in the cargo compartment, outside of the ULDs and typically mounted on the ceilings of cargo compartments. Studies by the FAA have shown an approximately five-minute difference between smoke detection within the ULD vs. smoke detection in the cargo compartment outside of the ULD.

Between 2006 and 2011, three catastrophic in-flight cargo fires originating within ULDs occurred. These incidents revealed a critically short response time between fire warning indications to the flight deck and subsequent system failures, highlighting a need for improved detection methods, particularly regarding detection time.

Attempts to improve the fire detection have generally failed to address the complexities associated with fire detection in cargo compartments that contain ULDs. Accordingly, there is a need for systems that improve fire detection, particularly in the context of transport and storage of ULDs.

To this end, the present application provides a novel approach to fire detection, focusing on developing and implementing a heat sensor-based, e.g., wireless ultra-high frequency (UHF) radio frequency identification (RFID), fire detection system. This system generally uses temperature sensors strategically placed on and/or within ULDs, which communicate with a receiver configured to better detect instances of fire and preferably report the type and/or status of the fire with high granularity. The proposed system achieves such goals with a novel application of moving average convergence divergence (MACD) with respect to temperature and/or other variables indicative of a fire, such as the presence of smoke, gases, etc., in one or more ULDs.

The systems disclosed herein enhance the ability to detect fires that might otherwise go undetected with traditional smoke and other heat-based fire detectors because the ULDs may prevent smoke and temperatures from reaching the smoke, fixed temperature, and/or rate-of-rise (ROR) thresholds required to trigger warnings/alarms and/or suppression in traditional systems. Non-threshold temperature fire detection systems have been proposed, including ones that use machine learning to predict the instances of fires. Although promising for fire detection systems at fixed locations, such as offices, warehouses, etc., such systems have not been tested in the context of ULD transport where, inter alia, temperatures in ULDs vary greatly based on time of the year, e.g., winter vs summer, location, e.g., northern vs. southern hemisphere, and even along a given transport route where temperature will vary based on altitude, and start and end locations, etc., making machine learning an inefficient solution for this task, assuming that the limited data for training even allows for acceptable results.

SUMMARY

The preferred embodiments of the systems for detecting fires disclosed herein achieve one or more of the objectives that follow.

Cost-Effective, Battery-Free Fire Detection System:

In the preferred embodiment, a cost-effective, battery-free fire detection system is provided using UHF RFID and temperature sensing tags on or within ULDs. Other types of sensors may also be used, including smoke and gas, to detect physical parameters within the ULDs. This placement strategy brings the sensors closer to potential fire sources than ceiling-mounted smoke detectors in aircraft cargo compartments. Using wireless temperature sensing tags, the system does not restrict movement of ULDs in and out of the cargo compartment of the aircraft.

Near Real-Time Fire Monitoring and Early Detection:

In the preferred embodiment, another the systems provides crews with near real-time data on fire status and location within the cargo compartments and the ULDs therein. The system may integrate near real-time monitoring with enhanced detection capabilities for faster alerts as compared to existing systems, particularly those used in aircraft cargo compartments. Preferably, the system also offers information regarding the potential fire's location and its severity.

False Alarm Reduction and System Reliability:

In the preferred embodiment, the system provided executes a process that reduces false alarms, thereby improving the fire detection system's reliability, irrespective of the type of sensor used. This process balances the need for high sensitivity to actual fire events and minimal false positive rates, which is important for maintaining the trust of fire detection systems in aviation settings.

Collectively, these objectives aim to address the current limitations in fire safety within cargo compartments, particularly within aircraft. The inventive systems offer a path towards safer and more efficient in-flight fire detection and management. The expected outcomes include improvements in safety protocols and operational procedures in the aviation industry, using the technological advancements disclosed herein.

In one aspect, an improved method for fire detection in a first unit load device (ULD) from a plurality of ULDs in a cargo compartment is provided, which method includes the steps of: measuring a plurality of instances of temperature of the first ULD over a first period of time through at least one first RFID sensor installed on or within the first ULD, the at least one first RFID sensor wirelessly in communication with a computing device in a fire detection system; measuring a plurality of instances of temperature of one or more reference ULDs through at least one second RFID sensor installed on or within the one or more reference ULDs over the first period of time, the at least one second RFID sensor wirelessly in communication with the computing device in the fire detection system; executing, by the computing device, a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generating, by the computing device, a control signal for a fire warning alarm based on the ROR temperature differential exceeding a fire detection activation threshold.

In one embodiment, the multiple time-series-based, trend-following algorithm includes a Moving Average Convergence Divergence (MACD) algorithm.

In one embodiment, the method includes the steps of: determining, by the computing device, a short-term moving average line of temperatures and a long-term moving average line of temperatures from the plurality of instances of temperature measured through the at least one first RFID over a second period of time; and calculating, by the computing device, a heat detection MACD line by subtracting the long-term moving average of temperatures line from the short-term moving average of temperatures line for the at least one first RFID sensor over the second period of time, wherein a rising heat detection MACD line indicates a possible escalation in temperature or a fire event, and a falling heat detection MACD line indicates a possible decrease in temperature or fire suppression.

In one embodiment, the method further includes the steps of: determining, by the computing device, a short-term moving average of temperatures line and a long-term moving average of temperatures line from the plurality of instances of temperature measured through the at least one first RFID over a second period of time; and calculating, by the computing device, a heat detection signal line by subtracting the long-term moving average of temperatures line from the short-term moving average of temperatures line for the at least one second RFID sensor over the second period of time, wherein the ROR temperature differential includes a histogram line for heat detection determined by calculating a difference between the heat detection MACD line and the heat detection signal line, wherein a growing ROR temperature differential on the histogram line for heat detection indicates a possible thermal hazard.

In one embodiment, the at least one first RFID sensor is installed on a surface of the first ULD and wherein the at least one second RFID sensor is installed on a surface of at least one other of the plurality of ULDs.

In one embodiment, the at least one first RFID sensor is installed on a mount connected to an internal surface of the ULD and wherein the at least one second RFID sensor is installed on an external surface of at least one other of the plurality of ULDs.

In one embodiment, a bottom surface of the mount and the internal surface of shipping container are arranged to define a measurement area, and wherein the height of the measurement area is 6.4 mm.

In one embodiment, the interior surface and exterior surfaces of the ULDs include a top surface and wherein the at least one first RFID sensor and at least one second RFID sensor are positioned in the center of the top surface.

In one embodiment, the fire detection system further includes an RFID reader communicatively coupled to the computing device, and a plurality of RFID reader antennas communicatively coupled to the RFID reader, the RFID reader and antennas located outside of ULDs, the method includes: transmitting read signals via the plurality of RFID antennas; in response to the read signals, causing the at least one first RFID sensor and the at least one second RFID sensors to communicate messages to the computing device, the messages include the plurality of instances of temperature of the first ULD and of the one or more reference ULD.

In one embodiment, the messages further include a unique RFID sensor identification, and a received signal strength indicator (RSSI), the method further includes mapping a location of the at least one first RFID sensor and of the at least one second RFID sensors in the cargo compartment based on RSSI, and associating based on location the first ULD and the one or more reference ULDs.

In one embodiment, the one or more reference ULDs include a plurality of reference ULDs, each of the reference ULDs are adjacent to the first ULD, and wherein the method includes determining the ROR temperature differential between the plurality of instances of temperature from the at least one first RFID sensor and the plurality of instances of temperature from a set of second RFID sensors, includes at least a third RFID sensor associated with a first reference ULD and at least a further RFID sensors associated with a second reference ULD.

In another aspect, a system for detecting fire in a first unit load device (ULD) from a plurality of ULDs in a cargo compartment is provided that includes: a computing device having memory that store executable instructions, and a processor adapted to access the memory, the processor further adapted to execute the executable instructions stored in the memory, the computing device therewith configured to: measure a plurality of instances of temperature of the first ULD over a first period of time through at least one first RFID sensor installed on or within the first ULD, the at least one first RFID sensor wirelessly in communication with the computing device; measure a plurality of instances of temperature of one or more reference ULD through at least one second RFID sensor installed on or within the one or more reference ULDs over the first period of time, the at least one second RFID sensor wirelessly in communication with the computing device; execute a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generate a control signal for a fire warning alarm based on the ROR temperature differential exceeding a fire detection activation threshold.

In one embodiment, the multiple time-series-based, trend-following algorithm includes a Moving Average Convergence Divergence (MACD) algorithm, the computing device further configured to: determine a short-term moving average line of temperatures and a long-term moving average line of temperatures from the plurality of instances of temperature measured through the at least one first RFID over a second period of time; calculate a heat detection MACD line by subtracting the long-term moving average of temperatures line from the short-term moving average of temperatures line for the at least one first RFID sensor over the second period of time; determine a short-term moving average of temperatures line and a long-term moving average of temperatures line from the plurality of instances of temperature measured through the at least one first RFID over a second period of time; and calculate a heat detection signal line by subtracting the long-term moving average of temperatures line from the short-term moving average of temperatures line for the at least one second RFID sensor over the second period of time, wherein the ROR temperature differential includes a histogram line for heat detection determined by calculating a difference between the heat detection MACD line and the heat detection signal line, wherein a growing ROR temperature differential on the histogram line for heat detection indicates a possible thermal hazard.

In one embodiment, system further includes an RFID reader communicatively coupled to the computing device, and a plurality of RFID reader antennas communicatively coupled to the RFID reader, the RFID reader and antennas located outside of ULDs, the computing device further configured to: transmit read signals via the plurality of RFID antennas; and in response to the read signals, cause the at least one first RFID sensor and the at least one second RFID sensors to communicate messages to the computing device, the messages includes the plurality of instances of temperature of the first ULD and of the one or more reference ULD.

In one embodiment, the messages further include a unique RFID sensor identification, and a received signal strength indicator (RSSI), the computing device further operable to map a location of the at least one first RFID sensor and of the at least one second RFID sensors in the cargo compartment based on RSSI, and associate based on location the first ULD and the one or more reference ULDs.

In one embodiment, the one or more reference ULDs include a plurality of reference ULDs, each of the reference ULDs are adjacent to the first ULD, and wherein the computing device is further operable to determine the ROR temperature differential between the plurality of instances of temperature from the at least one first RFID sensor and the plurality of instances of temperature from a set of second RFID sensors, including at least a third RFID sensor associated with a first reference ULD and at least a further RFID sensors associated with a second reference ULD.

In another aspect, a non-transitory computer-readable medium is provided for storing a set of instructions, the set of instructions comprising: one or more instructions that, when executed by one or more processors of a system, cause the system to: measure a plurality of instances of temperature of the first ULD over a first period of time through at least one first RFID sensor installed on or within the first ULD, the at least one first RFID sensor wirelessly in communication with the one or more processors of the system; measure a plurality of instances of temperature of one or more reference ULDs through at least one second RFID sensor installed on or within the one or more reference ULDs over the first period of time, the at least one second RFID sensor wirelessly in communication with the one or more processors of the system; execute a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generate a control signal for a fire warning alarm based on the ROR temperature differential exceeding a fire detection activation threshold.

In one embodiment, the multiple time-series-based, trend-following algorithm includes a Moving Average Convergence Divergence (MACD) algorithm, the executable instructions further cause the system to: determine a short-term moving average line of temperatures and a long-term moving average line of temperatures from the plurality of instances of temperature measured through the at least one first RFID over a second period of time; calculate a heat detection MACD line by subtracting the long-term moving average of temperatures line from the short-term moving average of temperatures line for the at least one first RFID sensor over the second period of time; determine a short-term moving average of temperatures line and a long-term moving average of temperatures line from the plurality of instances of temperature measured through the at least one first RFID over a second period of time; and calculate a heat detection signal line by subtracting the long-term moving average of temperatures line from the short-term moving average of temperatures line for the at least one second RFID sensor over the second period of time, wherein the ROR temperature differential comprises a histogram line for heat detection determined by calculating a difference between the heat detection MACD line and the heat detection signal line, wherein a growing ROR temperature differential on the histogram line for heat detection indicates a possible thermal hazard.

Additional aspects of the present invention will be apparent in view of the description which follows.

DETAILED DESCRIPTION OF THE INVENTION

Figure 1:
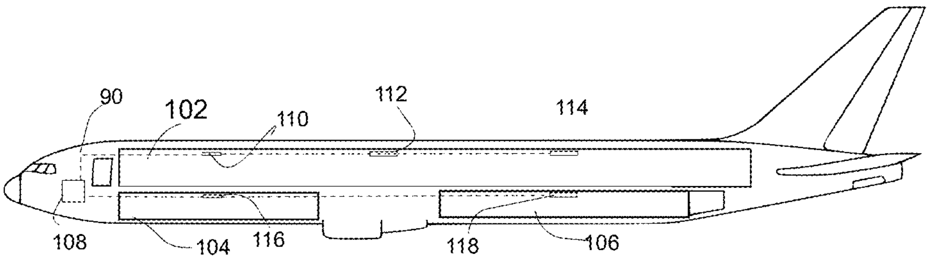
FIG. 1 is a representation of a side view of an aircraft equipped with a heat-based fire detection system according to one embodiment of the systems disclosed herein.

Challenges and advancements in fire detection within aircraft cargo compartments have herewith been examined, focusing on ULDs. This examination has exposed limitations of current fire protection systems in aviation and other modes of transport that use ULDs. Central to this review was exploring the use of temperature-based fire detection system, which can leverage wireless sensors, e.g., RFID temperature sensing tags, on or within ULDs and, more importantly, monitoring temperatures and other physical parameters within one or more ULDs in a cargo compartment, preferably using moving average convergence divergence (MACD) to better detect the instance of fire therein. Testing has shown that this novel approach presents a significant improvement over traditional fire detection methods, including smoke, and fixed temperature and ROR type fire detectors. Exploration in this regard also included assessing the potential of RFID gas sensors, which was promising in the ability to detect gases indicative of the presence of fire within ULDs before visible smoke or significant heat generation had occurred.

Smoldering and lithium battery fires, and their challenges in aircraft cargo compartments have also been examined. This examination underscores the importance of heat release rate (HRR) in this context. The HRR measures a fire's energy output, informing the design of detection systems by quantifying fire intensity and potential severity, as opposed to fixed parameter systems that provide a binary output.

Smoldering fires are characterized by their flameless combustion process. One of the most challenging aspects of smoldering fires is early detection. Due to their low-temperature, flameless nature, smoldering fires can often go undetected by traditional fire detection systems, which are typically designed to respond to higher temperatures, and flames or smoke. In the context of aircraft cargo compartments, early detection is of critical concern because smoldering fires can quickly transition into flaming fires, which are far more hazardous and difficult to manage, as more oxygen becomes available, for example, during descent of certain aircraft.

The transport of lithium batteries as cargo poses a significant hazard to aircraft safety because lithium batteries can undergo a process called thermal runaway, an exothermic chain reaction within the battery that cause a sharp increase in the temperature of the battery. Critically, thermal runaway may initiate runaway propagation, in which the heat from one battery or cell causes an adjacent battery or cell to overheat and runaway. The propagation from one battery/cell to another persists until all have undergo thermal runaway or until the suppression system removes sufficient heat to stop the chain reaction. This process can create enormous amounts of heat, smoke, and flammable gasses relatively quickly. Even more problematic is that certain fire suppression systems may not adequately protect against lithium battery fires, because the allowable concentration of Halon, for example, may not be sufficient for inerting lithium-ion battery vent gas and air mixtures. Early detection is therefore also critical in these types of fires to prevent or halt the runaway propagation.

The systems of the present application generally attempt to improve outcomes by shortening the fire detection time, regardless of the type of ULD in use or the type of fire. Although heat heat-based fire detection is preferred, primarily because of the low costs and availability associated with this type of technology, the techniques disclosed herein are equally applicable to other fire detection methodologies, including gas and smoke detection, or any combination heat, gas, and smoke detection methodologies.

In the preferred embodiment, the fire detection system uses wireless sensors, preferably those using RFID technology, to wirelessly communicate environmental data obtained from one or more ULDs. RFID and other wireless systems generally include a reader (interrogator), one or more tags (transponders), and antennas. The reader is a data-receiving device, and the tag is the data-carrying device. In the case of sensor tags, the tag also serves as the data capture device. RFID tags may be configured as sensors to determine and store physical parameters, such as temperature, moisture, pressure, presence of gasses, etc.

The reader generally communicates with the tags through electromagnetic radio waves transmitted and received through one or more antennas operatively coupled to the reader and/or the tag. Information transmitted from the reader to the tag is referred to as a downlink signal, and the information backscattered from the tag to the reader is referred to as the uplink signal. The reader's antenna can be either built-in or externally connected via a cable. The tag generally combines an integrated circuit (IC) for processing and data storage, and an antenna for receiving and sending signals from and to the reader, respectively.

Passive RFID systems commonly use three frequency bands for wireless communications. The frequency ranges are 125-134.2 kHz and 140-148.5 kHz for the low frequency (LF) band, 13.553-13.567 MHz for the high frequency (HF) band, and 858-930 MHz for the ultra-high frequency (UHF) band. Systems that operate with higher frequencies generally tend to communicate over longer distances: LF band systems have a range of ~10 cm, HF band systems have a range of ~1 m, and UFH band systems have a range of ~10 m. Active UFH RFID system range can achieve distances of +30 m. The higher frequencies associated with longer range systems, however, tend to exhibit greater difficulty transmitting through objects. LF and HF systems magnetically couple with the reader, whereas UHF systems use radiative or backscatter coupling. HF RFID may use near-field communication (NFC) standards, i.e., ISO 14443 and ISO 18000-3, whereas UHF RFID typically use the EPC global Gen2 and ISO 18000-63 standards. UHF RFID is also referred to as RAIN, an acronym derived from RAdio frequency Identification. UHF RFID systems can collect data from one or more unpowered tags simultaneously without a line of sight (LOS) using anti-collision protocols.

UHF RFID tags can be active, semi-passive, or passive. Active tags use a battery to power the tag's integrated circuit (IC) and an onboard transmitter for communicating with the reader. Semi-passive tags use a battery to power the IC, but they lack an onboard transmitter and must therefore use passive methodologies to communicate with the reader. Passive tags do not contain a battery and must therefore receive power from the reader through a process referred to as coupling, in which power is harnessed from the electromagnetic waves transmitted by the reader antenna to activate the IC communicate with the reader typically using a backscattering method.

Signal dynamics, specifically through the Friis transmission equation and free space path loss (FSPL), are essential for RFID system designs. The Friis Transmission Equation quantifies the communication efficiency between the reader and the tag. This equation calculates the ratio of power received to the power transmitted. The equation is a function of the distance between the reader's antennas and the tag, the wavelength of the propagating wave, and the gains of the transponder and the receiver.

$$\frac{P_r}{P_t} = G_r G_t \left(\frac{\lambda}{4\pi D}\right)^2$$

Friis Transmission Equation

Where $P_r$ is the received power, $P_t$ is the transmitted power, $G_r$ is the gain of the receiving antenna, $G_t$ is the gain of the transmitting antenna, λ is the wavelength of the electromagnetic wave, and D is the path length between the transmitting and receiving antenna.

The Friis Transmission Equation primarily assesses the power dynamics between the reader and the tag, factoring in the antennas' gains. In contrast, FSPL calculates the attenuation of the signal strength over distance in free space, an essential factor for determining the effective range and reliability of RFID communication. Generally, to communicate effectively, in each situation the sum of the transmit power, system losses, antenna gains, and attenuation cannot exceed the reader receive sensitivity/threshold.

$$FSPL\ (\text{dB}) = 20\ \log\ \frac{4\pi D}{\lambda}$$

Antenna radiation patterns are also important considerations in system designs, particularly in the confines of cargo areas. Directional antennas, for example, concentrate the signal in a beam that radiates outward in one direction, approximately conically, whereas dipole antennas radiate outwardly somewhat toroidally, i.e., having a donut shape. Spatial orientation diagrams map the targeted antenna radiation intensity in the various directions. The spatial orientation defines the azimuth pattern, or phi cut, and the elevation pattern, or theta cut. The azimuth pattern is the top-down or plan view of the antenna radiation patter. The elevation pattern is the side view of the antenna radiation pattern. Antenna design and orientation is important in RFID systems to ensure the antenna is aimed correctly for optimal signal transmission and reception.

Figure 4A:
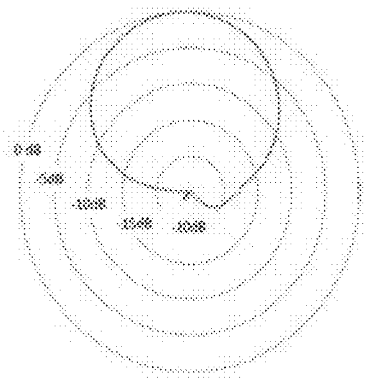
FIGS. 4A-4C depict radiation patterns for a directional reader antenna for use in a heat-based fire detection system according to one embodiment of the systems disclosed herein.
Figure 4B:
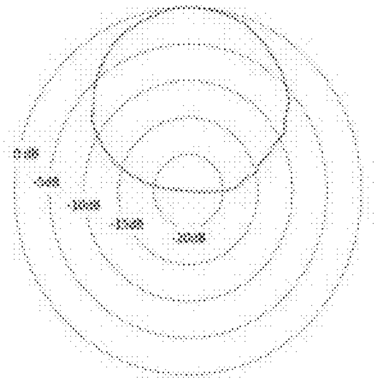

The radiation pattern graphically represents how an antenna emits or receives energy in three dimensions. The radiation pattern for the SensThys® SensRF-101 RFID antenna, which has been used for the testing noted herein, is shown in FIG. 4A. The beamwidth is the angular width between the points where the signal strength of the antenna drops to half of its maximum value, often referred to as the −3 dB points, as shown in FIG. 4B. Beamwidth is an important factor in determining the antenna's directivity. A narrower beamwidth antenna generally indicates a more focused and directive antenna, which concentrates energy in a specific direction. Antennas with wider beams are less concentrated and therefore have less gain for the same power output as compared to those with narrow beams.

Figure 4C:
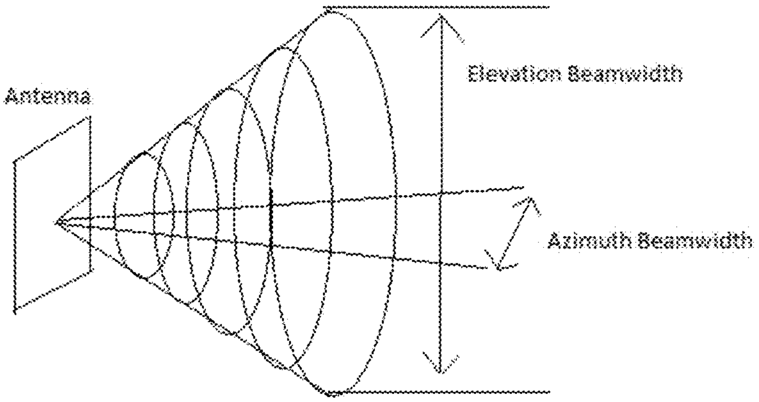

RFID reader antennas are typically unidirectional, as shown in FIG. 4, and have specific beamwidths to maximize directivity and are located to direct most energy toward the likely location of RFID tags. In contrast, RFID tags commonly employ dipole antennas, which project most of their energy in front and behind the surface of the tag, with little energy towards the center of the tag. Using dipole antennas for tags allows for more versatile signal reception to accommodate the variable location of tags in a cargo department.

The orientation of the reader antenna with respect to the tag is essential for communication. The ideal orientation is when the reader antenna and tags face each other to receive the maximum energy from the tag backscattered directly to the reader. The antenna azimuth angle is the angle between the direction of the antenna and a reference direction. The antenna elevation angle is the angle between the direction of the antenna and the horizontal plane. Optimal alignment may not be possible, particularly in the limited space within a cargo compartment for antennas. Multiple reader antennas may therefore be arranged within a cargo compartment to minimize any dead spots therein. Standardized reader and tag antenna locations on or within the cargo compartment and/or the ULD may also be established to minimize any uncertainty and reduce the number of reader antennas necessary to cover a given space.

The environment can influence the efficacy of an RFID system. Environmental contributors include absorption, penetration, reflection, refraction, and diffraction which actively alter electromagnetic energy transmitted. The environment can create a multipath effect, changing the amplitude, phase, or frequency and resulting in null or extended read zones. When electromagnetic waves encounter materials, their behavior changes compared to their propagation in free space. These waves can be partially reflected, attenuated, and delayed. Furthermore, their polarization can be altered due to the interaction with the material. The dielectric properties of the material govern these changes in electromagnetic wave behavior. Materials with high dielectric constants, such as water with a dielectric constant of around 80, significantly impact electromagnetic wave propagation. Water reflects almost all incident electromagnetic waves and absorbs most of the remaining energy. This leads to substantial signal attenuation in RFID applications.

The penetration depth (δ) of radio waves is a variable that influences system design as well. Penetration depth is defined as the depth below a material's surface at which the intensity of an electromagnetic wave decreases to 1/e of its original intensity at the surface. When the penetration depth of a material significantly exceeds its thickness at a specific frequency, the material becomes "transparent" to the electromagnetic wave, allowing it to pass through with minimal attenuation. Conversely, if the penetration depth is much smaller than the material's thickness at the given frequency, the material acts as an "opaque" barrier, blocking the wave's passage. In cases where the penetration depth is similar to that of the material's thickness, the material behaves in a 'translucent' manner, partially allowing the wave to penetrate, while also causing some attenuation. At 900 MHz, a common frequency for UHF RFID systems, the penetration depth varies based on the material's properties. In materials like metals with high magnetic permeability and electrical conductivity, the skin depth is extremely small, often only a few micrometers. This results in electromagnetic waves being reflected rather than penetrating the material.

Although UHF RFID cannot penetrate metal, an approach that allows RFID tags to read on metal is using a spacer made of a material with a low dielectric constant. This spacer between the metal surface and the RFID tag creates a barrier that mitigates the metal's disruptive effects on the electromagnetic field. Detuning can also be addressed by incorporating a self-adjusting mechanism within the RFID tag's chip. This mechanism dynamically alters the chip's impedance to match the antenna's changing impedance. This continuous impedance matching significantly enhances tag performance and maintains consistent read ranges to overcome the detuning challenge of reading RFID tags on metal.

Unlike metal, materials with low magnetic permeability and electrical conductivity, such as plastics and composites, exhibit much greater penetration when exposed to electromagnetic waves at 900 MHz. In these materials, the penetration depth can extend to several centimeters. These materials are more 'transparent' to electromagnetic waves, allowing for deeper penetration with minimal attenuation. However, it is worth noting that there can be some absorption of electromagnetic energy, leading to a slight reduction in signal strength.

Therefore, UHF RFID electromagnetic waves will not pass through aluminum ULDs, but can read tags on metal. Furthermore, electromagnetic waves can pass through composite ULDs. However, the composite material absorbs some of the electromagnetic energy. These issues may be ameliorated by incorporating into cargo containers radio transparent sections at defined locations, as discussed below, to which the RFID tags may be mounted to on the inside of a container for more accurate sensor readings, while allowing the sensor to better communicate with the reader outside of the container.

The implementation of RFID technology in the airline industry has significantly enhanced operational efficiency and accuracy of operations, such as baggage handling. RFID technology enables the quick and easy identification of the destination information for each bag on a flight. This enhanced tracking and logging capability reduces the manual handling of bags and the possibility of bags being routed incorrectly or lost. Additionally, RFID technology can expedite the average time to screen bags, reducing the chances of baggage missing a flight due to delays in screening. The existing use of RFID tags on baggage, cargo, and within the aircraft or vessel can be leveraged by the system for additional data points within a container in the case of cargo mounted tags and outside the container in the case of those tags mounted on the outside of the container and/or on the cargo aircraft/vessel itself, including to determine the location of a fire, temperature and gasses within the container and/or cargo compartment, etc., as also discussed below.

Figure 2A:
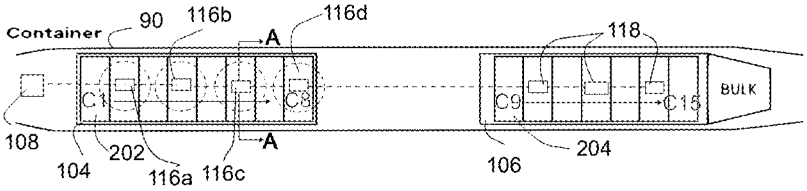
FIGS. 2A-2D are plan and cross-sectional views of the aircraft of FIG. 1, equipped with a heat-based fire detection system according to one embodiment of the systems disclosed herein.
Figure 2B:
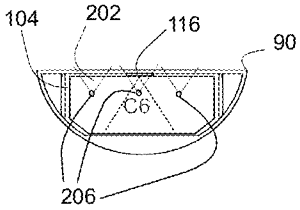
Figure 2C:
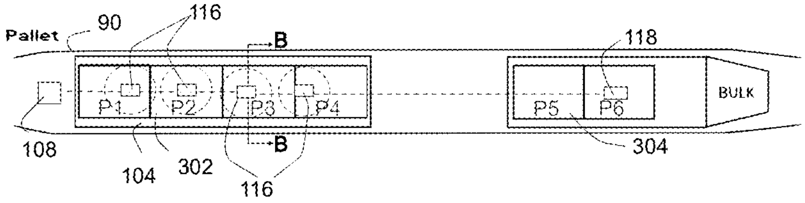
Figure 2D:
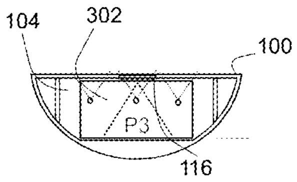
Figure 3A:
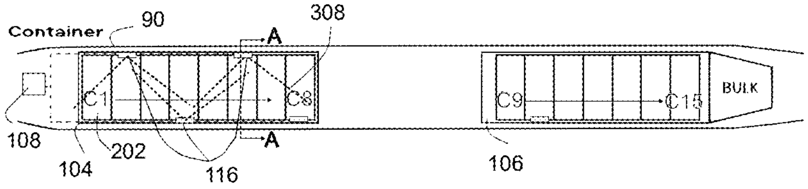
FIGS. 3A-3B are plan and cross-sectional views of an aircraft of FIG. 1, equipped with a heat-based fire detection system according to one embodiment of the systems disclosed herein.
Figure 3B:
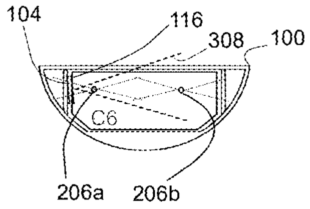

FIG. 1 depicts a side view of a typical aircraft 90 having a first cargo compartment 102, a second cargo compartment 104, and a third cargo compartment 106. The aircraft includes a heat-based fire detection system 500 (see FIG. 5A), which includes a reader 108 coupled to a plurality of reader antennas 110, 112, 114, 116, 118 located within the cargo compartments 102, 104, 106 to read tags within substantially all the cargo compartments. As discussed herein, the location of the reader antennas may be of importance, particularly with respect to passive RFID technology. In one embodiment, the antennas are mounted on or near the ceiling of the cargo compartments, like the experimental setup below. The reader antennas 110, 112, 114, 116, 118 may be oriented to direct their respective beams downwardly, as shown in FIGS. 2A-2D, or laterally, as shown in FIGS. 3A-3B, toward the containers 202, 204 and/or pallets 302, 304, which each contains one or more temperature sensors/tags 206. Correspondingly, the tag 206 antennas are installed on/in the ULD with their respective beams oriented generally toward the reader antennas 110, 112, 114, 116, 118, as shown in FIGS. 2B and 3B. Multiple antennas and tags may be oriented to provide diversity, e.g., polarization diversity, as desired. The reader antennas 116 may each be configured to provide distributed radiation from multiple points thereon, which ameliorates the need to place tags in specific orientations.

The antennas 110, 112, 114, 116 (116*a*-116*d*), 118 may have a maximum spacing from each other to provide the desired cargo compartment coverage. For example, each antenna may be configured to cover a particular segment of the cargo compartments 102, 104, 106. Referring to FIG. 2A, in one embodiment, a first antenna 116*a* provides coverage for a first area where containers C1-C3 are located, a second antenna 116*b* provides coverage for C3-C5 container area, etc. The amount of overlap between adjacent antennas, if any, may be tailored for the desired coverage/redundancy, by reducing/increasing reader antenna spacing and/or modulating the transmit power of the reader. The antenna/tag radiation patterns are illustrated in the accompanying Figures with dashed lines 308. As can be seen and as discussed below, in the case of downwardly oriented antennas 116, the sensor/tag 206 antennas in container 202 are preferably below the ceiling of the container. Referring to FIG. 2B, the container 202 may include a plurality of tags 206 spaced laterally/horizontally within the container 202 to ensure that at least one of the tags 206 will couple when energized with at least one of the reader antennas 116.

Referring to FIG. 3A, the reader antennas 116 may be installed on the walls of the compartment 104, with their respective beams oriented laterally inward toward the compartment 104. In this instance, rows of alternating antennas may provide the desired coverage. Referring to FIG. 3B, the sensors/tags 206 may similarly be spaced below the ceiling of the container, for example, along at least one of the side and/or front/back walls of the container 116. As can be seen in FIGS. 3A-3B, antenna 116 may in this instance be able to communicate with at least two sensors, a proximal 206*a* and a distal 206*b*, thereby increasing the probability that the data from at least one of the sensors in the container will be accessible to the reader 108.

Figure 3C:
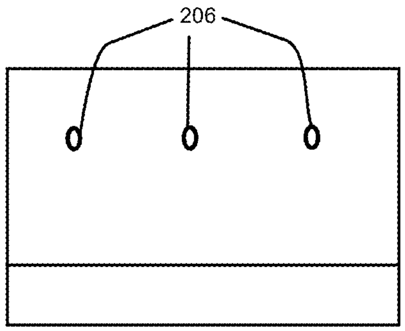
FIGS. 3C-3E are side, plan, and partial cross-sectional views of a shipping container equipped with heat sensors/tags for use in a heat-based fire detection system according to one embodiment of the systems disclosed herein.
Figure 3D:
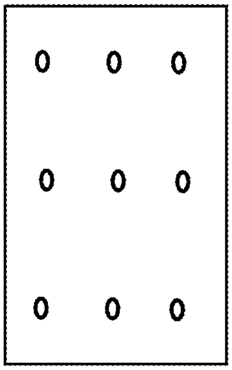
Figure 3E:
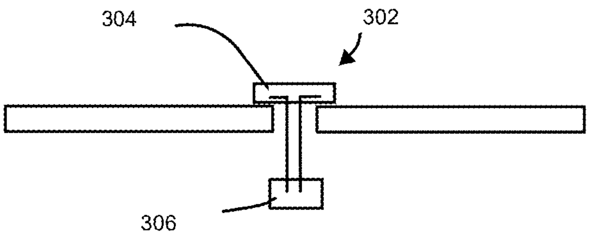

As discussed herein, the materials used in ULD and aircraft may negatively impact connectivity. This may be addressed by using containers with at least one radio transparent/translucent panel, multiple sensors, and/or sensors with antennas remote from the sensing element, ultimately to improve the probability that at least one sensor within a ULD will couple with at least one reader antenna. FIG. 3C depicts a side view of a container, showing sensors/tags 206 spaced lower from the ceiling of the container and along a side wall. A plurality of sensors may similarly be installed in the front and/or back walls of the container (not shown). FIG. 3D depicts a plan view of the container showing a matrix of sensors/tags 206 equally spaced horizontally within the container just below the ceiling of the container. Referring to FIG. 3E, in one embodiment, a tag 302 is provided having a sensor portion 306 remote from the antenna portion 304. In this embodiment, the sensor portion may be located lower within the container and the antenna may be located higher within the container or through an aperture in the container ceiling and/or wall for unimpeded transmission with at least one reader antenna.

In one embodiment, a long receiver antenna spanning the length of the cargo compartment may be used to enhance coverage. To maintain signal strength, amplifiers or repeaters may be used. In another embodiment, tag antennas may be inlaid within the ULD's composite material to allow for a larger antenna, increasing signal strength and improving communication with RFID readers. This also protects against damage from loading cargo. Additionally, the RFID chip can still be placed inside the ULD to measure the internal temperature rather than the surface temperature.

As discussed herein, in at least one embodiment, the system provides crews with near real-time data on fire status and location within the cargo compartments and the ULDs therein. As discussed further below, the status of a fire may be determined based on temperature changes in one or more ULDs. These changes analyzed using MACD may provide the type of fire, as well as the severity of the fire. The general location of one or more sensors/tags within the cargo compartment may be determined using radio triangulation techniques. When the mapping of ULDs in a cargo compartment, as shown in FIGS. 2A, 2C, and 3A, are predefined and/or known, the system may associate sensor/tag with a particular ULD from the plurality of ULDs in the cargo compartment based on the determined location of the tag and known mapping of ULDs. The RFID tags may be encoded with the ULDS type codes, which can be used by the system to predict the layout of the ULDs in the cargo compartment. For example, base and/or contour code may indicate a single ULD vs two ULDs side-by-side, as well as the front to back extent of a given ULD. The system may also track the order that ULDs are loaded into the cargo compartment, which when combined with ULD type code provide a mapping of the ULDs within aircraft.

Figure 5A:
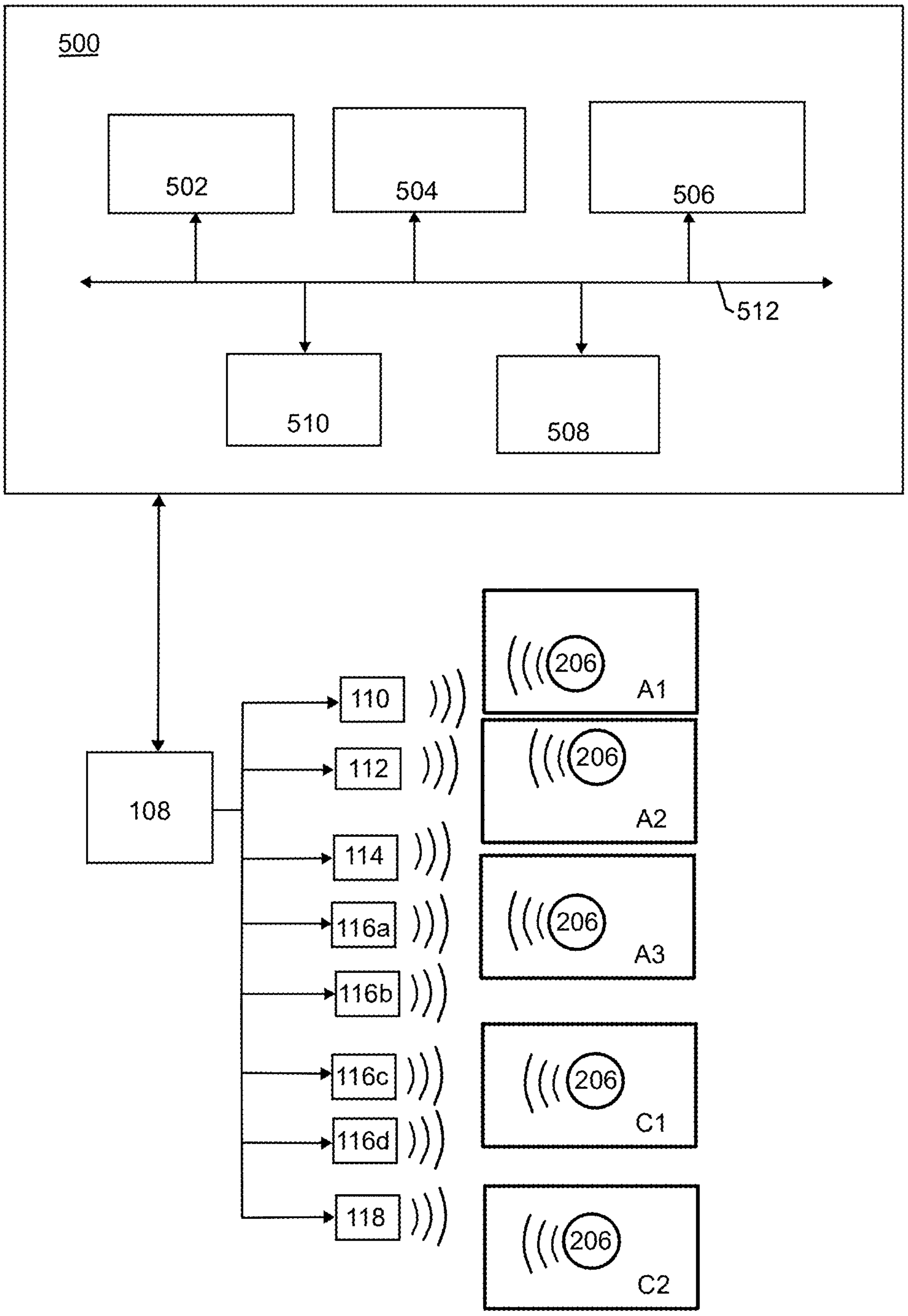
FIG. 5A is an block diagram of a heat-based fire detection system according to one embodiment of the systems disclosed herein.

FIG. 5A is an architectural block diagram of an exemplary embodiment of a heat-based fire detection system. The system may include a computing device 500 that may be used in conjunction with the disclosed embodiments of the invention. In one embodiment, the computing device 500 is operatively coupled to a reader 108, which is operatively coupled to a plurality of reader antennas 110, 112, 114, 116_a-d_, 118. As discussed herein, the reader antennas each communicate wirelessly with one or more sensors 206 each associated with a ULD (A1-A3, C1-C3), as shown, to obtain therefrom data (physical parameters within one or more ULD, preferably at least two ULDs) collected by the one or more sensors 206 at least partially within the one or more ULD. The physical parameters are uploaded to the reader 108 for processing by the reader and/or by the computing device 500 for fire detection, as discussed herein. Alternatively, the computing device 500 and the reader 108 may be integrated into a single unit, which may further be operatively coupled to aircraft warning and/or suppression systems.

In one embodiment, computing device 500 may be a personal computer, a workstation, server computer, special purpose computer, etc. As shown, the computing device 500 may include a processor 502, a memory 504, storage 506, I/O interface 508, a communication interface 510, and internal bus architecture 512. Processor 102 may be a general-purpose microprocessor (e.g., a central processing unit (CPU), a graphics processing unit (GPU), a microcontroller, a microprocessor, a digital signal processor (DSP), an application specific integrated circuit (ASIC), a field programmable gate array (FPGA), a programmable logic device (PLO), a controller, a state machine, gated or transistor logic, discrete hardware components, or any other suitable entity or combinations thereof that is configured to perform calculations, process instructions for execution, and/or other manipulations of information as discussed herein. In some implementations, processor 102 includes one or more multiple processors capable of being programmed to perform a function; for example, processor 502 may be programmed to receive and process data and information from, and/or provide data and information to, any or all of the components of the embodiments of the present invention, including but not limited to: the ULDs (including the ULD flat plate); the RFID-based heat detection system (including readers (interrogator), interior and exterior heat/temperature sensor tags (transponders), antennas, and software), fuel sources, gas detector(s), and light obscuration/smoke measuring meter(s)). Processor 502 may be implemented in hardware, firmware, or a combination of hardware and software.

Memory 104 may include read only memory (ROM), cache, random access memory (RAM), and/or another type of dynamic or static storage (e.g., a flash memory, a magnetic memory, and/or an optical memory) that stores information and/or instructions for use by processor 502. In one embodiment, memory 504 is configured to store programmable software. Storage 506 stores information and/or software related to the operation and use of computing device 500 and may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The I/O interface 508 allows a user to provide input to, receive output from, and otherwise transfer data to and receive data from computing device 500. The I/O interface 508 may include a mouse, a keypad or a keyboard, a touchscreen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

Communication interface 510 includes a transceiver and/or a separate receiver and transmitter and may be implemented via a wired connection, a wireless connection, or a combination of wired and wireless connections, including an Ethernet interface, an optical interface, a coaxial interface, an infrared interface, a radio frequency (RF) interface, a universal serial bus (USB) interface, a Wi-Fi interface, a wireless network interface, or the like. Communication interface 510 enables computing device 500 to communicate with other devices, to receive data and information from and/or to provide data and information to any or all of the components of the embodiments of the present invention, including but not limited to the fire and/or reference ULDs (including the ULD flat plate), the RFID-based heat detection system (including readers (interrogator), interior and exterior heat/temperature sensor tags (transponders), antennas, and software), fuel sources, and light obscuration/smoke measuring meter(s).

Internal bus architecture 512 may include hardware, software, or both that communicatively couples components of the computing device 500 to each other and may include data buses, address buses, and control buses. As an example and not by way of limitation, internal bus architecture 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an IN FI NI BAND interconnect, a low-pin-count (LPC) bus, a memory bus, a Micro Channel Architecture (MCA) bus, a Peripheral Component Interconnect (PCI)

bus, a PCI-Express (PCIe) bus, a serial advanced technology attachment (SATA) bus, a Video Electronics Standards Association local (VLB) bus, or another suitable bus or a combination thereof.

Computing device 500 may perform one or more processes described herein and may perform these processes based on processor 502 executing software instructions stored by a non-transitory computer readable medium, such as memory 504 and/or storage 506. Software instructions may be read into memory 504 and/or storage 506 from another computer-readable medium or from another device via communication interface 510. When executed, software instructions stored in memory 504 and/or storage 506 may cause processor 502 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. The number and arrangement of components shown in FIG. 5A are provided exemplary only. Computing device 500 may include additional components, fewer components, different components, or differently arranged components than those shown. Additionally, or alternatively, a set of components (e.g., one or more components) of computing device 500 may perform one or more functions described as being performed by another set of components of computing device 500.

Figure 5B:
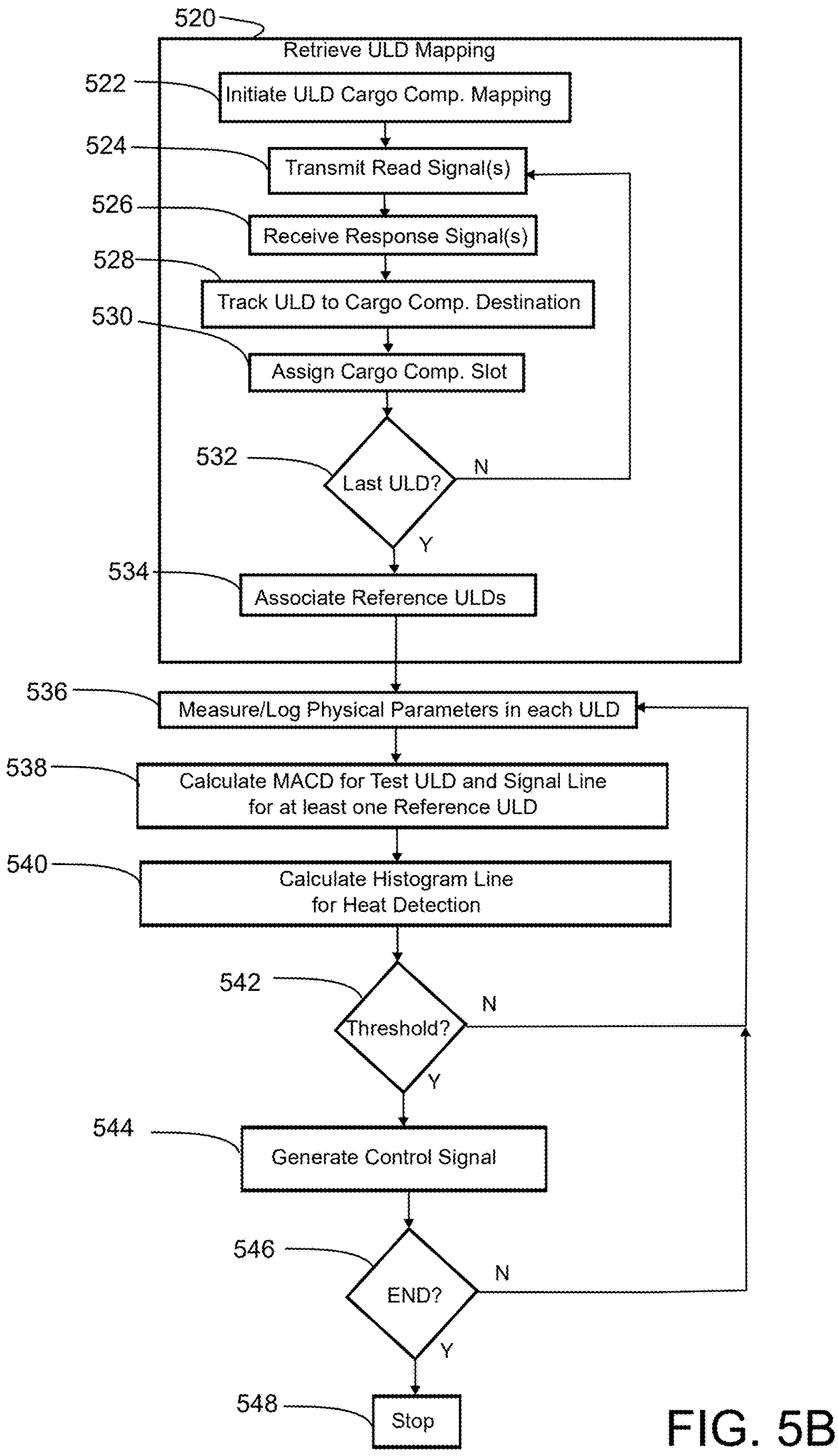
FIG. 5B is a flow diagram illustrating a fire detection methodology according to one embodiment of the methods disclosed herein.

FIG. 5B is a flow chart illustrating an exemplary fire detection methodology in accordance with various aspects of the present disclosure. In one embodiment, the process begins at step 520 by retrieving a mapping of a plurality of ULDs, e.g., C1-C15, P1-P6, etc., within one or more cargo compartments of an aircraft. Cargo compartment mapping generally denotes the location of a given ULD within the cargo compartment and/or relative to the other ULDs. The mapping preferably also includes or otherwise identifies the one or more RFID tags associated with each of the ULDs. The mapping may be stored in a database or table for use as discussed herein, including for determining and tracking the MACD of temperature and/or other physical parameters for each of the ULDs. The mapping may be displayed on an interface screen, for example, at the cockpit of an aircraft or cargo vessel. In this regard, the crew may be provided with a visual display of the location and real-time status of one or more, or preferably each of the ULDs. The mapping may also be used to identify one or more reference ULDs, and the RFID tags associated with the reference ULDs, for each of the ULDs in the cargo compartment.

Mapping of ULDs and their associated RFID tags in the cargo compartment may be accomplished in advance by planning the location of the ULDs within the cargo compartment. In this instance, particular ULDs may be loaded into the cargo compartment in the order and/or at the location dictated by the pre-planned cargo compartment mapping. This may be confirmed by the system using RF distance estimation and triangulation techniques, for example, and matching the results of such techniques with the preplanned map. Alternatively or additionally, mapping may be accomplished/confirmed dynamically during the loading of the ULDs into the cargo compartment. In this instance, dynamic ULD mapping may be initiated at step 522. If the cargo compartment is empty, initiating may entail resetting the mapping dataset (database or table) so that it contains all null values. If not fully empty, initiating may entail resetting the mapping dataset so that it contains null values for open cargo compartment slots only. The data in the mapping dataset for the other cargo compartment slots may be retained and/or confirmed/updated by the system to account for unloading/moving of ULDs within the cargo compartment.

Thereafter, the system may at step 524 transmit read signals periodically using at least one reader antenna (e.g., 116*a*-116*d*) to activate one or more RFID tags 206. In the case of active RFID tags, activation may include transmitting to the tag an activation code that causes the tag transmitter to communicate with the reader. As ULDs are loaded into the cargo compartment, the outer most reader, e.g., 116*a*, will activate the tag associated with a first ULD first and a response message will be received therefrom at step 526 in reply to the read signal. The response message will preferably contain, inter alia, a unique tag ID and one or more items of data, including one or more physical parameters, such as temperature, moisture, pressure, presence of gasses, etc. The response message may also include a received signal strength indicator (RSSI) or other code indicative of the signal strength received by the tag, and/or ULD type code(s), which indicates generally the size and configuration of the ULD, such as whether the ULD is a pallet or container and the shape of the container. When a ULD has multiple tags, the response message may also include information regarding the location of each of the tags and/or the tag sensor within the ULD, e.g., ceiling, front wall, side wall, etc. For ULDs that contain packages therein that include RFID tags, the system may filter replies that do not include container type codes, for example. Alternatively, the package RFID tags may be used to provide additional datapoints for fire detection, including for localization.

As the ULD is moved within the cargo compartment, other reader antennas, e.g., 116*b*-116*d*, may activate the tag associated with the first ULD and therewith track its progress at step 528 to its destination within the cargo compartment, including based on RSSI localization of tags relative to one or a plurality of the readers/reader antennas. Alternatively, the system may map the cargo compartment once all the ULDs have all been loaded therein, for example, based on the RSSI code estimated distances from one or a plurality of reader antennas and triangulation.

At the destination location, the system may at step 530 associate the first ULD a cargo compartment slot. For example, the system may assign slot C8 or P4 to the first ULD loaded into the front cargo compartment. As is understood, the size of the slot may vary based on the type of ULD, which may be determined from the ULD type code and a database/table that associates the ULD type code with the given ULD's dimensions. The system may continue mapping ULDs until, at step 532, the last ULD is loaded into the cargo compartment. During loading and/or once loading is complete, the system may store information from the mapping process in the mapping dataset, including an ID of each ULD and/or the one or more RFID sensors associated with each of the ULDs.

Figures 14, 15:
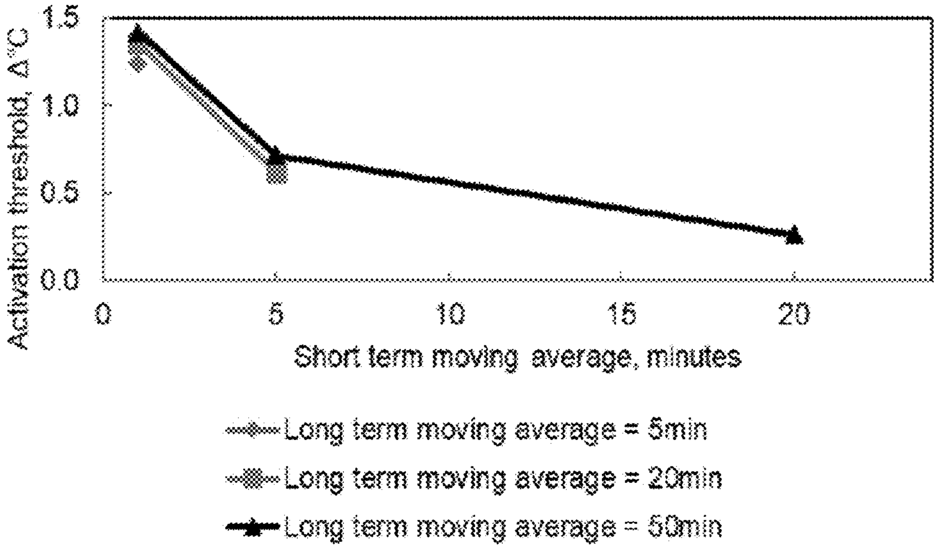

In a preferred embodiment, the system may then at step 534 associate each of the ULDs within the cargo compartment with at least one reference ULDs and store this information in the mapping dataset. The reference ULD is preferably one or more adjacent ULD(s). As can be seen in FIG. 2A, eight containers have been loaded into slots C1-C8 of the front cargo compartment. Moreover, C2 can serve as the adjacent reference ULD for C1, and C1 and C3 can serve as the adjacent reference ULDs for C2, etc. In the configuration of FIG. 14, ULD3 has five adjacent reference ULDs. In other configurations, a ULD may have as many as eight horizontally adjacent reference ULDs. Containers may be stacked onto each other and may therefore also have associated therewith up to eighteen vertically adjacent reference ULDs. Additional insight may be gleaned from additional layers of reference ULDs beyond the first adjacent layer. For example, as shown in FIG. 2A, ULD in slot C3 would have two first reference layer ULDs (C2 and C4), and two second reference layer ULDs (C1 and C5). Tracking physical parameters in this regard may provide insight into the extent and severity of a fire. Impact and severity may be presented visually in colors indicative of degree. For example, a ULD depicted in red could represent the source of the fire, a ULD depicted in yellow could represent ULDs impacted significantly by the fire ULD (e.g., +20-40 degrees C for the duration of predicted fire), and green could represent ULDs with little or no impact (e.g., <20 degrees C). The severity may be used by the system to tailor and control the suppression in response to fire detection, and to monitor effectiveness of the suppression system.

As discussed above, the confines of a cargo compartment may create dead spots because the RFID tag closest to the reader antenna may not be sufficiently aligned. The system may be configured to recognize that an RFID tag tracked during loading of ULDs is missing when the cargo compartment has been completely loaded and may adjust system parameters in an effort to activate/communicate with the missing RFID tag. For example, with reference to FIG. 3A, the transmit power at one or more neighboring antennas may be increased temporarily to trigger a response from the missing RFID tag. If a response is received, the system may store the system parameters that triggered the response for later use. Similarly, the antennas may be movably installed within the cargo compartment, for example on rails or pivots, that allow the antennas to be moved and/or redirected automatically based on signal strength to trigger a response from missing tags.

Once the ULD RFID tags are accounted for, the system may then at step 536 begin and/or continue measuring and logging physical parameter readings within the ULDs, captured by each of the RFID tags associated therewith, for the desired period of time and frequency. As discussed herein, the physical parameters, particularly temperature, will change as the aircraft travels along the route. Accordingly, the system logs the temperature and any other physical parameter for each ULD, preferably for at least the duration of the flight. In a preferred embodiment, the system measures a plurality of instances of temperature in one or a plurality of "test" ULDs over a first period of time, using at least a first RFID sensor installed on or in the at least one test ULD, and in one or a preferably a plurality of other, reference ULDs over a second period of time, using at least a second RFID sensor installed on or in the one or plurality of reference ULDs.

Once sufficient data has been obtained from at least the first and second RFID sensors, the system may execute a multiple time-series-based, trend-following algorithm that uses a rate of rise (ROR) temperature differential a time determining therefrom a rate of rise (ROR) temperature differential between the plurality of instances of temperature from the at least one first RFID sensor associated with the test ULD and the plurality of instances of temperature from the at least one second RFID over the first period of time associated with the one or plurality of reference ULDs. In one embodiment, this entails at step 538 continually calculate short- and long-term moving averages lines, and the MACD heat detection and signal lines of the one or more of the physical parameters, e.g., temperature, captured for each of the ULDs, including the test ULD and the reference ULDs. The MACD line is calculated by subtracting the long-term moving average from the short-term moving average of temperatures or other physical parameter for each of the test ULDs. The signal line is similarly calculated by subtracting the long-term moving average from the short-term moving average of temperatures or other physical parameter for each or each set of the reference ULDs associated with the test ULD.

As discussed below, the 5-20-min and 20-50-min MA configurations emerge as optimal choices, each catering to distinct operational needs. The 5-20-min MA effectively responds to rapid temperature increases, while the 20-50-min MA is better suited for responding to slowly developing fires. In this regard, the system may calculate a plurality of MACD and signal lines, at least one for each type of fire. Moreover, the system may dynamically apply different durations for the short- and long-term MA in succession, for example, by initially using a 1-5-min MA configuration for rapid baseline establishment, followed by a transition to the 5-20-min MA to maintain heightened sensitivity while improving detection reliability. As the flight progresses and baseline measurements stabilize, combining the 5-20-min MA and 20-50-min MA configurations can offer a balanced solution, effectively monitoring quick and slow-developing fires.

A histogram line for heat detection, which represents the difference between the MACD and signal lines, may then be calculated for each of the test ULDs at step 540. The histogram line for heat detection indicates the temperature differential between the fire and reference ULDs. A larger bar on the histogram line in heat detection could signify a growing temperature differential between the fire and reference ULDs, potentially indicating a thermal hazard. Conversely, smaller bars or a reducing histogram line could represent a narrowing temperature differential and indicate stabilizing conditions. In this regard, the value of the histogram line may be used to trigger and control a warning or alarm, and/or fire suppression. Accordingly, the system may determine whether the fire detection activation threshold has been exceeded at 542 and generate a control signal that is communicated to the alarm panel and/or the fire suppression system of the aircraft or cargo vessel at step 544. The process may be repeated at steep 546 until stopped at step 548.

The present invention is described in the following Examples, which are set forth to aid in the understanding of the invention, and should not be construed to limit in any way the scope of the invention as defined in the claims which follow thereafter.

Example

In this application, MACD is adapted to analyze temperature trends within ULDs, enhancing the ability of fire detection systems to better detect heat changes indicative of fire events, and use those detections to trigger appropriate responses, including fire warnings and suppression. Alongside the test RFID heat detection system, the investigators incorporated a light obscuration smoke detection system outside the ULDs in the experimental configuration. This setup simulates traditional smoke detection systems typically found in aircraft cargo compartments to directly compare the novel heat detection system disclosed in the present application and conventional smoke detection systems. Data from these tests were used to evaluate their respective performances in aircraft cargo compartments.

Three fire scenarios were evaluated, including controlled simulated fires using heaters and smoke generators, smoldering fires using wood pellets and an insulated pipe, and hazardous material fires using lithium-ion batteries that undergo thermal runaway.

Figure 6:
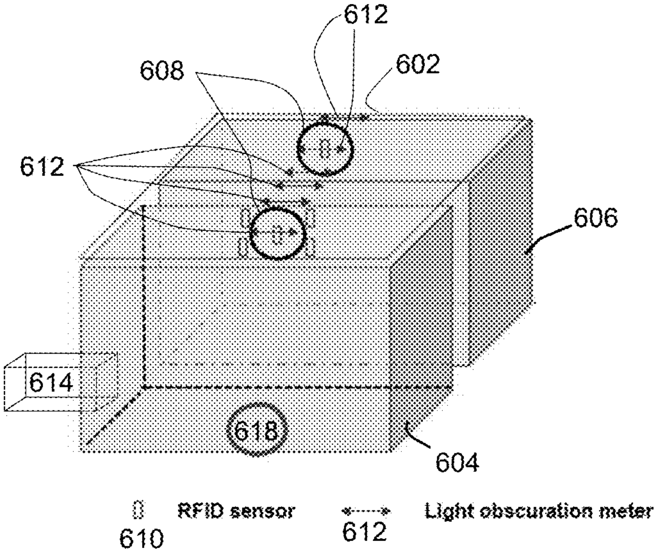
FIGS. 6-38 depict several graphs and charts generated from the experimental setup of a heat-based fire detection system according to one embodiment of the systems disclosed herein.

FIG. 6 illustrates the experimental setup. The setup included a flat plate 602, vinyl curtains along the perimeter of the flat plate 602 (not depicted), fire ULD 604, reference ULD 606, UHF RFID antennas 608, UHF RFID temperature sensors 610, and light obscuration meters 612.

The flat plate 602 functions as a mock cargo compartment ceiling, which simulates the impact of the limited headspace within and the construction of the cargo compartment on the UHF RFID signal propagation. Additionally, a vinyl curtain was installed to hang from an end of the flat plate 602 to simulate a curtain wall within the compartment. The flat plate 602 and the draped vinyl curtain collectively provided a mock cargo compartment. The fire ULD 604 contained the different fire scenarios (discussed below) for evaluating the responsiveness of the heat detection system to temperature changes. At the same time, the reference ULD 606 remained empty and provided baseline temperature measurements for the application of the heat detection algorithm in accordance with this disclosure. UHF RFID antennas 608 were attached to the mock cargo compartment ceiling directly over the center of the two ULDs 604, 606. Additionally, both ULDs contained several UHF RFID temperature sensing tags 610. Light obscuration meters 612 were mounted on the flat plate 602 to mimic the functionality of smoke detectors in aircraft cargo compartments, as shown in FIG. 6, enabling direct comparison between internal heat detection and external smoke detection methods in aviation cargo environments. The experiments were conducted on AAY type ULDs, but the methodology and findings from this study are equally to other types of ULDs.

Description of Test Scenarios

Three fire scenarios within aviation ULDs were evaluated with the test RFID heat detection system, with each scenario assessing the system's response to different fire conditions and offering a comparative analysis against traditional smoke detection systems.

Controlled Fire Scenario

The controlled fire scenario is believed to be critical in evaluating the RFID heat detection system. This scenario employed a heater 618 and a smoke generator 614 to simulate fire situations within a ULD, providing a controlled and measurable environment. Monitoring quantity of heat and smoke introduced into the ULD provides a benchmark to compare the responsiveness of the RFID heat detection system and the traditional smoke detection system.

A heater 618 and a smoke generator 614 simulated varying fire situations within a ULD in the controlled fire scenario. The heater, located centrally on the ULD's floor, was used to adjust heat output via a variable AC transformer. Simultaneously, an externally placed smoke generator 614 was used to introduce cold smoke inside the ULD, as shown in FIG. 6. Placing the smoke generator 614 externally allowed for heat and smoke inputs to be introduced as independent variables for a more precise assessment. For testing, the smoke generator 614 produced an aerosol for 60 seconds, which aligns with certification regulations. A Concept Aviator 440 smoke generated, operated at 14 psig of CO2, was used for these tests. The smoke generator 614 used reflects standardized smoke output and ensures the scenario's relevance to operational conditions.

Smoldering Fire Scenario

The smoldering fire scenario was used for evaluating the RFID heat detection system's aptitude in detecting slow-burning fires, which are hazardous due to their tendency to escalate unnoticed with the smoke detection systems currently being used in aircraft cargo compartments. This scenario used a vertical aluminum pipe (15.24 cm diameter, 58.88 cm length) filled with 620 g of low ash hardwood pellets, which were ignited from the bottom with a propane hand torch. To aid in sustaining the smolder, the pipe was insulated with 5.08 cm thick Mineral Wool, which has an R-value of 8.7. This insulation helped maintain the fire's intensity without external heat sources.

This scenario used a type K thermocouple positioned 10 cm above the pipe's base to monitor the smoldering process. The decision to move the pipe into the center of the ULD is based on achieving a self-sustaining smolder, as indicated by the thermocouple readings. This determination involves a nuanced judgment, balancing the need for a low starting temperature with the requirement for the smolder to be self-sustaining. Moving the pipe prematurely into the ULD can result in the smolder self-extinguishing if the temperature is not sufficiently high to maintain it.

Lithium-Ion Battery Scenario

Given the prevalence of transporting lithium batteries aboard cargo aircraft, a lithium-ion battery fire scenario was mandatory. Lithium batteries are prone to thermal runaway. Thermal runaway is a process where batteries overheat and can trigger adjacent batteries to do the same. This scenario showed the effectiveness of both the heat detection system and the smoke detection system in identifying and responding to such hazardous conditions, providing a comprehensive assessment of their respective capabilities in detecting fires caused by thermal runaway in lithium-ion batteries.

The lithium-ion battery fire scenario used two LCO pouch cells, each fully charged with capacities of 5.48 Wh and 6.6 Wh, respectively. Insulation surrounding the cells was installed to ensure that both cells would go into thermal runaway. In this setup, a user-activated relay was used to trigger a short circuit in the cells, resulting in thermal runaway. This scenario was used to assess the ability of the RFID-based heat detection system to identify and respond to lithium-ion thermal runaway in comparison to the performance of smoke detection systems currently being used in aircraft cargo compartments.

The Experimental Setup

The experimental setup for this research was designed to replicate the conditions found in aircraft cargo compartments and to assess the efficacy of using UHF RFID-based heat detection system under such conditions, and to compare performance thereof with traditional smoke detection methods in aircraft environments. The setup generally involved the creation of a mock cargo compartment enclosure with two ULDs.

Mock Cargo Compartment Ceiling Setup

The mock cargo compartment ceiling included a flat aluminum plate 602, measuring 6.1 m×3.7 m×2.1 mm (L×W×H). This ceiling was positioned 7.6 cm above the ULDs 604, 606 and was wrapped in a vinyl cover along its perimeter to maintain a controlled environment. The setup aimed to mimic the conditions of an actual aircraft cargo compartment to the extent possible, ensuring the relevance and applicability of the test results.

ULD Configuration

The test setup used two distinct ULDs: a fire ULD 604 and a reference ULD 606. The fire ULD 604 contained either controlled or real fire scenarios, along with a light obscuration meter to gauge smoke production, and UHF RFID temperature sensing tags for monitoring heat generation. In contrast, the reference ULD 606 was used as a control unit without heat input and with a temperature sensor to record the baseline temperature. This baseline data from the reference ULD 606 proved valuable in reducing false alarms, providing a comparative metric for the readings acquired from the fire ULD 604. ULD 604 was made of a radio translucent composite material. ULD 606 was made of an aluminum ceiling and polycarbonate sides. The aluminum ceiling of ULD 606 was modified by cutting a square and replacing it with a polycarbonate square and the RFID tags were placed on the polycarbonate square. This shows it is feasible to modify aluminum ULDs so that they can read RFID tags located internally, but non-interference with the requirements in Technical Standard Order (TSO) C90e may need to be shown. As discussed herein, remote antennas located outside of the ULD may be used to avoid such issues.

Instruments Used in Research

This study evaluated the effectiveness of two fire detection approaches by comparing a UHF RFID heat detection system with sensors positioned inside ULDs with existing light obscuration-based systems that simulate the traditional smoke detectors found in aircraft cargo compartments, specifically for detecting fires that start within a ULD. The test setup used existing UHF RFID hardware for data collection, such as RFM3200 temperature sensing tags, a SensArray Core RFID reader, and a SensRF-101 external antennas. The traditional smoke detection system included a laser diode and an ultraviolet-visible spectroscopy (UV/VIS) sensor.

The RFM3200 temperature sensing tags were installed at various locations on the inside of ULDs 604, 606 to monitor the ambient thermal conditions. This installation brings the temperature-sensing tags closer to potential fire sources than ceiling-mounted smoke detectors. These general-purpose temperature sensing tags use an integrated radio frequency (RF) antenna for energy harvesting and data transmission. One or more special purpose tags that place the sensor portion of the tag(s) lower into the ULD closer to the fire and the antenna portion on the ceiling, closer to the reader antenna are better suited for this task. The SensArray Core RFID reader was connected to the SensRF-101 external antenna. The reader and external antenna were both positioned at the cargo compartment's ceiling, approximately above tags within the ULD. In this setup, the temperature sensing tags actively collect, decode, and translate temperature signals into temperature measurements. The sensor generates temperature data, the antenna facilitates its wireless transmission, and the RFID reader decodes it for further analysis and action by the system.

The RFM3200 is a wireless, battery-free temperature sensor. This sensor has dimensions of 31.9×101.7 mm. The standard operating temperature ranges from −40 °C to +85 °C. This sensor has a flexible design and an adhesive backing. The sensor operates within the Federal Communications Commission (FCC) and European Telecommunications Standards Institute (ETSI) frequency standards. It requires a RAIN-compliant reader for its functionality. It incorporates an integrated RF antenna for two purposes. The first is to harvest energy necessary for its temperature-sensing functionality, and the second is to facilitate communication with an RFID reader. The antenna's configuration makes it insensitive to moisture and dirt. However, it is not suitable for use on metal. For metal containers, an RFID tag that penetrates the container ceiling to place the antenna thereof outside of the container may be used.

The RFM3200 temperature sensing tags are powered and read by the Magnus S3 IC chip integrated within the tags. The chip encompasses a 64-bit tag identifier (TID) memory, which offers a permanent, factory-set, unique serial number for each tag. The chip also includes a 160-bit electronic product code (EPC) memory that supports up to 128-bit EPC. The EPC is a globally unique identifier for a specific item, often used in tracking and inventory management applications.

Beyond these identifiers, the Magnus S3 chip generates a temperature code, signifying the chip's temperature. For accurate readings, it is important to factor in the reader's transmission frequency, power received by the sensor, averaging of readings, and command timing. Each chip contains single-point calibration data in its user memory. The calibration translates the temperature code into Celsius readings. Averaging multiple readings can help reduce noise or fluctuations in the temperature code.

The chip further generates a received signal strength indicator (RSSI) code based on a measure of the power level that the chip receives from the reader. This metric can be used to gauge the accuracy of temperature and sensor readings. Stronger signals yield more precise data interpretation when within the recommended RSSI range. However, deviating from this range can have notable impacts. If the RSSI code exceeds the recommended maximum, it can lead to power distortion, potentially causing communication failures between the reader and the chip. Conversely, if the RSSI code falls below the minimum threshold, it might result in missed reads due to insufficient signal strength.

The system may be configured to manage power so that the RSSI code is maintained within the optimal range in RFID systems utilizing Magnus S3 chips. In situations where the placement of sensor tags and readers is stable, the reader's power can be set to a level that aligns with the recommended RSSI code and kept constant. In more dynamic environments, the reader may be configured to adjust its power dynamically to ensure the RSSI code stays within the desired range. The system may also use a select command to filter tag responses based on their received power levels, ensuring only tags within the appropriate power range respond and/or the data therefrom used for detection.

The SensArray Core is a fourth-generation Enterprise Platform Integration Core (EPIC) RFID reader and antenna system, which operates under the radio frequency identification and networking (RAIN) protocol. It features an 8.5 dBic internal antenna and three additional antenna ports. It incorporates a 4 in/4-out 30 W powered general-purpose input/output (GPIO) subsystem, powered through power over ethernet plus (PoE+) inputs ranging from 30 W to 90 W. The device communicates via transmission control protocol/internet protocol (TCP/IP) using a registered jack-45 (RJ-45) connector. It consumes 13 W when active and 3 W in idle mode. Its operating frequencies align with either FCC or ETSI guidelines. With dimensions of 25.4×25.4×2.0 cm and weighing 0.79 kg, it operates effectively within a temperature range of 0 °C to +50 °C.

The SensRF-101 is an external antenna designed for use with the SensArray Core. It has a 70-degree full width at half maximum (FWHM) beamwidth and a nine dBic directivity. It utilizes right-hand circular polarization (RHCP). The antenna features a 10 W power limit, a 50 Ohm input impedance, and a voltage standing wave ratio (VSWR) with a typical value of 1.2 and a maximum of 1.33. The construction is primarily polycarbonate and measures 25.4×25.4×2.4 cm. The SensRF-101 connects to the RFID reader through a sub-miniature version A (SMA) connector. Given the proximity of the cargo compartment ceiling to the top of the ULDs, the system may benefit from directional reader antennas with the widest beamwidth, and/or positioning of the tag antennas horizontally closer to the approximate location of the reader antenna, and/or vertically lower into the ULD, further from the reader antenna. Alternatively, the antenna may be placed vertically aligned with and directed horizontally toward the tag antenna. In this setup, the location of the tag antenna on the ceiling of the container poses less of an issue.

In addition to the UHF RFID-based heat detection system described above, this research also used a light obscuration system for detection of ULD fires from the outside of ULDs to simulate traditional cargo compartment smoke detection systems. This light obscuration system used a 2.3 mW, 670 nm laser diode and a high-sensitivity USB UV/VIS sensor. The laser diode functions within a temperature range of −10 to +40 °C. and requires a separate power supply. At the same time, the UV/VIS sensor, connected through a 2.5 m cable to a USB interface, discerns power between 10 μW and 100 mW over a wavelength spectrum of 325-1065 nm. This setup allowed for measuring smoke density under varied fire scenarios, with calibration set to sound an alarm upon reaching a 12.5% obs/m light obscuration threshold, in accordance with TSO Cle criterion for optical smoke detectors.

Instrument Installation

Two UHF RFID reader antennas 608 were placed directly, one above each ULD, for data acquisition, as shown in FIG. 6. Antenna positioning was important for optimal data collection from the UHF RFID temperature sensing tags within the ULDs, given the limitations of the off-the-shelf systems used for testing. This setup ensures the accuracy and reliability of the data for evaluating the performance of the RFID-based heat detection system.

In the fire ULD 604, temperature sensing tags 610 were positioned at the ceiling center to monitor temperature variations during the test scenarios. On the interior ceiling at the center of the ULD 604, there was one sensor directly on the surface (0 mm) and four additional temperature sensing tags at varying heights down from the ULD ceiling of 6.4 mm, 25.4 mm, 50.8 mm, and 76.2 mm. These mounts were spaced from the ceiling to minimize heat loss from conduction to the ULD surface, ensuring more sensitive temperature readings within the ULD 604. Furthermore, an exterior ceiling sensor was installed at the ULD center surface (−3.175 mm) to accommodate the RFID reading limitation through metal. Conversely, the reference ULD 606 has a single interior ceiling sensor mounted at the ceiling center (6.4 mm) to gauge the baseline temperature. This reference temperature provides a comparative measure for the experiments conducted.

Figure 7:
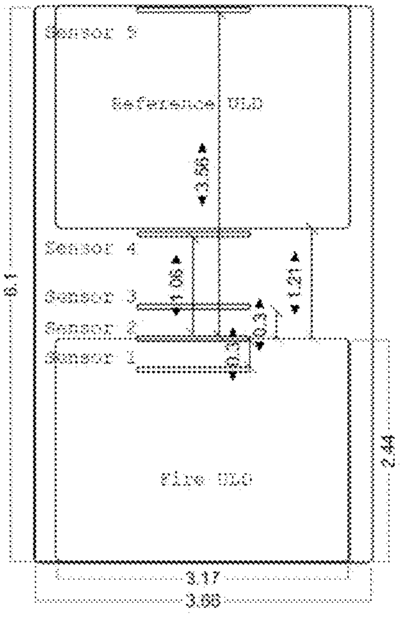

The test setup for smoke detection included light obscuration meters 612, each equipped with 2.3 mW 670 nm laser diodes and silicon photodiode light sensors. These devices measured the degree of light obscuration, which indicates smoke presence. One of these light obscuration meters 612 was mounted on the ceiling of the fire ULD, positioning the lasers and light sensor 1.2 meters apart. An additional five meters 612 were mounted at various distances from the fire ULD door along the mock cargo compartment ceiling. These distances are −0.3 m, 0 m (directly above the ULD exit), +0.3 m, +1.06 m, and +3.34 m, as shown in FIG. 7. This ensures a comprehensive assessment of the smoke spread from the fire source. The consistent 1.2-meter spacing between each laser and sensor pair provides uniform light obscuration measurements across the entire setup. The smoke detection system was set to trigger an alert when the light obscuration level reaches a threshold of 12.5% per meter.

Smoke Detection Analysis

The smoke detection approach in the test setup used light obscuration meters 612 placed within the fire ULD 604 and on the ceiling 602 of the mock cargo compartment to measure light obscuration as an indicator of smoke presence. These meters quantitatively assessed the density and presence of smoke particles under varied fire scenarios. This setup continuously collected data at a rate of 1 Hz.

The Beer-Lambert law was used to calculate light obscuration per unit length during the test as follows:

$$O_u = \left[1 - \left(\frac{T_s}{T_c}\right)^{\frac{1}{d}}\right]100$$

Where, $O_u$ is the percent obscuration at distance d, d is the distance between the laser diode and the photodiode, $T_s$ is the aerosol density meter reading with smoke, and $T_c$ is the aerosol density reading with clear air.

A valuable metric in this analysis involves measuring the time it takes from test initiation to reach the 12.5 percent light obscuration per meter (% obs/m) threshold. This lapse in time is the smoke detection time. The threshold aligns with the UL 268 safety standard guidelines for fire alarm system smoke detectors. This threshold allows a fair analysis of the RFID heat detection system's performance against existing smoke detection systems in aircraft cargo compartments under various fire scenarios.

Heat Detection Analysis

Heat detection within ULDs is essential for early detection and mitigation of fire incidents. The innovative use of the MACD method, as disclosed herein, enhances the sensitivity and timeliness of heat detection systems.

During these experiments, the RFID-based heat detection system gathered an average of 15 temperature measurements for each tag within a 15-second interval. The RFID system was purposely stressed with extra tags to simulate a more demanding operational environment, aligning with the study's goal to validate the implementation of UHF RFID temperature sensing tags in ULDs. While this study used only two ULDs, operational applications would typically involve instrumenting more ULDs. Therefore, two antennas read twenty-two tags to replicate these more complex conditions. However, the analysis focused only on the relevant seven tags outlined above. The RFID readers collected temperature data for one hour before initiating the fire scenarios to collect baseline data for MACD analysis both for the fire and reference ULDs.

MACD for Heat Detection

The researchers have determined that MACD is a valuable tool for monitoring temperature variations within ULDs. This novel application of MACD in heat detection works through three fundamental components: the MACD line, signal line, and histogram line.

To calculate the MACD line for heat detection, the long-term moving average is subtracted from the short-term moving average of temperatures within the fire ULD. A rising MACD line suggests that the short-term momentum is outpacing the long-term momentum, which might indicate an escalation in temperature or a fire event. In contrast, a falling MACD line could signal a decrease in temperature or effective fire suppression.

The signal line for heat detection is the difference between a short-term moving average and a long-term moving average of temperatures within the reference ULD. It is a comparative reference to the MACD line, distinguishing between normal and abnormal temperature variations. Although one reference ULD is used for these experiments, the use of multiple reference ULDs may provide a better view of the temperature variations within the cargo compartment or in other cargo departments of the same aircraft.

The histogram line for heat detection represents the difference between the MACD and the signal lines. It indicates the temperature differential between the fire and reference ULDs. A larger bar on the histogram line in heat detection could signify a growing temperature differential between the fire and reference ULDs, potentially indicating a thermal hazard. Conversely, smaller bars or a reducing histogram line could represent a narrowing temperature differential and indicate stabilizing conditions.

In ULD heat detection, the MACD line's relative position to the signal line and its impact on the histogram were important indicators. For example, a rising MACD line above the signal line could indicate a rising temperature trend and a fire within a ULD. Conversely, a descending MACD line towards the signal line could indicate a cooling temperature trend and fire suppression within a ULD.

An aspect to acknowledge when adapting MACD for heat detection is its nature as a lagging indicator. This implies that the MACD bases its insights on historical data. As a result, its indications are confirmatory rather than predictive. It verifies the establishment of a trend rather than its start. In the context of heat detection within ULDs, this lagging nature of the MACD does not detract from its efficacy. Instead, it offers dependable confirmation of ongoing temperature trends.

MACD Heat Detection Test Example

The data collected by the researchers highlights the effectiveness of MACD in identifying temperature changes and trends over time. In the accompanying FIGS. 8-12, each figure contains temperature data during an 89 W heating scenario initiated at time 0 seconds.

Figure 8:
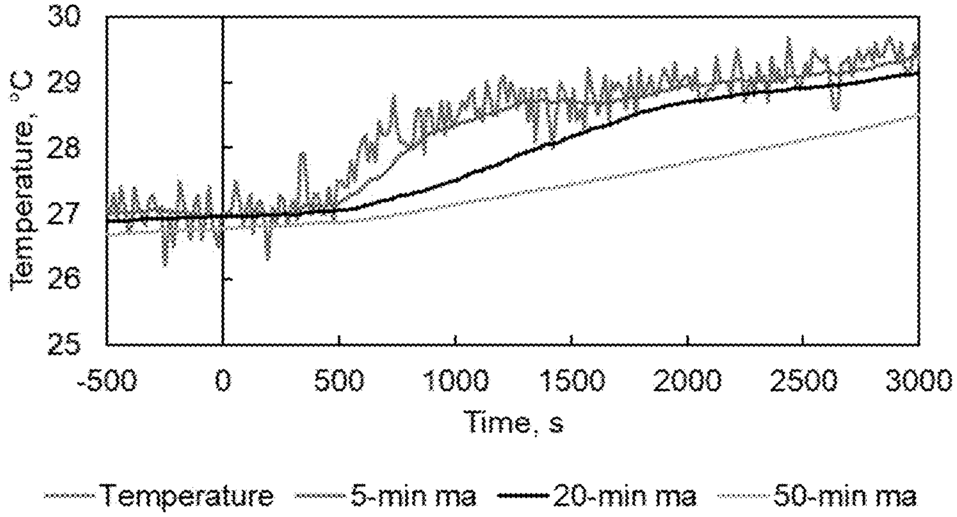

FIG. 8 shows the raw temperature data and the 5-min moving average (MA), 20-min MA, and 50-min MA. The main observations are that this approach can effectively smooth short-term temperature fluctuations with moving averages while preserving the sensitivity to more significant temperature trends. The shorter moving average reflects short-term temperature movements and is more responsive to recent temperature changes. The more extended moving average represents longer-term trends and is less sensitive to short-term temperature fluctuations.

Notably, the maximum observed temperature of 30 °C. and the rate of temperature rise of 0.4 °C./min are well beneath the typical thresholds of heat-based fire detectors, which are 57 °C. and 6 °C./min, respectively. This highlights the limitations of traditional heat detection methods in identifying early-stage fire development.

Figure 9:
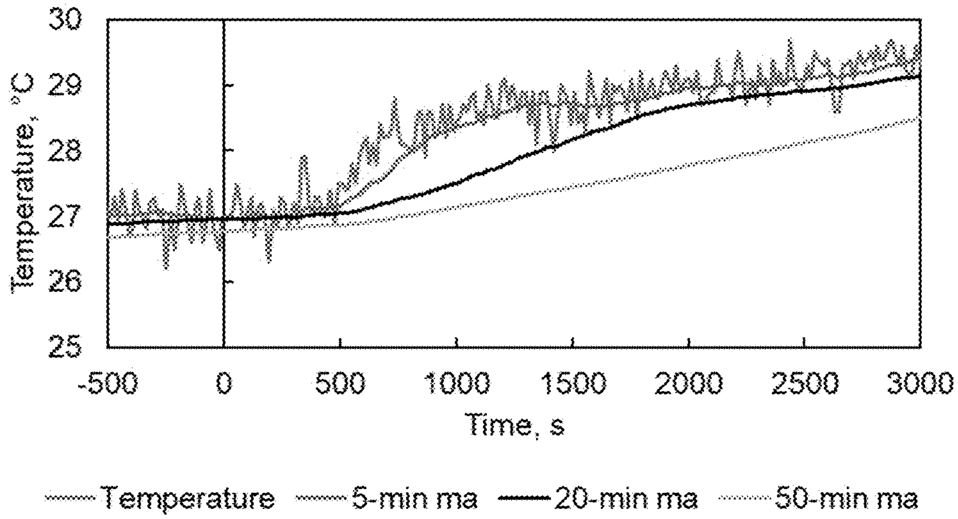

FIG. 9 illustrates the relationship between time and temperature. It includes legends indicating the short-term (5-min) and long-term (20-min) moving averages and the MACD 5-20-min MA. The secondary axis represents the time against the temperature differential between the short-term and long-term moving averages.

Figure 10:
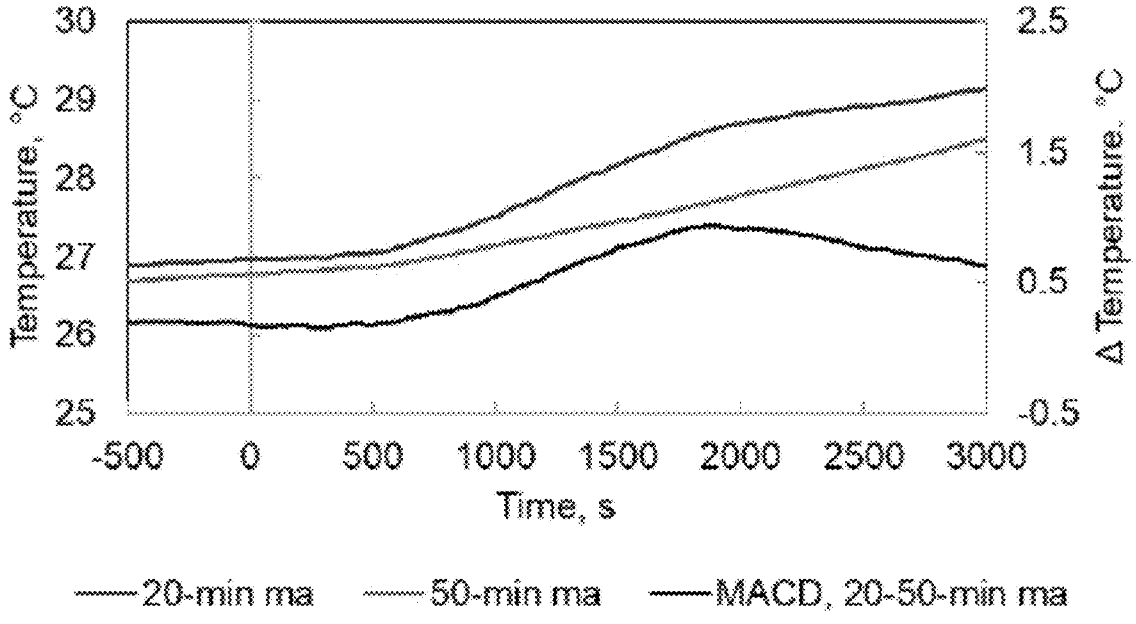

FIG. 10 also shows the correlation between time and temperature. It features legends denoting the short-term (20-min) and long-term (50-min) moving averages and the MACD 20-50-min MA. Similarly, the secondary axis is time against the temperature differential between the short and long-term moving averages.

FIG. 9 and FIG. 10 show the MACD line's capability to detect momentum changes by determining whether recent temperature trends deviate from long-term trends. This MACD representation also normalizes the temperature fluctuations over time. Data normalization yields a more straightforward comparative analysis of temperature trends between ULDs. It is of note that the 5-20-min MACD responds quicker than the 20-50-min MA MACD. However, it also has more fluctuations.

Figure 11:
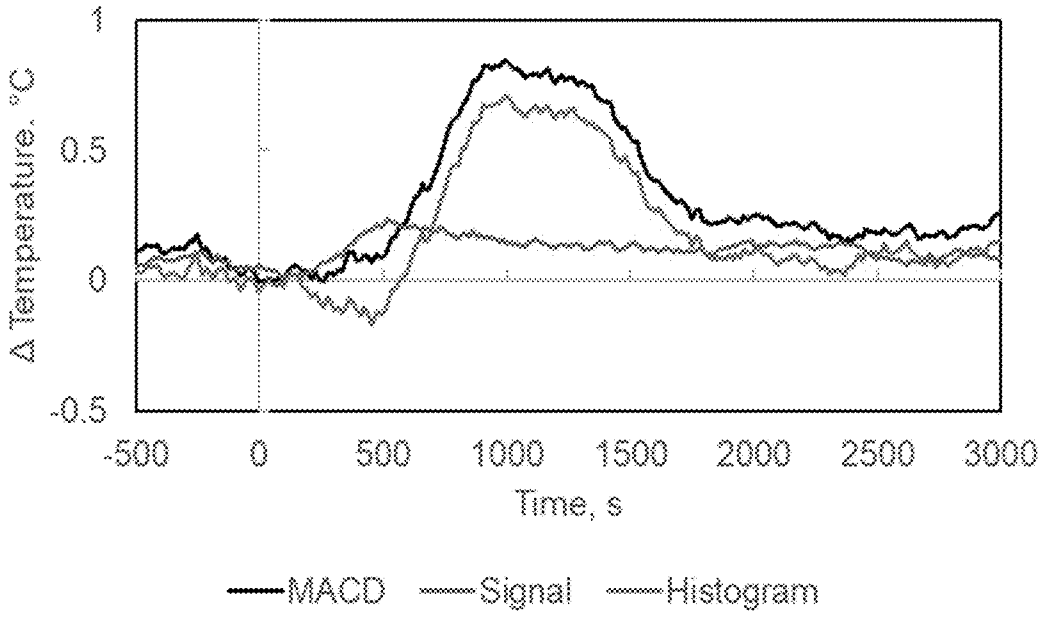
Figure 12:
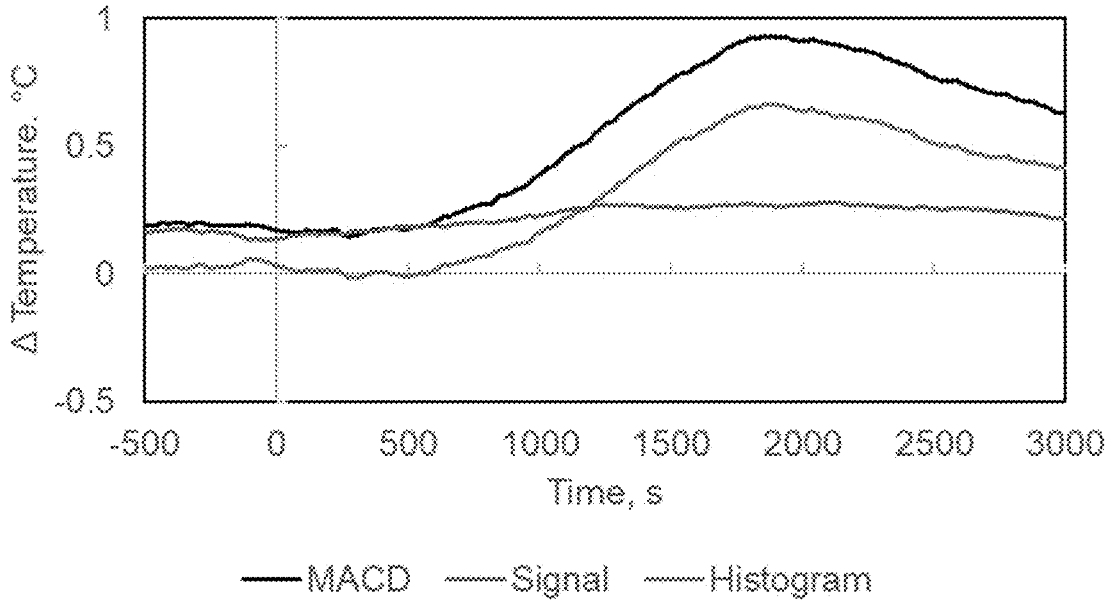

FIG. 11 and FIG. 12 show time against temperature differential, with legends indicating the MACD line for the fire ULD, the signal line for the reference ULD, and the histogram line, which is the difference between the MACD and signal lines.

FIG. 11 uses the 5-20-min MA, and FIG. 12 uses the 20-50-min MA.

The histogram line is a near real-time indicator of the temperature trend differential between the fire and reference ULDs. This temperature differential can be vital for minimizing false alarms. Initially, the MACD and signal lines remain parallel until the onset of heating in the fire ULD. The small temperature differential signifies a consistent temperature trend in both ULDs. Additionally, both lines are above zero before heat initiation, indicating an upward temperature trend within the mock cargo compartment, with minimal difference between them, as depicted by the flat histogram line. An observable divergence occurs between the MACD and signal lines within the fire ULD as the rising histogram line captures the heating effect. The divergence indicates a temperature differential between the fire and reference ULDs and may be vital for accurate heat detection.

The MACD heat detection algorithm displays an exceptional ability to recognize subtle changes in temperature trends within ULDs, highlighting its advantage over traditional heat detector algorithms that rely on fixed temperature or rate-of-rise thresholds. This sensitivity allows the MACD algorithm to detect early-stage fire development that might not trigger conventional heat detectors, which typically activate at higher temperature thresholds, such as 57 °C., or significant rates of temperature rise, around 6 °C./min. The nuanced approach of the MACD, employing moving averages to smooth short-term fluctuations while remaining attuned to significant temperature shifts, ensures a more refined and responsive detection mechanism. This capability offers a significant advantage for early fire detection, where the early identification of incremental temperature increases can lead to timely interventions, potentially averting larger-scale fire incidents.

MACD Heat Detection Performance Metrics

The term "sensor response" refers to the behavior of the histogram line. This histogram line, derived from the MACD heat detection analysis, has unexpectedly proven to be an important variable in identifying and quantifying temperature variations within the ULDs. The metrics discussed here are based on the analysis of this histogram line, offering a precise method to evaluate the RFID heat detection system's performance under varying thermal conditions.

The term noise refers to the random temperature fluctuations observed in the collected data. These fluctuations do not contribute to the overall trends within the ULDs but may reflect minor environmental changes, sensor inaccuracies, or other unknown factors. Identifying and quantifying the noise is essential for the data analysis because it helps distinguish between genuine temperature variations and false alarms.

The activation threshold is another important metric defined as a deviation in sensor response exceeding fifteen standard deviations (15σ) from the norm during a predetermined duration, for example, 11 hours in ambient conditions. This methodology acknowledges the presence of random temperature fluctuations inherent in the data due to minor environmental changes, sensor inaccuracies, or other indeterminate factors. Setting the activation threshold well above the noise level ensures that only substantial and sustained temperature changes trigger an alert, reducing the likelihood of false alarms. This approach effectively filters out minor temperature variances that do not correlate with the fire risk, focusing on statistically significant deviations likely to represent a real threat. The algorithm should also account for variable conditions during flight. Specifically, the MACD differential between individual ULDs and their neighboring ULDs accounts for changes in temperature during flights.

Maximum sensor response measures the peak response of the histogram line with heat added to the fire ULD. It represents the apex of temperature variation detected by the RFID heat detection system during the test scenario. Evaluating the maximum sensor response may be used for assessing the system's sensitivity and responsiveness to increasing thermal conditions within the ULD.

The detection time calculates the duration from the initiation of heat within the fire ULD until the histogram line crosses the activation threshold. This metric captures the timeliness of the heat detection system in identifying and responding to adverse thermal conditions.

Figure 13:
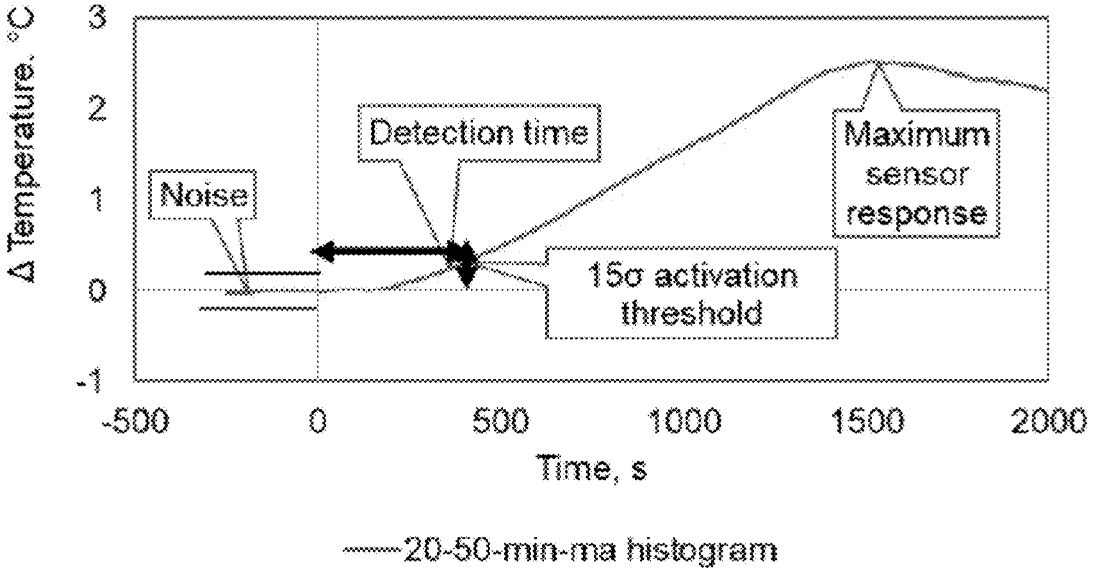

FIG. 13 exemplifies these concepts by illustrating time against temperature differential for a 337 W test. The heater in this test starts at zero seconds. The figure highlights three parameters: maximum sensor response (indicating peak temperature variation), the 15σ activation threshold (defining the detection benchmark), and detection time (showing the system's speed in identifying threshold-exceeding signals). These parameters were used for evaluating the heat detection system's effectiveness and capacity for timely and accurate detection in varying operational scenarios.

MACD Heat Detection Operational Use

In operational use, the adaptation of MACD for heat detection in ULDs employs a dynamic approach to identify potential fire hazards. Initially, each ULD operates as an independent sensor, analyzing its temperature fluctuations and as part of a communal baseline for comparative analysis. This dual functionality significantly enhances the network's sensitivity and precision in identifying temperature anomalies.

The system preferably computes for each ULD its own MACD line by calculating the difference between its short-term and long-term temperature moving averages. For each ULD, the system constructs its signal line by averaging the MACD lines from its neighboring ULDs. This aggregated signal line then serves as a communal baseline, enabling the system to continuously compare each ULD's temperature trends and detect any significant deviations from the established group norm. The deviation between an individual ULD's MACD line and this communal signal line forms the histogram line. This histogram line quantifies the deviation and enables the identification of outliers potentially indicating thermal hazards. Consider ULD 3's position within a grid layout for illustration purposes, shown in FIG. 14. The signal line for ULD 3 is the average of the MACD lines from ULDs 1, 2, 4, 5, and 6, which surround it. This average provides a communal baseline for assessing ULD 3's temperature trends. The histogram line measures the temperature difference between ULD 3's MACD line and the average signal line of its direct neighbors. Therefore, the heat detection system can identify significant outliers that may pose fire risks. For example, a notable temperature increase in ULD 3, indicated by an elevated histogram value, could be used to prompt a fire alarm activation and/or suppression. Because the location of ULD3 is known, suppression efforts can be concentrated at the desired location.

This approach allows temperature monitoring for each ULD and leverages the collective data from the aircraft cargo compartment to enhance detection accuracy. Concentrating on significant deviations within this monitored network helps minimize false alarms while detecting authentic thermal hazards.

Results and Analysis

This section presents the experimental evaluation of the RFID heat detection system for fire detection within AAY type ULDs and outlines the findings from various experimental setups, examining the efficacy of moving average configurations, optimal placement of heat and smoke sensors, and the system's performance across different fire scenarios. Initial experiments focused on the heat based MACD algorithm to determine optimal parameters that enhance heat detection efficiency. Detailed analyses investigated the MACD configuration's impact on activation thresholds, sensor maximums, and detection times, providing insights into how moving average intervals can be optimized for AAY type ULDs. Furthermore, the analysis involves assessing various sensor placements to understand their effects on detection sensitivity and timeliness.

The performance of the RFID system was tested across several fire scenarios. These fire scenarios include controlled simulations of fires, smoldering incidents, and lithium-ion battery fires. The variety of controlled fire scenarios allows for a comparative assessment of the heat-based fire detector against existing smoke detection systems in aircraft cargo compartments to highlight potential advantages and limitations.

Analysis of Moving Average Configurations

The analysis of MACD presented above laid the foundation for monitoring temperature variations within ULDs, utilizing the MACD line, signal line, and histogram line. The insights from the MACD analysis are presented below, where we explore the behavior of six distinct moving average configurations under simulated controlled fire scenarios. Table A displays the six moving average configurations tested. Each composition, consisting of a short-term moving average and a long-term moving average, undergoes evaluation regarding key parameters: activation threshold, maximum sensor response, and detection time. This evaluation aimed to optimize the MACD algorithm to minimize the activation threshold, maximize the sensor response, and reduce the detection time.

TABLE A

Breakdown of Various Tested Moving Average Configurations

| Configuration | Short Term MA | Long Term MA |
|---|---|---|
| 1-5-min MA | 1-min MA | 5-min MA |
| 1-20-min MA | 1-min MA | 20-min MA |
| 1-50-min MA | 1-min MA | 50-min MA |

TABLE A-continued

| Breakdown of Various Tested Moving Average Configurations | | |
|---|---|---|
| Configuration | Short Term MA | Long Term MA |
| 5-20-min MA | 5-min MA | 20-min MA |
| 5-50-min MA | 5-min MA | 50-min MA |
| 20-50-min MA | 20-min MA | 50-min MA |

MACD Configuration and Activation Threshold Analysis

This section expands on understanding the activation threshold described above. Various configurations of these moving averages influence the thresholds required to trigger an RFID heat detection system alert. A lower activation threshold effectively reduces the needed heat to trigger an alarm. Table B tabulates the interaction between long-term and short-term moving averages and their corresponding experimental activation thresholds.

TABLE B

| Interaction Between Moving Averages and Activation Thresholds | | |
|---|---|---|
| Short Term MA | Long Term MA | Activation Threshold, Δ °C |
| 1-min MA | 5-min MA | 1.2 |
| 1-min MA | 20-min MA | 1.4 |
| 1-min MA | 50-min MA | 1.4 |
| 5-min MA | 20-min MA | 0.6 |
| 5-min MA | 50-min MA | 0.7 |
| 20-min MA | 50-min MA | 0.3 |

The activation threshold for a heat detection system responds significantly to variations in the short-term moving average. FIG. 15 shows that increasing this short-term moving average interval from 1 to 5 minutes and further to 20 minutes consistently significantly lowers the activation threshold. Transitioning from a 1-minute to a 5-minute short-term moving average particularly highlights a steep drop in the activation threshold. This trend persists across all considered long-term moving average intervals. For instance, with the long-term moving average set at 50 minutes, the activation threshold reduces from 1.42 °C. for a 1-minute short-term moving average to 0.72 °C. for 5 minutes and 0.27 °C. for 20 minutes.

Figure 16:
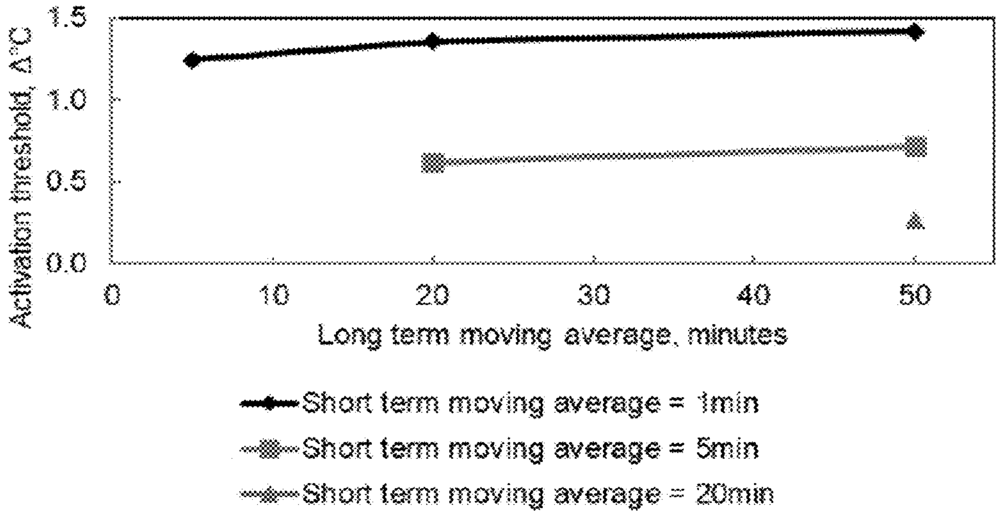
Figure 17:
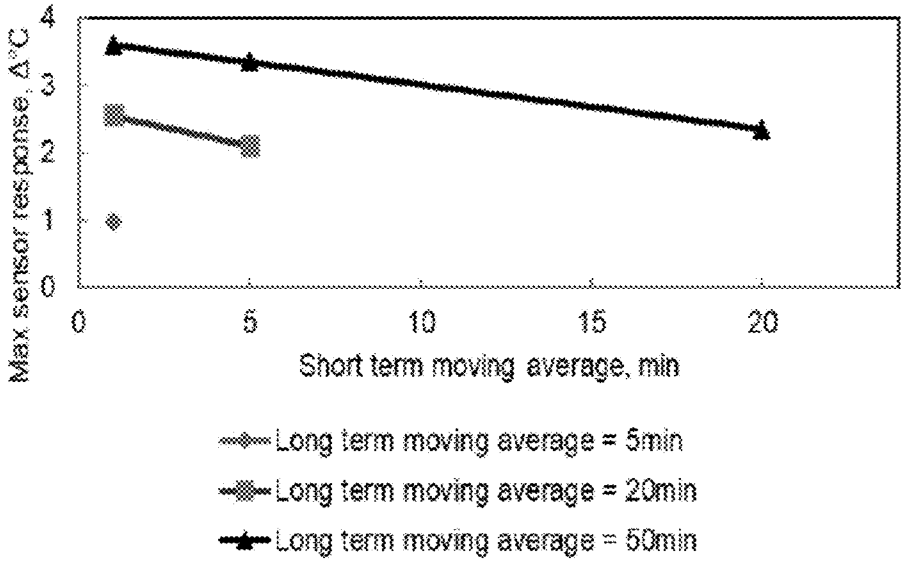

Conversely, the impact of altering the long-term moving average intervals on the activation threshold is more moderate. As shown in FIG. 16, extending the long-term moving average from 5 to 20 minutes and further to 50 minutes results in only incremental increases in the activation threshold. This is evident across all examined short-term intervals. Specifically, while maintaining a 1-minute short-term moving average, the threshold experiences a slight increase from 1.24 °C. for a 5-minute long-term moving average to 1.36 °C with a 20-minute interval. Then, it increases to 1.42 °C. for a 50-minute interval.

This data shows that the activation threshold is particularly sensitive to adjustments in the short-term moving average compared to variations in the long-term moving average. Increasing the short-term moving average duration significantly decreases the activation threshold, and increasing the long-term moving average moderately increases the activation threshold. Intuitively, increasing the length of the short-term and long-term moving averages would decrease both the activation threshold and the noise. Longer averages should smooth out fluctuations more effectively, leading to a more stable signal and a lower activation threshold.

However, the experimental results show a nuanced interaction between moving average lengths and activation thresholds. With a longer long-term moving average, the system becomes more susceptible to short-term temperature fluctuations due to its design to smooth out longer trends. Consequently, transient temperature spikes stand out more against this smoothed baseline, potentially leading to pronounced histogram bars that may not reflect significant temperature changes. The MACD's application for heat detection further amplifies this by actively comparing temperature trends between a fire ULD and a reference ULD. A longer long-term moving average can exaggerate the histogram's differential for any short-term noise not concurrently present in both ULDs, leading to discrepancies that may not signify a genuine thermal hazard.

MACD Configuration and Sensor Maximum Analysis

The maximum sensor response quantifies the highest temperature variation detected by the RFID heat detection system for a given heat input. Table C demonstrates the interaction between long-term and short-term moving average configurations and their effect on the maximum sensor response. The tabulated results are from test experiments with heat inputs of 390 W and 230 W into the fire ULD.

TABLE C

| Interaction Between Moving Averages and Maximum Sensor Response | | |
|---|---|---|
| Short Term MA | Long Term MA | Maximum Sensor Response, Δ °C |
| 1-min MA | 5-min MA | 0.99 |
| 1-min MA | 20-min MA | 2.55 |
| 1-min MA | 50-min MA | 3.60 |
| 5-min MA | 20-min MA | 2.11 |
| 5-min MA | 50-min MA | 3.35 |
| 20-min MA | 50-min MA | 2.35 |

Figure 18:
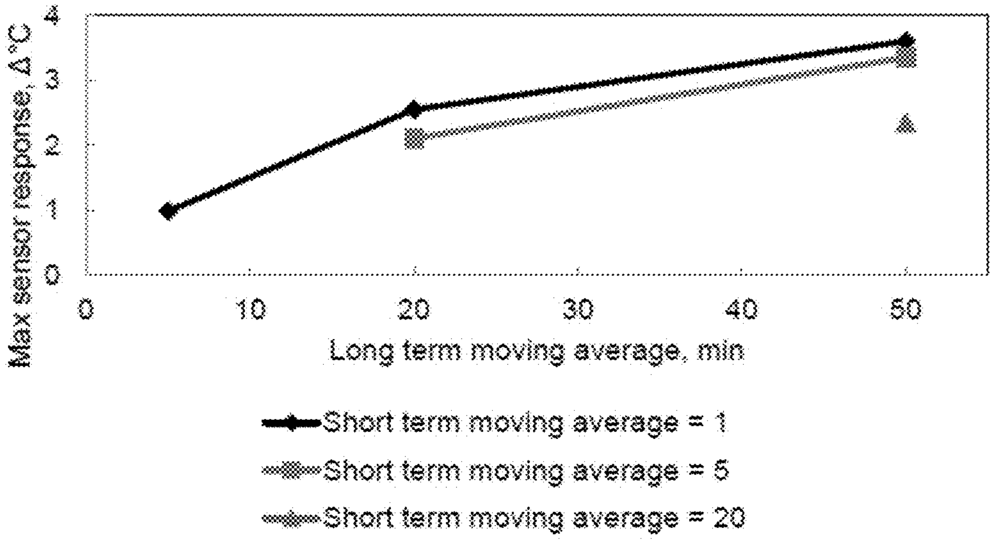

The maximum sensor response for a heat detection system responds significantly to variations in the short-term moving average. FIG. 18 shows that increasing this interval from 1 to 5 minutes and further to 20 minutes consistently significantly lowers the maximum sensor response. This trend persists across all considered long-term moving average intervals. For instance, with the long-term moving average set at 50 minutes, the activation threshold reduces from 3.60 °C. for a 1-minute short-term moving average to 3.35 °C for 5 minutes and 2.35 °C. for 20 minutes.

Similarly, the maximum sensor response for a heat detection system responds significantly to variations in the long-term moving average. As illustrated in FIG. 18, lengthening the long-term moving average from 5 to 20 minutes and subsequently to 50 minutes correlates with notable rises in the maximum sensor response. This trend is consistent across various short-term moving average intervals. Transitioning from a 5-minute to a 20-minute long-term moving average particularly highlights a steep increase in the maximum sensor response. Specifically, for a 1-minute short-term moving average, the maximum sensor response rises from 0.99 °C. with a 5-minute long-term moving average to 2.55 °C. at 20 minutes and to 3.60 °C. at a 50-minute interval.

This data shows that the maximum sensor response is sensitive to adjustments in the short-term and long-term moving averages. Increasing the short-term moving average duration decreases the maximum sensor response, and increasing the long-term moving average moderately increases the maximum sensor response.

Intuitively, lengthening the long-term moving average in a MACD-based heat detection system accentuates the maximum sensor response. Extending the long-term moving average provides a more consistent and stable baseline, smoothing out longer-term temperature trends. Against this stable baseline, short-term temperature increases, captured by the short-term moving average, become more pronounced. The rationale is that while the long-term average slowly incorporates temperature changes, any rapid temperature rise becomes starkly evident, leading to a more significant differential between the short-term and long-term averages, thus amplifying the maximum histogram sensor response.

This intuition aligns with the experimental data observed. As the long-term moving average lengthens, its role as a baseline magnifies deviations from normal temperature behavior. This effect is particularly evident when rapid temperature increases occur, which take time to reflect in the smoothed long-term trend. These increases cause the short-term moving average to spike relative to the long-term average, resulting in a larger histogram bar that indicates a significant temperature differential.

MACD Configuration and Detection Time Analysis

The detection time metric captures the timeliness of the RFID heat detection system in identifying and responding to adverse thermal conditions. Table D, derived from experimental data with a heat input of 390 W into the fire ULD, illustrates how various configurations of short-term and long-term moving averages influence detection times. The 1-5-min MA configuration notably failed to surpass the activation threshold, resulting in the absence of a recorded detection time for this setting.

TABLE D

Interaction Between Moving Averages and Detection Times

| Short Term MA | Long Term MA | Detection Time, min |
|---|---|---|
| 1-min MA | 5-min MA | Did Not Detect |
| 1-min MA | 20-min MA | 2.85 |
| 1-min MA | 50-min MA | 3.10 |
| 5-min MA | 20-min MA | 4.10 |
| 5-min MA | 50-min MA | 4.35 |
| 20-min MA | 50-min MA | 6.83 |

Figure 19:
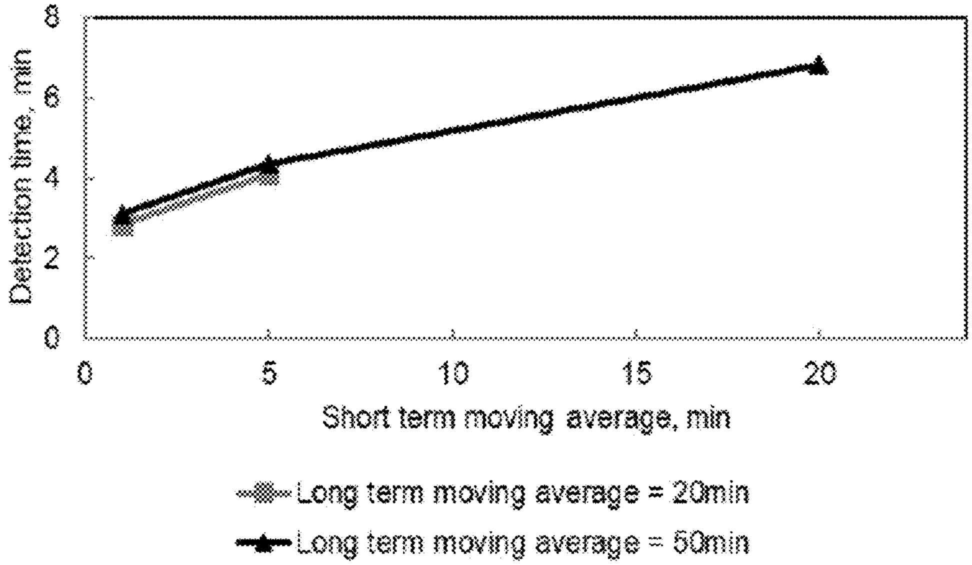

It is evident that changes in the short-term moving average significantly influence detection time. As shown in FIG. 19, adjusting the short-term moving average from 1 to 5 to 20 minutes markedly extends the detection time. This consistent trend is observed across all considered long-term moving average intervals. For instance, with a long-term moving average of 50 minutes, the detection time lengthens from 3.10 minutes for a 1-minute short-term moving average to 4.35 minutes for a 5-minute interval and further to 6.83 minutes for a 20-minute interval.

Figure 20:
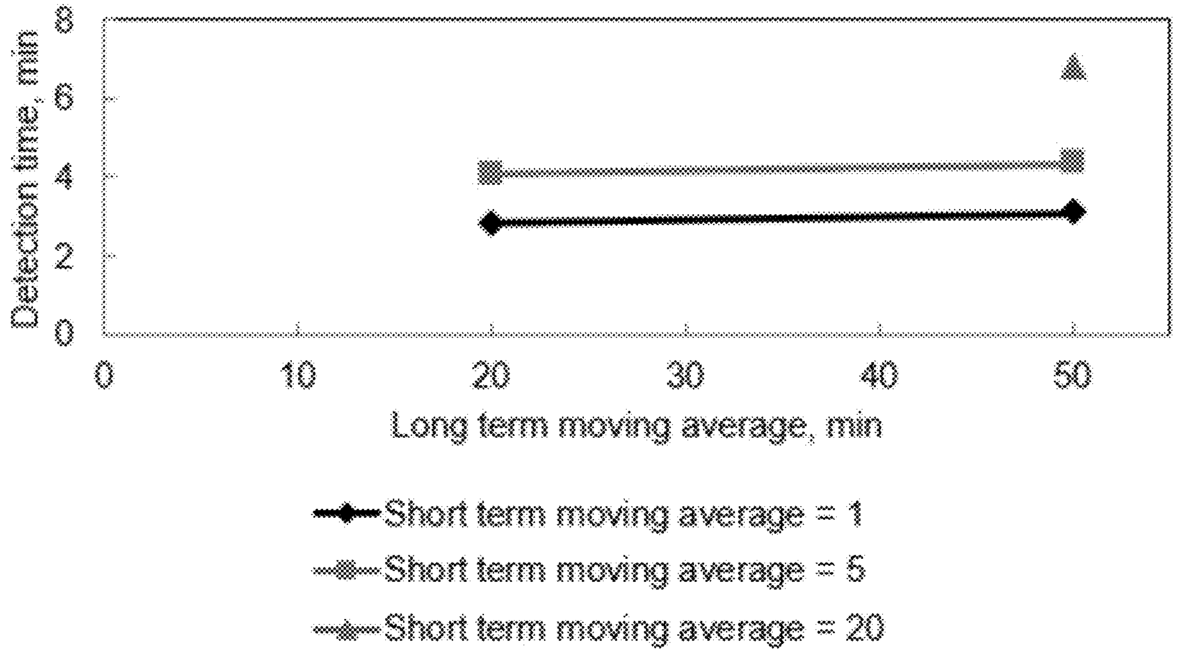
Figure 21:
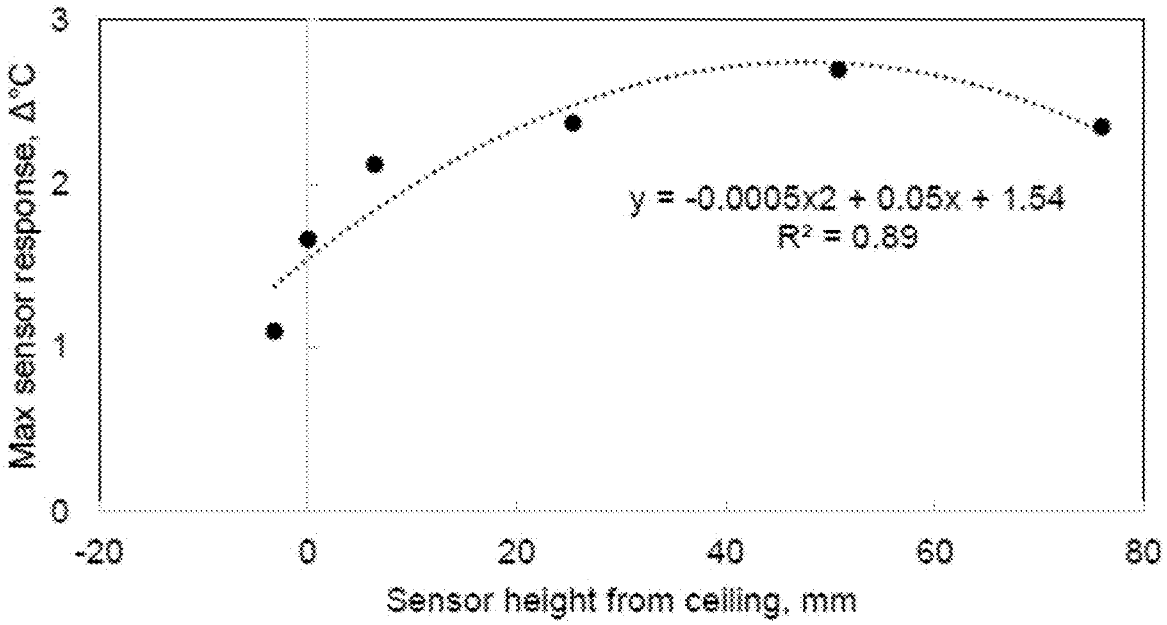

In contrast, the impact of varying the long-term moving average is less pronounced but still evident. FIG. 20 shows that increasing the long-term moving average results in a modest increase in detection time. For example, the detection time slightly increases from 2.85 minutes at a 20-minute interval to 3.10 minutes at a 50-minute interval.

The study reveals that lengthening the short-term moving average significantly extends the detection time. In contrast, increasing the long-term moving average only moderately increases the detection time.

Shortening the short-term moving average in a MACD-based heat detection system intuitively leads to faster detection times, as it heightens sensitivity to immediate temperature shifts, quickly identifying deviations from established long-term trends. This rapid response is important for early fire event detection. Experimental evidence aligns with this intuition, demonstrating that reduced short-term moving average lengths correlate with shorter detection times. However, the minimal short-term and long-term moving average pairing (1-5-min MA) did not detect the event, suggesting a practical limit to shortening averages for effective detection.

The experiments highlight a nuanced relationship between moving average lengths and detection efficiency. While shorter short-term averages expedite anomaly detection, optimal system performance requires a balanced approach with the long-term average to ensure specificity and sensitivity.

Practical Implications and Optimizing MA Intervals Summary

The performance parameters to optimize the RFID heat detection system include the activation threshold, maximum sensor response, and detection time.

For the activation threshold, which may be used in determining when the system triggers an alarm, the configuration of the short-term moving average has a pronounced effect. A reduced short-term moving average interval leads to a higher activation threshold, requiring a more significant temperature change to trigger the system. Contrarily, the activation threshold has a marginal variation when increasing the long-term moving average intervals.

Both short-term and long-term moving averages influence the maximum sensor response, which signifies the system's capacity to detect the highest temperature variation. Reduced short-term moving averages tend to register higher maximum sensor responses due to their ability to capture rapid temperature spikes. In contrast, increased long-term moving averages reflect higher sensor responses by capturing broader temperature trends, which can be essential for identifying slow-developing fire hazards.

The detection time represents the interval from heat initiation to alarm activation. Longer short-term moving averages increase detection time, delaying the system's response to heat events. While an extension of the long-term moving average only marginally increases detection time, its effect is less significant than changes in the short-term moving average.

Table E summarizes the effects of adjusting short-term and long-term MAs on these performance parameters to clarify these results. This table demonstrates the nuanced effects of MA adjustments on system performance.

TABLE E

| Parameter | Increasing Short-Term MA Effect of | Increasing Long-Term MA Activation |
|---|---|---|
| Threshold Maximum Sensor Response | Significantly decreased Decreased | Marginally increased Increased |
| Detection Time | Significantly increased Table E | Moderately increased |

Based on the experimental data, the 5-20-min and 20-50-min MA configurations emerge as optimal choices, each catering to distinct operational needs. The 5-20-min MA effectively responds to rapid temperature increases, while the 20-50-min MA is better suited for responding to slowly developing fires.

In practical operational settings, the time needed to establish baseline measurements for the long-term MA is an important factor. A dynamic approach can address this by initially employing a 1-5-min MA configuration for rapid baseline establishment, followed by a transition to the 5-20-min MA to maintain heightened sensitivity while improving detection reliability. As the flight progresses and baseline measurements stabilize, combining the 5-20-min MA and 20-50-min MA configurations can offer a balanced solution, effectively monitoring quick and slow-developing fires. The data presented provides a foundational understanding, but specific operational needs and constraints should guide the final determination of the most suitable MA intervals.

Analysis of Heat Sensor Location

This section aims to identify which RFID temperature sensing tag placement within the mock cargo compartment is most likely to trigger an alarm during a fire event. The findings here contribute to comprehensively comparing traditional smoke detection systems with the RFID heat detection system.

The 20-50-min MA configuration is used as the analytical benchmark for evaluating sensor performance across different ceiling configurations. As discussed herein, one sensor was placed directly on the surface (0 mm), and four additional temperature sensing tags were mounted at varying heights of 6.4 mm, 25.4 mm, 50.8 mm, and 76.2 mm on the interior ceiling at the center of the fire ULD. The mounts assist in minimizing heat loss from conduction to the ULD surface. Reducing heat loss to the ULD provides a more accurate temperature reading of the ambient environment. Furthermore, an exterior ceiling sensor was installed at the fire ULD center surface (−3.175 mm) to compensate for the RFID reading limitation through metal. This provided insights into fire detection capabilities for aluminum ULDs, where it is challenging to place temperature sensing tags inside the ULD because the UHF electromagnetic waves cannot penetrate metal.

Heat Sensor Location and Sensor Maximum Analysis

The maximum sensor response is representative of the peak temperature variation detected by the RFID heat detection system during a specified test scenario. The maximum sensor response is informative in assessing the system's sensitivity and responsiveness to thermal variations within the fire ULD.

Figure 22:
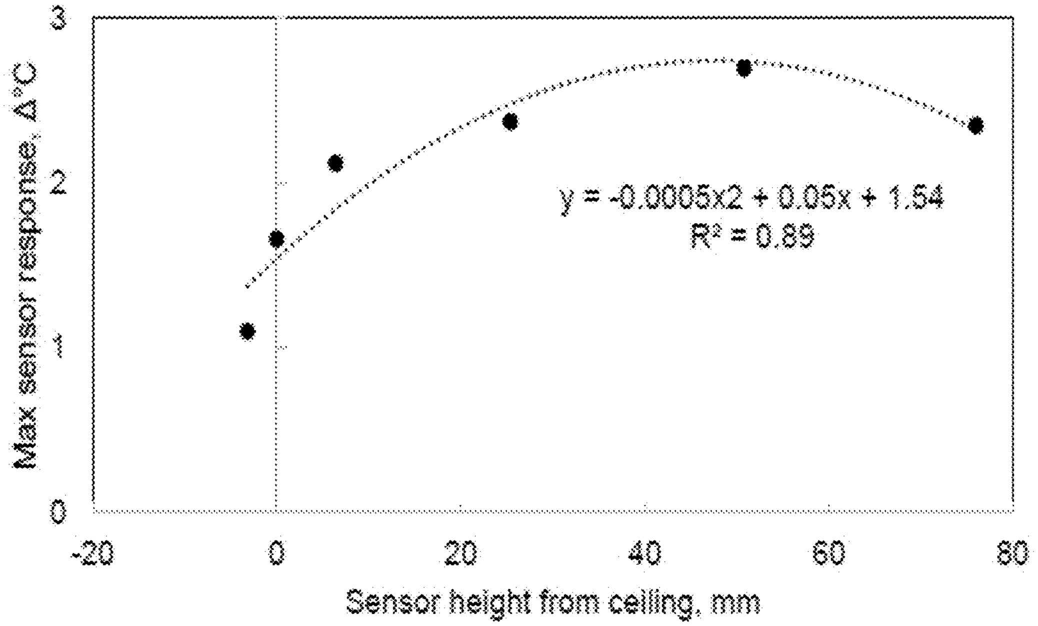

FIG. 22 illustrates the relationship between sensor height and the maximum change in temperature. The graph represents the average signal sensitivity across five tests, employing the 20-50-min-ma histogram line, with varying heat inputs (80, 141, 249, 337, and 584 W) introduced to the fire ULD. The graph condenses the key observations into a quadratic function: $y=-0.0005x^2+0.05x+1.54$, with a coefficient of determination ($R^2$) of 0.89. They demonstrate an excellent fit to the data points. This quadratic function exhibits a concave-down shape, explaining the relationship between sensor height and maximum sensor response. Additionally, by solving for x (sensor height) to find the maximum y (max sensor response), a sensor height of 50.4 mm is the optimal sensor height for maximizing sensor response.

Heat Sensor Location and Detection Time Analysis

Expanding the concept of detection time, the detection time here signifies the duration from the onset of heat within the fire ULD until the point when the 20-50-min MA histogram line crosses the activation threshold. The activation threshold was set at fifteen standard deviations above the norm over 11 hours in ambient conditions, specifically applied to the histogram line. This threshold accounts for random temperature fluctuations due to minor environmental changes, sensor inaccuracies, or other variables. The primary aim is to assess the RFID heat detection system's efficiency in promptly identifying heat anomalies across various sensor placements within the ULD.

Figure 23:
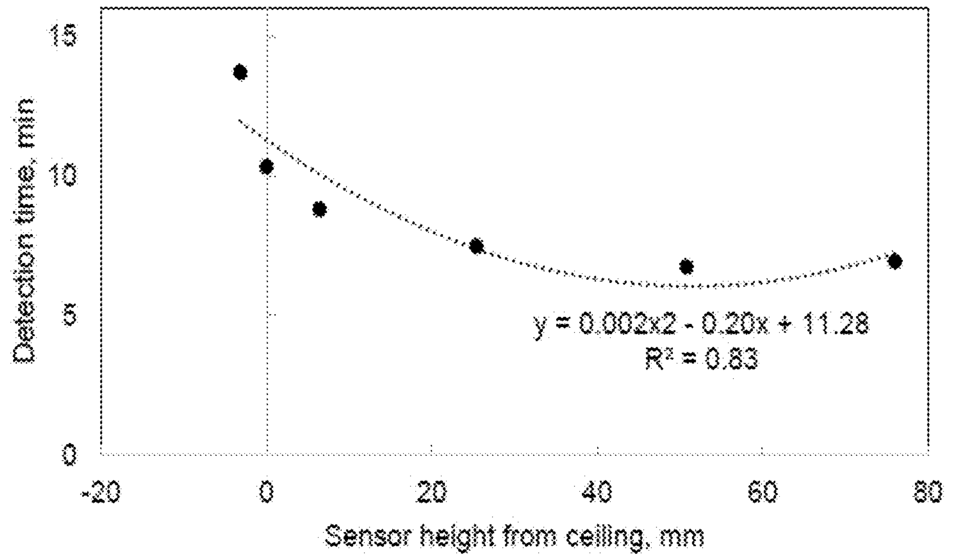

FIG. 23 displays the relationship between sensor height and detection time, with each data point symbolizing a specific sensor height. The results are from an average of five tests using the 20-50-min MA histogram line, with varying heat inputs (80, 141, 249, 337, and 584 W) to the fire ULD. In other words, sensor heights influence the system's promptness in detecting thermal events within the fire ULD. The graph represents the quadratic function expressed as $y=0.002x^2-0.20x+11.28$, with an $R^2$ value of 0.83, and exhibits a concave-up shape. This $R^2$ value signifies a robust positive correlation between sensor height and detection time. Solving for x (sensor height) to discover the minimum y (detection time) results in calculating an optimal sensor height of 50.9 mm for minimizing detection time.

Practical Implications and Optimizing Heat Sensor Location Analysis

One objective of this research was to find a sensor position that minimizes detection time, maximizes signal sensitivity, and adheres to spatial constraints within the ULD. Sensor location was found to influence detection time and maximum sensor response. Strategic sensor positioning is therefore important for the accuracy and reliability of temperature readings and for early fire detection and timely intervention in thermal threats.

The data supports sensor location as a variable in optimizing the RFID heat detection system. The maximum sensor response for the exterior surface sensor was 1.1 Δ°C, the interior surface sensor on the ceiling was 1.6 Δ°C, the 6.4 mm sensor is 2.1 Δ°C, and the 50.8 mm sensor is 2.8 Δ°C Correspondingly, the detection time for the exterior surface sensor was 13.7 minutes, the interior surface sensor was 10.3 minutes, the 6.4 mm sensor was 8.8 minutes, and the 50.8 mm sensor is 6.7 minutes. Even though the 50.8 mm sensor appears to be the optimal sensor location, it impedes significantly more space within the ULD that may be used in flight operations than the 6.4 mm sensor. The sensor was placed centrally on the ceiling of the ULD for reception with the UHF RFID antenna. Installing the sensor or sever sensors lower within the ULD so as not to interfere with the placement of cargo within the ULD may be achieved with a tag antenna that is remote from the sensor portion of the tag.

This analysis led to selecting the sensor positioned on the 6.4 mm mount for deeper analysis. The 6.4 mm mount has balanced features, specifically for its response time, high signal sensitivity, and minimal spatial intrusion within the ULD. The increased response time is crucial for timely detection and reaction to potential fire hazards. Additionally, high signal sensitivity highlights the system's ability to respond to minimal temperature variations. Furthermore, the minimal spatial intrusion within the ULD ensures that the sensor setup does not impinge on the available cargo space.

Analysis of Smoke Sensor Configurations

This section aims to identify which smoke sensor placement within the mock cargo compartment has the highest likelihood of triggering an alarm during a fire event.

Identifying and selecting the smoke sensor most likely to trigger an alarm enables a reasonable comparison between traditional smoke detection systems and the RFID heat detection system under investigation.

To better visualize the arrangement and proximity of the sensors to the fire ULD, refer to the schematic provided in FIGS. 6 and 7. This diagram details the sensor distribution, offering a clear top-down perspective of the experimental setup and aiding in understanding the subsequent analysis of sensor performance.

Smoke Sensor Location Analysis

Figure 24:
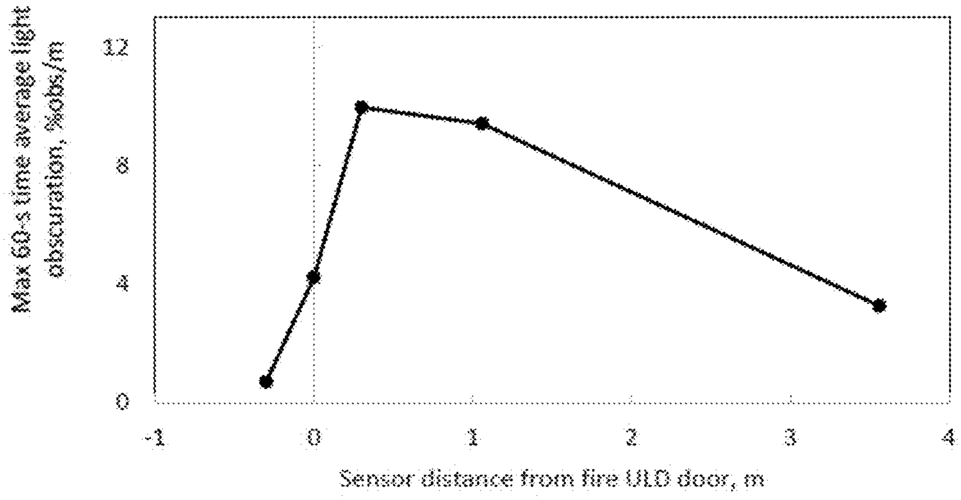

This subsection examines how the positioning of smoke sensors within the cargo compartment influences their maximum response. FIG. 24 shows the relationship between the sensor horizontal distance from the ULD fire door and the maximum 60-second average in light obscuration, based on nineteen tests with various heat inputs and consistent smoke inputs introduced to the fire ULD. This choice provides a clearer visualization of the trend and a more precise interpretation of the data. Notably, the peak % obs/m is higher than the 60-second time average, making this a conservative representation of the smoke detection capability.

A distinct trend demonstrated in the graph is the horizontal propulsion of smoke as it exits the fire ULD. Specifically, the sensor located at +0.3 m from the ULD door measures significantly more smoke compared to the sensor at −0.3 m from the ULD door. The sensor at 0.3 m demonstrates the greatest maximum 60-second average in light obscuration. Furthermore, there is a measurable decrease in smoke detection capability at intermediate distances between +0.3 m and the two ends of the mock cargo compartment as the sensors are situated farther away. Additionally, the sensor aligned directly above the ULD door does not capture as much smoke as the sensor positioned at 1.06 m from the door, with the −0.3 m sensor measuring the least amount of smoke.

Optimizing Smoke Sensor Location Analysis

The sensor at +0.3 meters from the ULD door is selected for further analysis due to its high signal sensitivity. The smoke exhibits forward momentum as it exits the ULD, reaching the end of the mock cargo compartment before reverting towards the aft sensor.

Selecting the smoke sensor location at +0.3 meters from the ULD door aims to ensure sufficient signal sensitivity, to maximize the probability of prompt fire alarm activation. This optimized sensor location is essential in allowing the smoke detectors the best chance of early fire detection and enabling a fair comparison between the RFID heat detection system and existing smoke detection systems in aircraft cargo compartments.

Evaluation of Controlled Fire Scenarios

The structured experimental setup allows for observations and assessments of the system's responses under varying fire conditions to evaluate its ability for early fire detection, and to understand the correlation between the heat input to the fire ULD and the resulting sensor responses in heat and smoke detection. Furthermore, this analysis aimed to highlight the strengths and limitations of the heat detection system, allowing for informed recommendations for its further development.

As discussed above, the experiments used a heater and a smoke generator to simulate varying fire situations within a ULD. The heat and smoke detection analyses in the following sections were derived from the data collected from twenty-one tests. However, two of those tests malfunctioned, with the smoke sensor missing smoke measurements. For the testing protocol, the smoke generator was activated to produce an aerosol for 60 seconds. The aerosol production remained constant across all tests, and the heat input varied from 55 W to 669 W. The optimized configuration used includes the 6.4 mm sensor mount and the +0.3 m smoke meter, and the 5-20-min MA for its rapid detection time. However, it should be noted that the 20-50-min MA configuration has a lower activation threshold and can detect slowly developing fires that the 5-20-min MA configuration may miss.

The following section introduces two added terms: minimum heat input for heat detection and the minimum heat input for smoke detection. The minimum heat input for heat detection denotes the lowest heat input required to activate an RFID heat detection system alarm. The minimum heat input for smoke detection indicates the lowest heat input needed to eject the aerosol from the ULD and activate a smoke detection system alarm.

Heat Detection Analysis for Controlled Fire Scenarios

The relationship between the amount of heat input to the fire ULD and the resultant sensor response is informative for understanding the efficacy of the RFID heat detection system across varying fire scenarios. The analysis contains data from twenty-one tests with heat inputs ranging from 55 W to 669 W.

Figure 25:
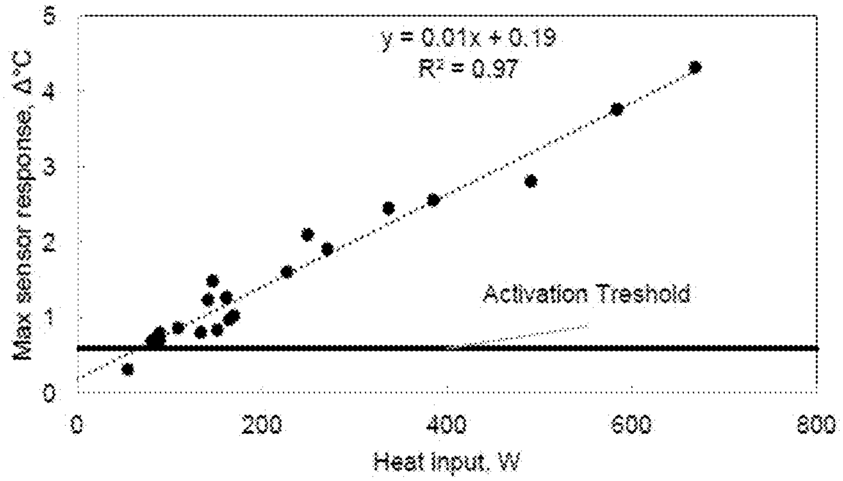

FIG. 25 shows a linear correlation between the heat input to the fire ULD and the resulting maximum temperature change. The mathematical expression of the linear relationship is $y=0.01x+0.19$, where x denotes the heat input in watts, and y represents the maximum temperature change in degrees Celsius. The sensor detects the temperature change, and the 5-20-min MA calculates the histogram signal. The high $R^2$ is 0.97, showing a strong linear correlation between the two variables. The strong correlation between heat input and sensor response demonstrates the sensor's effectiveness in estimating the heat within the ULD.

The system is designed to provide near real-time fire status and location data to flight crews, allowing them to determine the effectiveness of fire suppression measures. The linear model extrapolated from the data suggests that it is a reliable tool for evaluating the heat detection system's performance under an array of fire scenarios.

As discussed above, the activation threshold for the 5-20-min MA was set at 0.6 (see Table B). The minimum heat input for detection was calculated to be 67 W using the equation $y=0.01x+0.19$ alongside the activation threshold of 0.6. The minimum heat input for detection is essential in understanding the system's sensitivity to varying heat inputs.

Smoke Detection Analysis for Controlled Fire Scenarios

The relationship between the heat input to the fire ULD and the smoke production, as quantified by the maximum 60-second average in light obscuration, as determined by analyzing the signal sensitivity with varying heat inputs to find the threshold at which smoke detection occurs. The results include data from nineteen tests executed with varying heat input while ensuring consistent aerosol production.

The constant aerosol production isolates the impact of varying heat input on smoke detection, providing a clearer insight into the smoke detection capability under different fire scenarios. The constant aerosol generation ensures that the heat input variations influence the variations in smoke detection. Thus, it establishes a controlled experimental environment that aligns with the simulated fire situations within the ULD.

Figure 26:
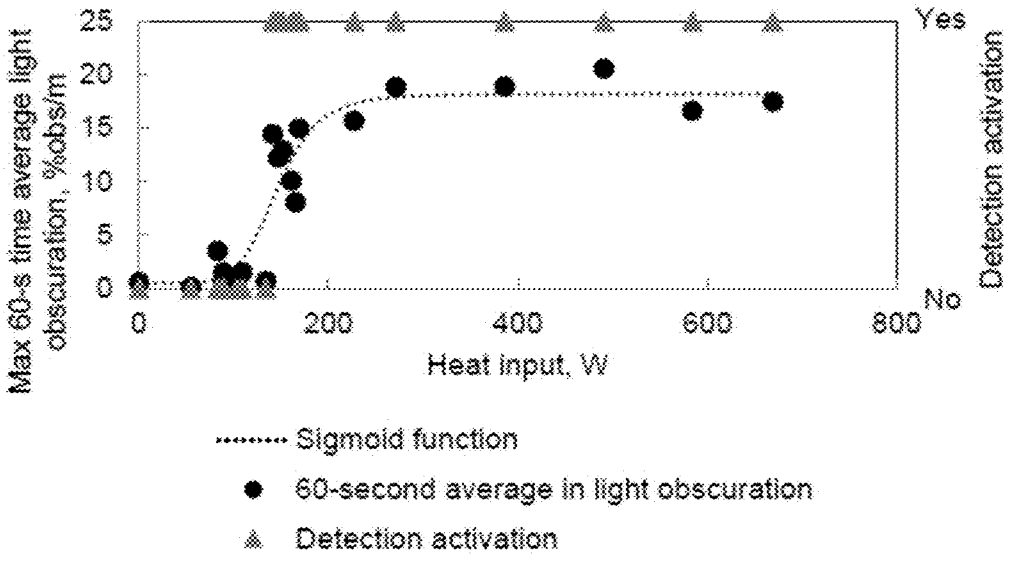

The sigmoid curve in FIG. 26 shows a typical S-shaped curve. Initially, minimal smoke escapes the fire ULD at low heat input, resulting in lower smoke detection capability in the cargo compartment. As heat input increases, there was a sharp rise in smoke measurement, marking a transition to effective smoke detection in the cargo compartment. The curve eventually levels off, indicating a phase of reliable detection where further heat input changes have a marginal impact on the smoke measurement. This curve explains the behavior of smoke propagation with varying heat inputs, aiding in understanding operational thresholds and reliability of the smoke detection system.

The minimum heat input for smoke detection was experimentally calculated by averaging the highest heat input without activation (134 W) and the lowest with activation (141 W), resulting in an approximate threshold of 137.5 W. Simultaneously, a mathematical approach was employed, solving the sigmoid function for x when y equaled 12.5% obs/m for the max 60-s time average in light obscuration, yielding a value of 163.4 W. This is a conservative estimate due to the 60-second data averaging, as the peak % obs/m is likely higher than the 60-s time average, illustrated by some data points triggering an alarm despite having a 60-s time average below 12.5% obs/m. Solving the sigmoid function for its minimum heat input for smoke detection is vital in understanding the system's sensitivity to varying heat inputs.

The equation y=0.01x+0.19 establishes a predictive relationship between the heat input to the fire ULD and the maximum temperature change detected by the sensor using the 5-20-min MA. This equation predicts the rise in temperature at which smoke will escape the ULD. When applying this model to the minimum heat inputs for smoke detection, 137.5 W for the experimental value and 163.4 W for the mathematical value, it was possible to infer the minimum sensor temperature response required to push smoke out of the ULD. The minimum sensor temperature responses are 1.6 °C. for the experimental value and 1.8 °C. for the mathematical value.

Fire Detection Comparison for Controlled Fire Scenarios

The minimum heat input required to activate heat and smoke detection systems was compared. The minimum heat input for heat detection is mathematically determined to be 67 W. The minimum heat input for smoke detection is higher, with experimental and mathematical estimations at 137.5 W and 163.4 W, respectively.

The heat detection system exhibits a linear response to increasing heat input. This is informative for near real-time monitoring and early detection of thermal threats. A sigmoid function characterizes the mock cargo compartment smoke detection system's behavior. This inherently includes a delayed response during its initial phase at lower heat input levels before transitioning into a rapid response phase. This initial phase represents a zone where the heat input is insufficient to eject smoke from the ULD, delaying smoke detection.

Figure 27:
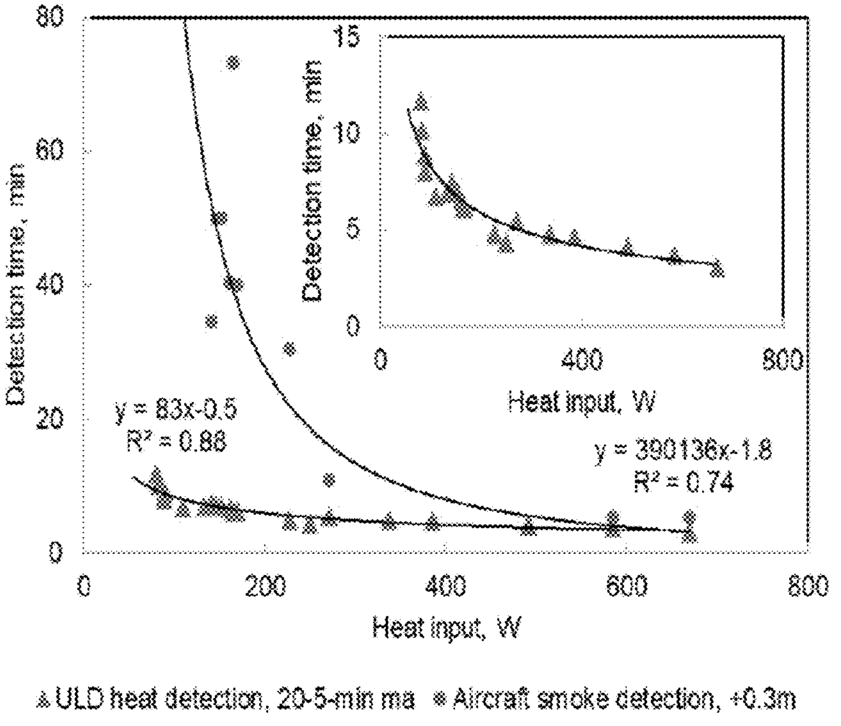

FIG. 27 shows the response dynamics of the heat and smoke detection systems to varying heat input levels within the fire ULD. Additionally, the figure includes a close-up inset of the ULD heat detection's response to varying heat input levels. The mathematical expressions of the relationships governing the detection times are $y=83x^{-0.5}$ for heat detection and $y=390136x^{-1.8}$ for smoke detection. Both functions have inverse relationships between the heat input and detection time. The mathematical functions signify that an increase in heat input corresponds to a decrease in detection time.

The coefficients and exponents in these power functions represent the rate at which detection time decreases with increasing heat input. Notably, the exponents −1.8 and −0.5 indicate the rate of decrease in detection time for smoke and heat detection systems, respectively. Smoke detection has a steeper decline, as represented by its lower exponent value. Additionally, the $R^2$ values of 0.74 for smoke detection and 0.88 for heat detection indicate a reasonable fit of these power functions to the actual data.

Figure 28:
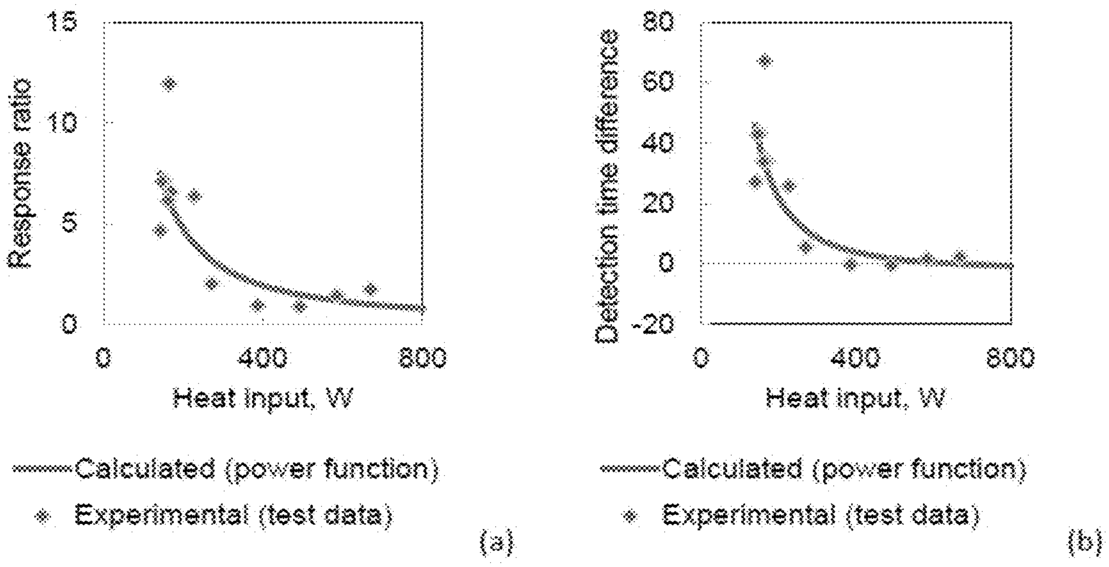
Figure 29:
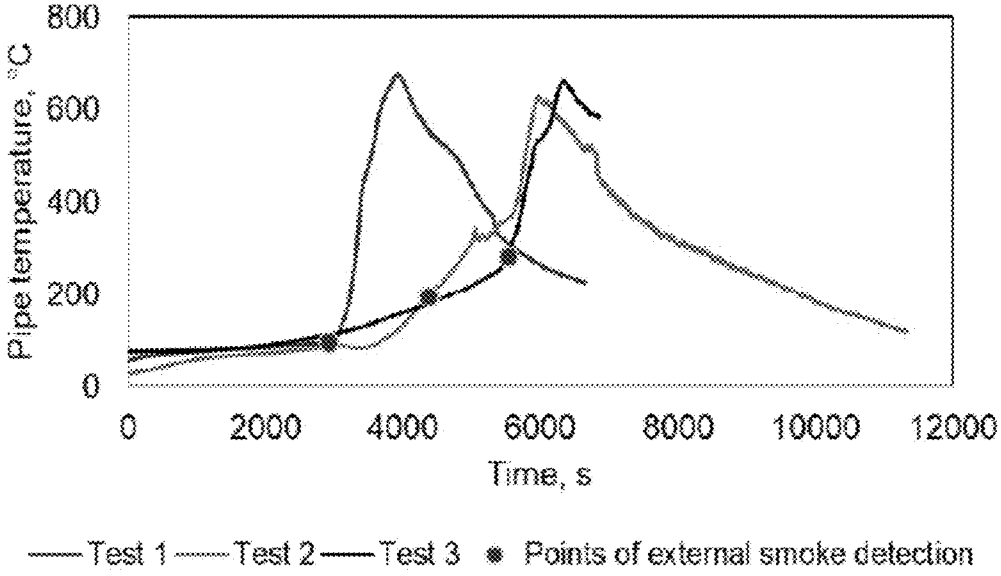

FIGS. 28 (*a*) and (*b*) compare RFID heat detection and traditional smoke detection system performance across different heat input levels based on FIG. 27's power functions, accompanied by actual data points and estimates. FIG. 29 (*a*) displays the response ratio, calculated as the smoke detection time divided by the RFID heat detection time, demonstrating the RFID system's faster response, particularly noticeable at lower heat inputs ranging from 140 W to 380 W. Here, the RFID system's detection speed is up to 7.5 times faster than smoke detection at 140 W, highlighting its potential for quicker fire detection.

In contrast, FIG. 28 (*b*) shows the differences in detection time, calculated by subtracting the smoke detection time from the heat detection time. The analysis reveals that at 140 W, the RFID system is faster by approximately 45.9 minutes. However, this advantage decreases as heat input increases. This time benefit underscores the importance of the RFID system in allowing for more timely fire suppression actions and emergency procedures.

Notably, smoke detection was non-responsive at heat inputs less than 141 W, whereas heat detection was operational at points below that threshold but not below 67 W. The lowest heat input at which smoke detection occurred is 141 W.

Evaluation of Smoldering Fire Scenarios

The RFID heat detection system ability to detect smoldering fires in ULDs was evaluated. Smoldering fires exhibit gradual heat release and minimal smoke production. This challenge necessitates a system capable of early identification to mitigate the risk of escalation to uncontrollable fires within the cargo compartment.

The experimental setup utilized a smoke pipe filled with hardwood pellets. This setup replicates the slow and low-heat combustion process typical of smoldering materials. UHF RFID temperature sensing tags were placed at predetermined locations within the ULD to capture the temperature profiles and validate the performance of the heat detection system, as discussed above. Additionally, data was collected from the light obscuration meter located at the ceiling of the fire ULD. The internal ULD light obscuration data served solely for demonstrative purposes, illustrating the buildup of smoke within the ULD until it is pushed out of the ULD.

A series of three tests assessed the response of the heat detection system using both 5-20 and 20-50-min MA intervals. These intervals were informative for detecting the incremental temperature changes associated with smoldering fires. The detection times provide insight into the efficacy of different moving average intervals in early fire detection.

A comparative analysis compared the performance of the system by monitoring the response of the heat detection system using both 5-20 and 20-50-min MA intervals. The goal was to refine the operational capabilities of the heat detection system.

General Test Observations for Smoldering Fire Scenarios

In the smoldering fire scenario, an aluminum pipe that is 15.24 cm in diameter and 58.88 cm in length is filled with 620 g of low-ash hardwood pellets. This pipe was initially ignited at the bottom using a propane hand torch. Once a sustained smolder was observed, the pipe was moved to the center of the ULD floor. The temperature measurement data was taken 10 cm from the bottom of the pipe reflects the drying phase of the pellets higher up in the pipe, even though the bottom may already be in the pyrolysis, or smoldering, stage. This setup allowed for observing the gradual progression of the combustion process within a controlled environment.

The heating value, or calorific value, refers to the amount of heat energy released upon the complete combustion of a unit of fuel. The energy release in this scenario was informative for understanding the detection capabilities of fire systems for smoldering fires. The hardwood pellets had a heating value of approximately 19.2 MJ/kg. Therefore, the total potential energy from the 620 grams used is around 11.9 MJ. This quantity of heat, when released in a confined space like a ULD, is quite significant.

The pellets initiate the drying phase when subjected to heat. Typically, wood pellets contain 5 to 10 percent moisture, and the initial heat exposure leads to the evaporation of this water content. This stage of moisture evaporation is endothermic, absorbing heat from its surroundings and regulating the overall temperature increase within the ULD. As the fire intensifies within the pipe, the wood pellets undergo pyrolysis-increased heat and smoke production mark this stage. The insulated pipe design ensures progressive heat build-up. As the heat increases within the pipe, it can contribute to an increased pyrolysis rate, creating a feedback loop that intensifies the fire.

The subsequent gas combustion stage occurs if sufficient oxygen is present, leading to the efficient burning of the emitted gases. During the gas combustion phase, the wood pellets released volatile gases such as carbon monoxide, hydrogen, and methane. These gases mixed with the oxygen in the ULD and ignite upon reaching their respective ignition temperatures. This phase characterizes a more efficient and complete burning process.

Finally, the coal burnout stage involved the burning of residual carbon particles. These latter demonstrate different heat release patterns, with the gas combustion stage typically contributing to higher heat output within the ULD.

The experimental observations across three distinct tests demonstrate the variability inherent in smoldering fires. In FIG. 29, the x-axis depicts time, while the y-axis illustrates the internal pipe temperature for three trials. The dots on the graph denote the time and temperature when external smoke detection occurs. Each of the three tests presented unique temperature trajectories. The variability is indicative of the diverse nature of smoldering combustion. Test 1 shows a steep rise in temperature post the 100 °C. mark, suggesting a rapid transition from smoldering to flaming combustion. Test 2 and Test 3 offer different patterns of temperature escalation, attributing them to variations in factors like packing density or airflow. These variations impact the combustion dynamics [93] [92].

A steep increase in temperature typically indicates a transition from smoldering to flaming combustion. This transition exhibits a significant increase in heat release, contributing to a rapid pressure build-up and smoke density inside the ULD. When the internal pressure exceeds the containment ability of the ULD, smoke begins to escape and becomes detectable by external light obscuration meters.

Test 2 presents an interesting case; the temperature reaches a plateau of around 350 °C. This plateau may indicate a sustained period where the fire is in equilibrium. During this phase, the burning material's heat generation rate could balance the heat loss rate to the surroundings, resulting in a steady-state condition. Once the combustion intensifies beyond this equilibrium, we see another sharp increase in temperature.

Figure 30:
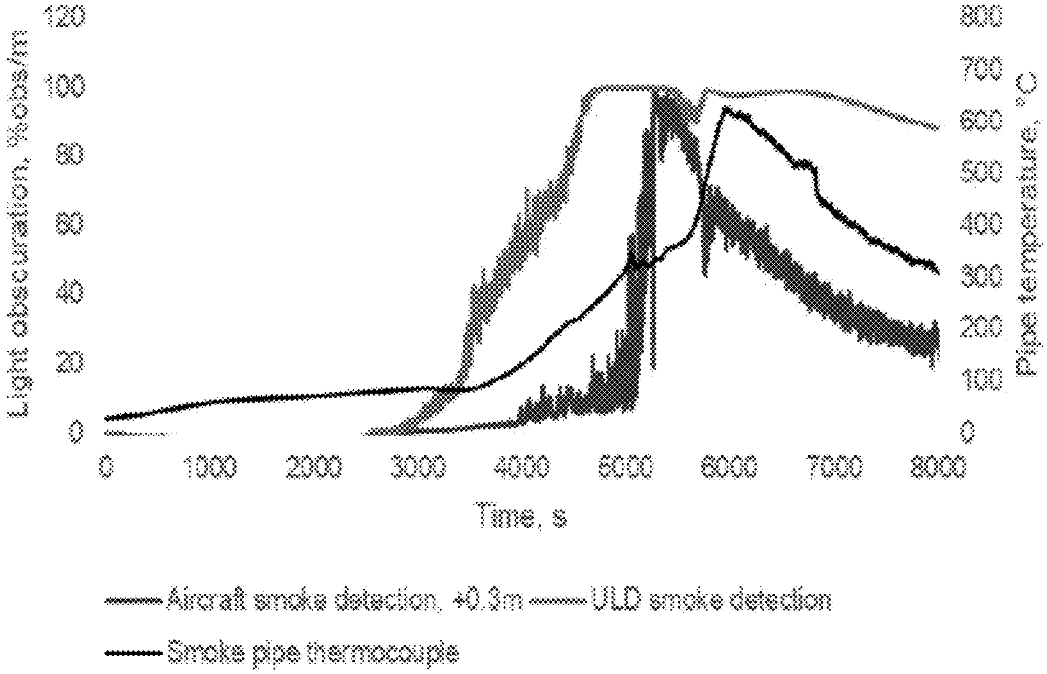

Test 2, as demonstrated in FIG. 30, exemplifies the delay in external smoke detection. In this figure, the x-axis represents time, with the primary y-axis measuring 118 light obscuration levels inside the ULD and in the aircraft cargo compartment. The secondary y-axis tracks the internal pipe temperature. External smoke detection occurs only after sufficient heat accumulation, which increases the internal pressure and drives the smoke outward. This delay is essential to understanding the limitations of traditional smoke detectors, which may only trigger once visible smoke is present.

Figure 31:
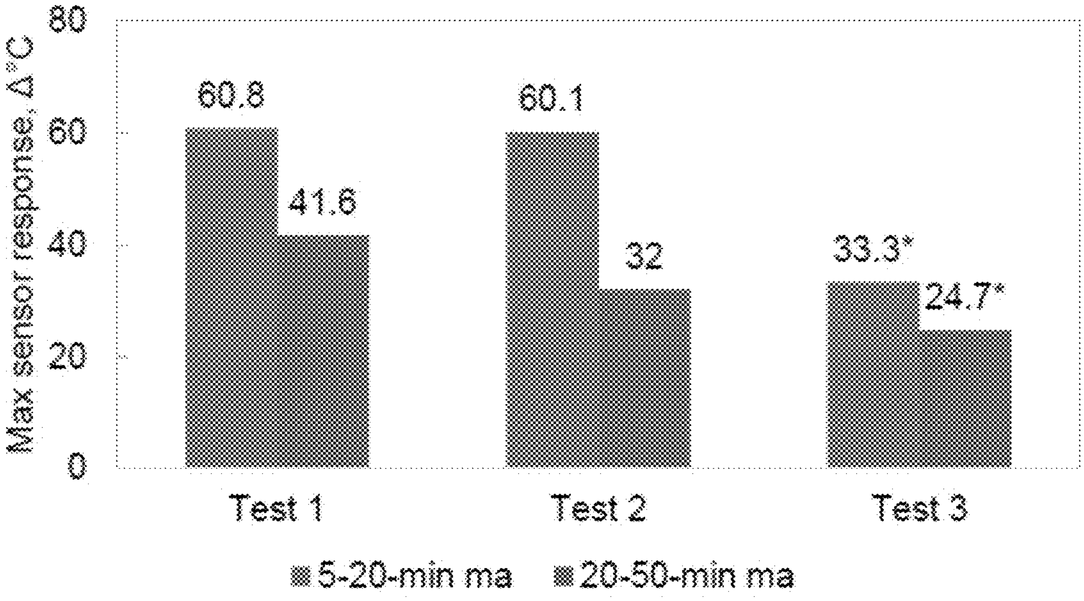

FIG. 31 shows the maximum sensor responses to the varying tests. The * indicates the UHF RFID temperature sensing tags that failed during this test. Tests 1 and 2 displayed similar maximum temperatures in the 5-20-min MA, with Test 1 recording 60.8 °C. and Test 2 recording 60.1 °C. This similarity indicates a degree of reproducibility in the initial phases of the smoldering fire as measured by this approach. In contrast, the 20-50-min MA showed more variation, with Test 1 at 41.6 °C. and Test 2 at 32 °C. The results suggest that the fire development variation can affect the maximum sensor response. The temperatures observed in these tests are notably higher than the maximum of 4.3 °C. at 668 W heat input, as mentioned above. However, caution was exercised when making direct comparisons. The combustion of wood pellets in the smoldering fire tests is a more dynamic process with varying heat output over time, unlike the constant heat output from the electric heater in the controlled scenarios.

In Test 3, the UHF RFID temperature sensing tags failed to record the maximum temperature. This significant failure reveals potential difficulties in fully capturing the temperature profile during specific fire scenarios. Understanding these limitations is informative for effectively monitoring and assessing the performance of fire suppression measures. Despite this shortfall, it is noteworthy that the tags detected the fire's presence before ceasing to function.

20-50 nd 5-20-Min MA Heat Detection Analysis for Smoldering Fires

Figure 32:
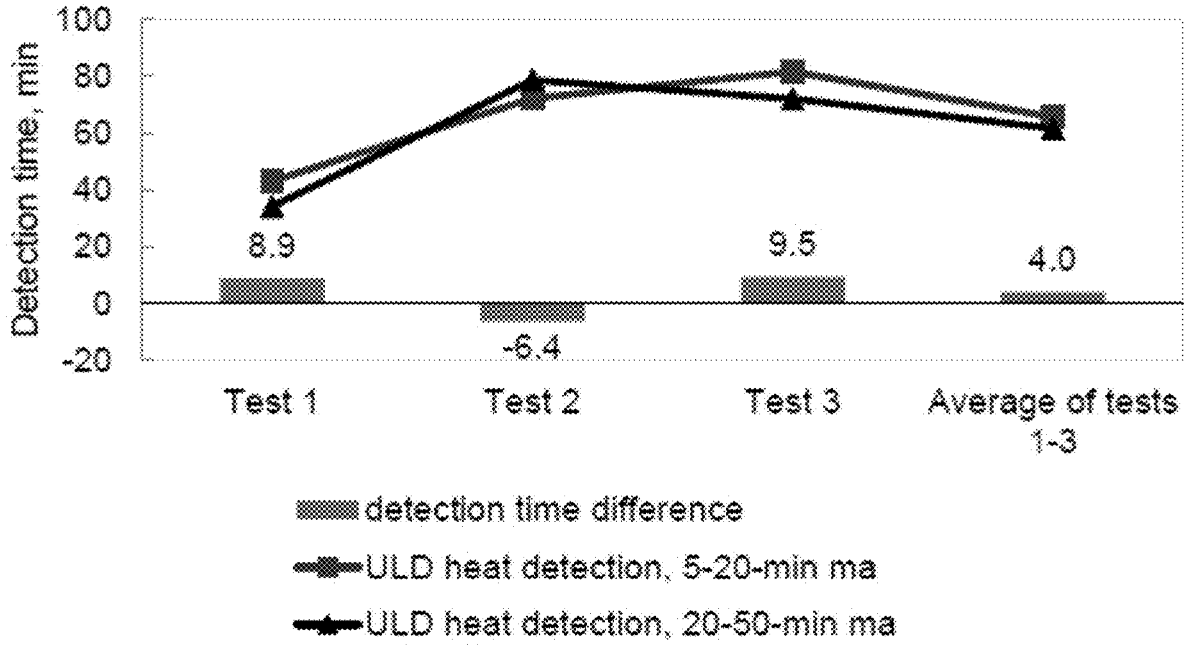

The 20-50 and 5-20-min MA configurations in RFID-based heat detection systems serve distinct purposes. The 20-50-min MA configuration was particularly effective in identifying the gradual, consistent temperature increases that characterize smoldering fires. The 20-50-min MA configuration detected temperature changes earlier than the 5-20-min MA in two of the three smoldering fire tests, as shown in FIG. 32. Early fire detection can be crucial in a cargo compartment where a smoldering fire may not present immediate signs of danger but can rapidly become a significant threat if left undetected. The longer moving average allows the system to discern an actual temperature trend from the background noise, providing a reliable alert for fires that develop over time.

The data analysis reveals that the 20-50-min MA configuration typically detects smoldering fires more quickly than the 5-20-min MA, as seen in the shorter average detection times. In Tests 1 and 3, the initial, gradual rise in temperature during the smoldering stage was sufficient to surpass the activation threshold set for the 20-50-min MA, leading to early detection. However, in Test 2, this gradual temperature increased at the onset of smoldering was not enough to trigger an early detection with the 20-50-min MA threshold, resulting in earlier detection with the 5-20-min MA configuration for detection. This deviation can be attributed to the unique fire dynamics observed in Test 2, where an internal pipe temperature plateau indicated a combustion equilibrium phase. It is important to note that the internal pipe temperature offers a partial view of the total HRR, serving as an indicator rather than a comprehensive measure.

The algorithm relies on temperature measurements at the ceiling of the ULD, which may provide a more accurate representation of the overall HRR than the internal pipe temperature. This unexpected result in Test 2 underscores the challenge of accurately characterizing smoldering fires and the critical need for adaptive detection strategies. Such strategies must be versatile enough to interpret the nuanced signals from varying fire sources.

Fire Detection Comparison for Smoldering Fire Scenarios

A comparative analysis of detection times between the ULD heat detection system and traditional aircraft smoke detection systems was performed, focusing on the operational advantages of the RFID heat-based fire detection system in the context of smoldering fire scenarios within ULDs.

Figure 33:
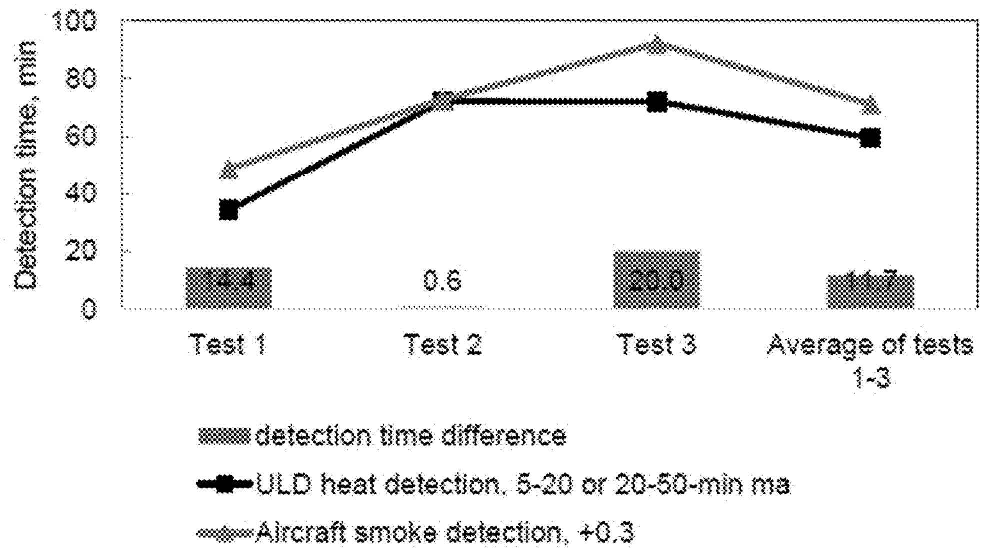

The experimental data highlights significant detection time advantages the ULD heat detection system offers, as shown in FIG. 33. By utilizing the best-performing setting between the 5-20 and 20-50-min MAs, the system demonstrates an average detection time of 59.5 minutes. In comparison, traditional aircraft smoke detection systems recorded an average time of 71.2 minutes. The results show an average detection time saving of 11.7 minutes across all tests. The average time saving suggests a substantial improvement in the ULD heat detection system's ability to identify potential fire events promptly.

The ULD heat detection system notably outperformed the smoke detection system in Tests 1 and 3, with faster response times of 14.4 and 20.0 minutes, respectively, using the 20-50-min MA configuration. However, in Test 2, the gradual rise of the internal ULD temperature during the initial smoldering phase failed to meet the early detection threshold of the 20-50-min MA. Therefore, the 5-20-min MA configuration achieved an earlier detection, marginally surpassing the external aircraft smoke detection system by 0.6 minutes. This early detection by the 5-20-min MA configuration occurred as Test 2's internal pipe temperature rapidly escalated to a higher stable plateau, coinciding with a significant rise in heat within the ULD. This heat increase facilitated the expulsion of smoke from the ULD, enabling its near-simultaneous detection by the smoke detection system.

The quicker detection times of the ULD system have profound operational implications. In the event of a fire, the system's efficiency enables faster decision-making for flight crews, allowing more effective fire suppression actions and initiating emergency procedures if needed. This time saving is crucial, as it can contribute to the safety of the aircraft and its passengers by providing valuable minutes for a response.

The findings from these tests align with the objectives of developing a cost-effective, near real-time fire status monitoring system that offers improved detection times over existing solutions. The ULD heat detection system's performance in experimental tests underlines its potential as a superior alternative to conventional smoke detectors, particularly for detecting early smoldering fires in cargo compartments.

Evaluation of Lithium-Ion Thermal Runaway Scenarios

The responsiveness of the RFID-based heat detection system to lithium-ion thermal runaway scenarios within ULDs was evaluated through a series of two tests. Recognizing the significant threat posed by lithium-ion battery fires, this evaluation seeks to validate the system's effectiveness in a context where rapid escalation and high energy release are critical factors.

The test evaluates two LCO pouch cells, each fully charged with capacities of 5.48 Wh and 6.6 Wh. In this setup, a user-activated relay triggers a short circuit, simulating a dangerous event known as thermal runaway. This initiation method ensures a controlled assessment without the addition of heat. The recording the system's detection times evaluates its performance relative to traditional external smoke detectors commonly used in aircraft cargo compartments.

In this comparative analysis, the external smoke detectors served as a benchmark to measure the advanced capabilities of the RFID-based system. The comparison highlights the RFID system's potential to offer earlier warnings. Results demonstrate the RFID-based system's performance in terms of detection speed. Such capability is vital in providing timely alerts to flight crews, enabling quick action to mitigate fire events, and enhancing safety against the unique risks presented by lithium-ion batteries in aviation cargo.

General Test Observations for Lithium-Ion Fires

The experiments used two LCO pouch cells, each fully charged, with capacities of 5.48 Wh and 6.6 Wh. Using these identical cells in Test 1 and Test 2 ensured a controlled environment to assess thermal runaway characteristics under comparable conditions. The experiments started with a user-activated relay inducing a short circuit, marking time zero for FIG. 34 through FIG. 36.

Figure 34:
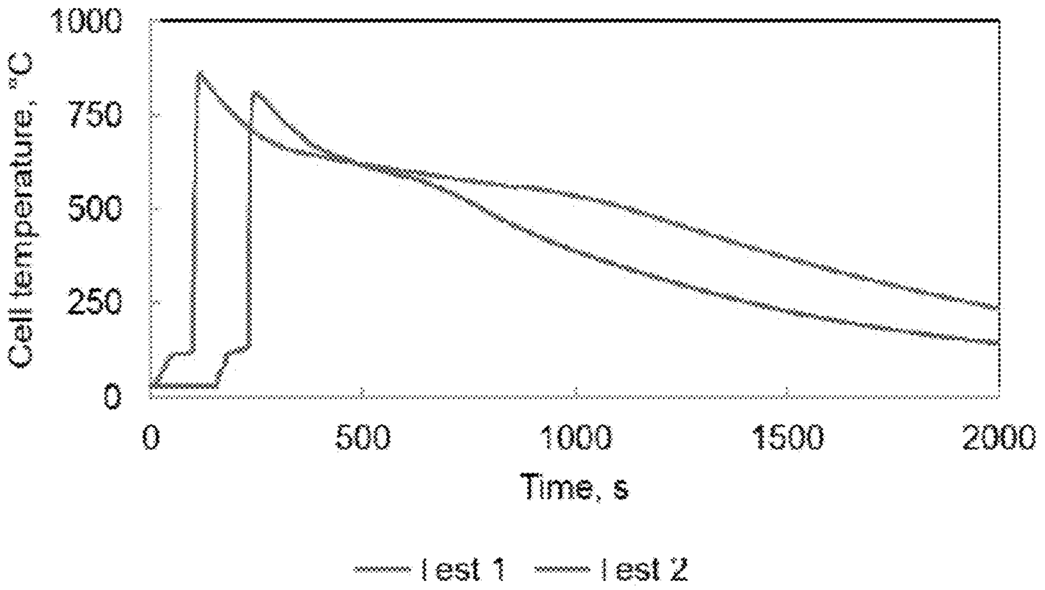

FIG. 34 shows the temperature profiles over time for Test 1 and Test 2 of the lithium-ion cells undergoing thermal runaway. Both tests reached peak temperatures in a similar range. However, Test 1 had a prolonged elevated temperature phase was not observed in Test 2. The extended period of high temperature in Test 1 may be attributable to the ignition of flammable vent gases, releasing additional energy over a longer duration. In contrast, the temperature in Test 2 declined more swiftly after reaching the peak. The steeper decline in temperature suggests a less extensive or non-occurrence of vent gas ignition.

Figure 35:
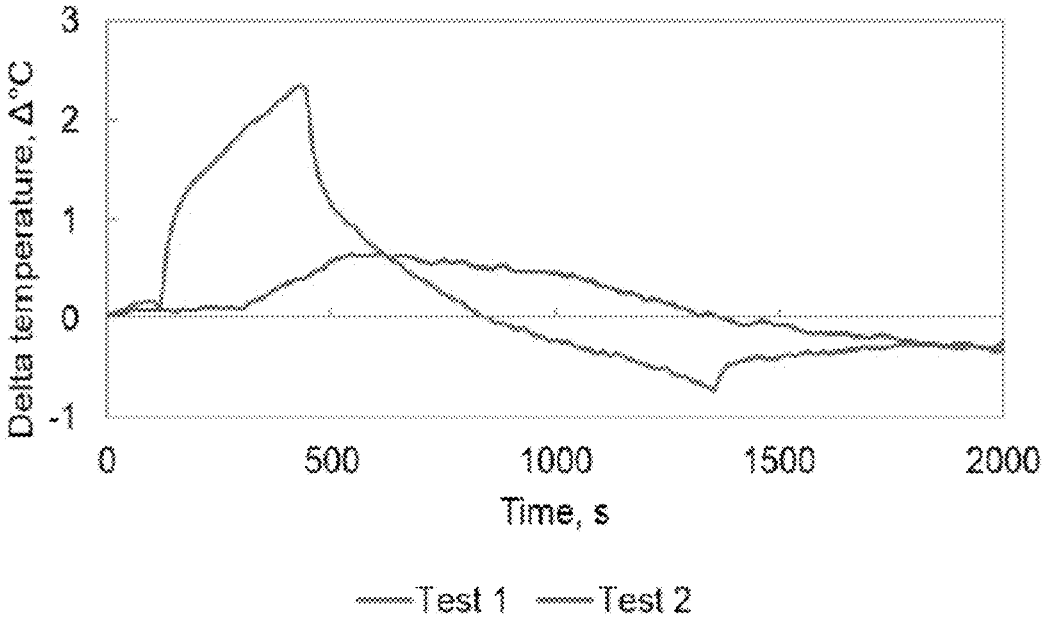

FIG. 35 shows the 5-20-minute moving average sensor response, with temperature measurements taken at the ceiling of the ULD using the 6.4 mm mount. The system recorded the peak sensor response at 2.34 °C. for Test 1 and 0.65 °C. for Test 2. The difference in peak sensor response highlights a significant difference in the internal reaction of the cells. The significant sensor response in Test 1 aligns with the prolonged elevated temperature. The elevated temperature response suggests a more substantial ignition of flammable vent gases and a more extended release of thermal energy. The response of 0.65 °C. for Test 2 surpassed the activation threshold of 0.6 °C. However, 0.65 °C. was well below the minimum sensor temperature response required to push smoke out of the ULD. In contrast, the 2.34 °C. response from Test 1 far exceeded this threshold and reflects an intense thermal event. The high-temperature response suggests that Test 1 will push smoke out of the ULD while Test 2 will not.

Figure 36A:
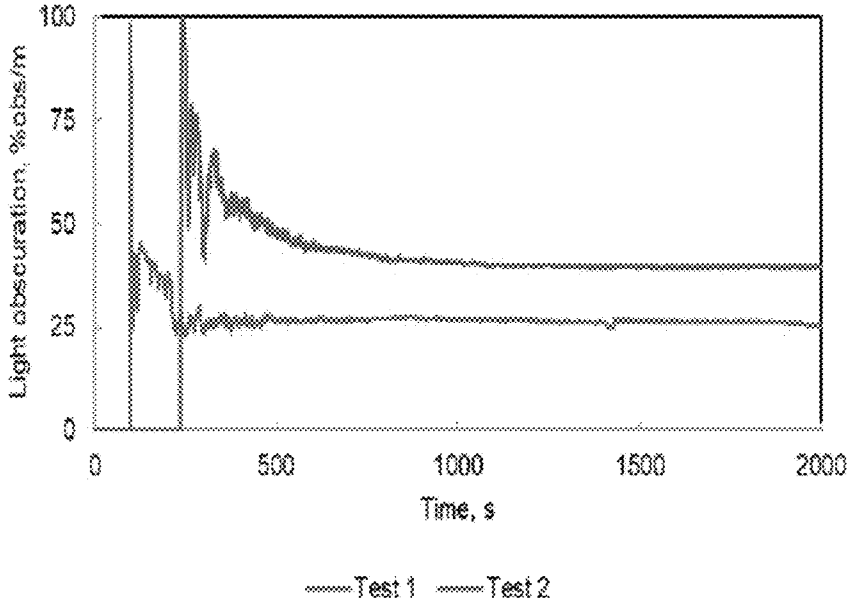
Figure 36B:
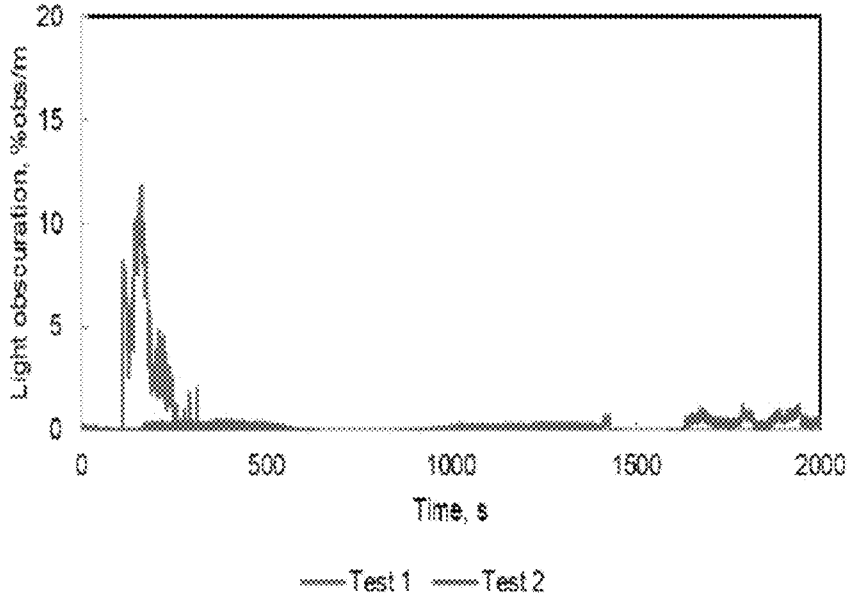

FIGS. 36 (*a*) and (*b*) examine light obscuration within and outside the ULD during thermal runaway tests of lithium-ion cells. In FIG. 36 (*a*), both Test 1 and Test 2 initially exhibited elevated levels of light obscuration inside the ULD. The high light obscuration indicates intense smoke production at the onset of thermal runaway. However, the progression differs in each test. Test 1 demonstrated a rapid decrease in ULD light obscuration. The rapid decline in light obscuration in Test 1 suggests that smoke exits the ULD or a more complete combustion process. Conversely, Test 2 maintained elevated smoke levels for an extended period. The high light obscuration within the ULD indicates that smoke is not exiting the ULD or that the combustion process is less complete.

FIG. 36 (*b*) demonstrates how smoke exited the ULD. Test 1 reached a peak light obscuration of 11.8% obs/m. This measurement represents a substantial smoked density but did not surpass the 12.5% obs/m activation threshold used in this report and UL 268. In contrast, the peak light obscuration in Test 2 was significantly below the smoke detection threshold. This confirms that the heat produced in Test 2 was insufficient to push smoke out of the ULD.

The sigmoid function model presented in this section underscores the strong correlation between heat input and the effectiveness of external smoke detection systems. The tests detailed here offer practical validation of this model.

20-50 and 5-20-Min MA Heat Detection Analysis for Lithium-Ion Fires

The configuration of moving averages played a significant role in determining the efficacy and timeliness of the response for lithium-ion fire detection within ULDs. The analysis here focuses on the 20-50 and 5-20-min MA configurations of the RFID-based heat detection system and their response to lithium-ion battery thermal events.

By design, the 20-50 min MA configuration is more attuned to capturing the gradual yet persistent temperature escalations typical of smoldering fires. This attribute was evident, where the 20-50-min MA consistently signaled thermal events earlier than the 5-20-min MA setup. Conversely, the design of the 5-20-min MA configuration responds rapidly to sudden temperature spikes. This sensitivity to abrupt temperature changes is essential for addressing the fast-paced nature of certain lithium-ion thermal events.

Figure 37:
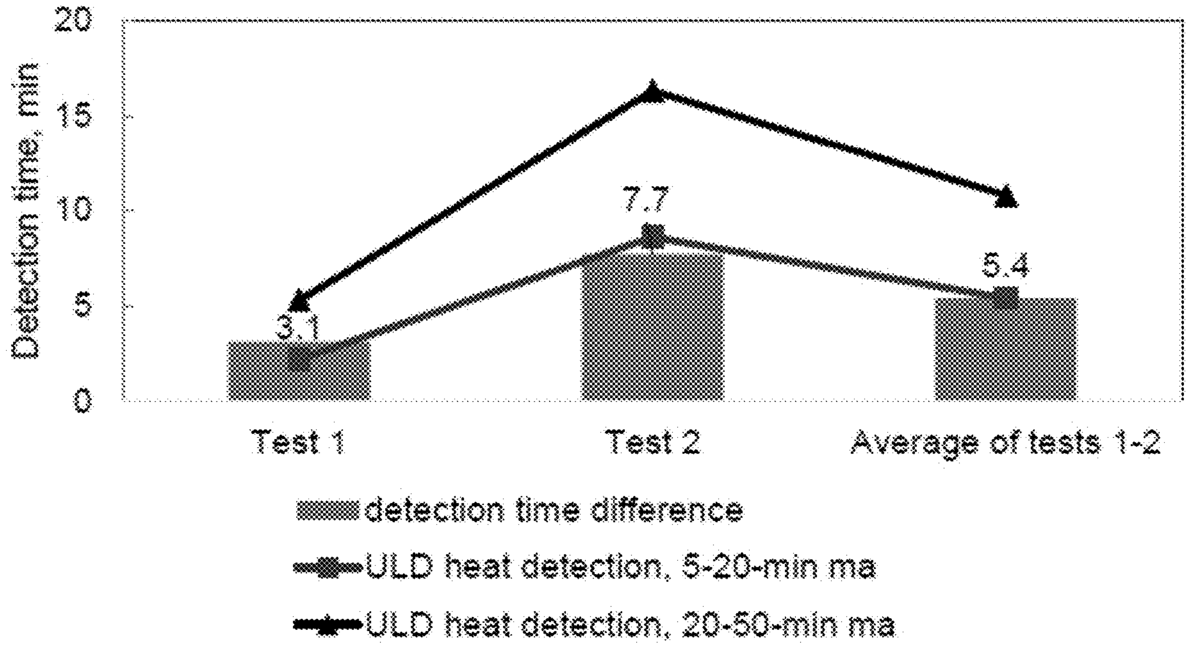

The test data reinforces these operational characteristics. As illustrated in FIG. 37, the 5-20-min MA configuration displayed more prompt detection times than the 20-50-min MA configuration. The 5-20-min MA configuration reported 2.2- and 8.6-minute detection times for Test 1 and Test 2, respectively. In comparison, the 20-50-min MA configuration reported detection times of 5.3 minutes for Test 1 and 16.3 minutes for Test 2. The average detection time across tests 1 and 2 for the 5-20-min MA setup was 5.4 minutes, whereas, for the 20-50-min MA setup, it was 10.8 minutes. The detection time difference average was 5.4 minutes between the two configurations.

The choice between the two configurations should be determined based on the specific fire risks associated with the cargo and the operational environment of the ULD. The data suggests that the 20-50-min MA is more adept at providing early warnings for gradually developing fires, while the 5-20-min MA is beneficial where more immediate detection is required. The analysis of detection times underlines the versatility of the RFID-based system in adapting to diverse fire scenarios.

Fire Detection Comparison for Lithium-Ion Fires

Figure 38:
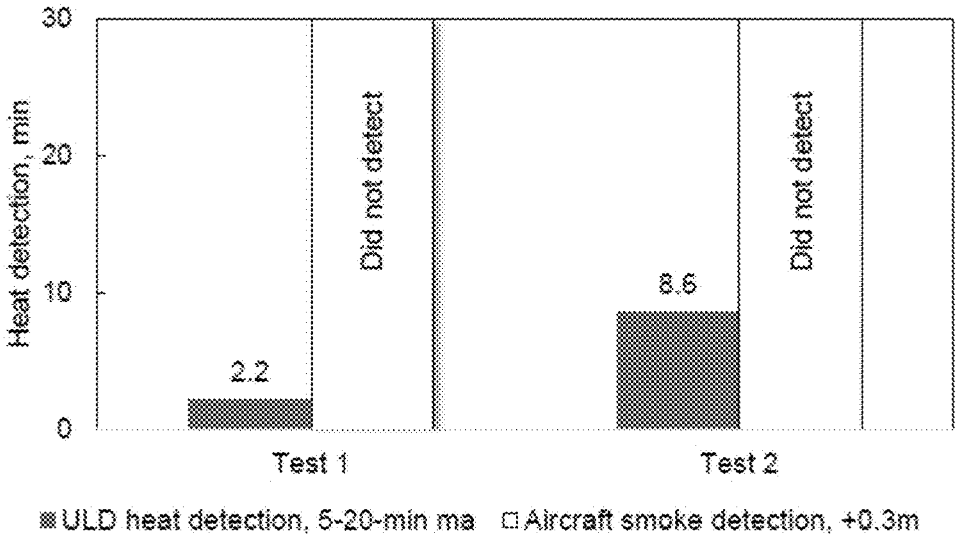

The detection times between the ULD heat detection system and the aircraft smoke detection system was compared. FIG. 38 indicates that the ULD heat detection system quickly identified the fires, with 2.2 and 8.6 minutes of detection time for Test 1 and Test 2, respectively. In contrast, the exterior aircraft smoke detection system did not detect the fire in either test. The absence of detection from the smoke detectors could lead to delayed fire suppression efforts and flight diversions, potentially resulting in more severe outcomes.

This performance disparity highlights the need for advanced fire detection systems that can offer faster and more reliable detection of fires in cargo compartments. Furthermore, it suggests that the ULD heat detection system is more effective at early lithium-ion battery fire detection than traditional smoke detectors.

CONCLUSION AND FUTURE DIRECTIONS

This research achieved the objective of developing a system that provides near real-time fire monitoring and early fire detection capabilities within aircraft cargo compartments, especially ULDs. This achievement involved directly installing UHF RFID temperature sensing tags in AAY type ULDs, which significantly differed from the traditional cargo compartment smoke detectors method. This strategic placement of RFID temperature sensing tags enhanced detection speed by identifying temperature changes at the source of a fire event. The system employs the MACD algorithm, tailored for fire detection. This innovative application of the MACD algorithm increased detection speed while maintaining accuracy. This heat detection system can detect small smoldering fires that are undetectable by traditional ceiling-mounted smoke detectors. Upon detecting a potential fire event, the system can promptly communicate vital data regarding the fire's status and location to the flight crew. This immediate transmission of information is instrumental in enabling flight crews to make crucial decisions, such as initiating fire suppression protocols or preparing for emergency measures.

The research successfully developed a false alarm resistant method for detecting fires in ULDs. By analyzing temperature fluctuations individually and within a communal framework, the heat detection algorithm can better detect anomalies by leveraging aggregated data to assess temperature trends. This achievement was validated through experimental testing. It involved using a multi-ULD configuration, which included a fire ULD equipped with UHF RFID temperature sensing tags for fire monitoring and a reference ULD with UHF RFID temperature sensing tags for baseline temperature data. This configuration effectively distinguished genuine fire events from normal temperature fluctuations or environmental factors, reducing false alarms.

SUMMARY OF KEY FINDINGS

Moving Average (MA) Intervals: The research emphasized the need to understand the interplay between activation thresholds, sensor responses, and detection times in various MACD configurations for fire detection in ULDs. An increased interval of the short-term moving average significantly decreases the activation threshold. Thus, less pronounced temperature changes are required for the alarms to activate. However, adjusting the long-term moving average intervals slightly raises the activation threshold. Increasing the short-term moving average intervals decreases the maximum sensor response. This contrasts with the effect of increasing the long-term moving averages, which increases the maximum sensor response. Furthermore, lengthening the interval for short-term moving averages significantly prolongs the detection time, introducing a notable delay in the system's ability to respond to thermal events. Meanwhile, augmenting the long-term moving average intervals causes a moderate extension in detection time. However, this increase is less impactful than the adjustments in the short-term moving averages. This analysis led to selecting two moving average configurations: the 5-20-min MA for quick detection of abrupt temperature increases and the 20-50-min MA interval for more accurate identification of slowly developing fires.

Heat Sensor Location: Placing the UHF RFID temperature sensing tags within ULDs improves sensor responsiveness and detection speed over externally placed temperature sensing tags. Temperature sensing tags were placed on mounts at varying heights from the ULD ceiling to minimize heat loss from conduction to the ULD surface. While the experiments suggested heights of 50.4 mm for maximum response and 50.9 mm for a minimum detection time, a 6.4 mm sensor mount was chosen for its balanced attributes, ensuring high responsiveness and sensitivity with minimal impact on cargo space.

Smoke Sensor Location: Identifying the most effective location for smoke sensors was essential to the study. The study found that smoke displayed horizontal propulsion as it exited the ULD, directing itself toward the end of the mock cargo compartment before altering its direction. Based on these observations, the optimal placement for light obscuration meters was determined to be +0.3 meters from the ULD door.

Fire Detection in Controlled Fire Scenarios: This testing aimed to understand the correlation between heat input and sensor responses for heat and smoke detection in various controlled fire scenarios. The smoke production is constant during these tests, but the heat input varies. A notable aspect was establishing a linear correlation between heat input and the system's sensor responses. This correlation was captured by a linear function with a high $R^2$ of 0.97. This model also provided a predictive capability for near real-time fire management decision-making. It enabled fire scale or intensity estimations based on heat input, allowing flight crews to make informed decisions about fire suppression and diversion strategies.

The smoke detection analysis established a sigmoid function that describes the connection between heat input and the observed smoke exiting the AAY type ULD. The study determined the minimum heat input required for smoke detection by conducting experiments and mathematical calculations. This information enables predictions about the heat for smoke escaping from the AAY type ULD.

Fire Detection in Smoldering Fire Scenarios: The study also addressed detecting smoldering fires, known for their slow heat release and minimal smoke production. These fires present unique detection challenges due to their gradual nature. The experimental setup included a smoke pipe filled with hardwood pellets to simulate smoldering materials. The RFID heat detection system consistently surpassed traditional cargo compartment smoke detection systems in detecting times. The enhanced fire detection was most evident in the 20-50-min MA interval, which showed better performance in early detection in most cases compared to the 5-20-min MA interval.

Fire Detection in Lithium-Ion Fire Scenarios: Another aspect of the study was evaluating the system's response to lithium-ion thermal runaway scenarios, characterized by their rapid escalation and high energy release. To simulate thermal runaway scenarios, the testing involved using two fully charged LCO pouch cells within a controlled environment. The 5-20-min MA configuration of the RFID heat detection system demonstrated higher responsiveness than the 20-50-min MA configuration. Notably, the traditional smoke detection system failed to detect any of these fires.

This advancement of RFID technology may further include the addition of gas sensing RFID tags. Gas detectors often demonstrate superior sensitivity compared to other fire detection methods due to their ability to detect the gases a fire produces at an early stage. Collectively, the combination of wireless heat and gas detectors can reduce the time for all fire scenarios.

The MACD algorithm, when combined with sensitive temperature sensors like RFID or thermocouples, has a wide range of applications beyond aviation fire detection. Its ability to detect subtle temperature trends early on is crucial when fast responses to heat anomalies are necessary for maintaining safety and efficiency. It is worth noting that using inexpensive, battery-free wireless sensors like RFID makes it easy to deploy them in areas where wiring is impractical.

The MACD algorithm can analyze sensor data in manufacturing settings to predict equipment malfunctions or fire risks. This approach would be informative in predictive maintenance. The MACD algorithm could be an essential safeguard, potentially detecting deviations from normal thermal patterns and signaling possible hazards. In the agricultural sector, especially for grain silo monitoring, the MACD algorithm can play a significant role in enhancing safety. By alerting operators to early signs of heat accumulation, it enables the implementation of mitigation measures to address conditions that could lead to a grain dust explosion. The system could also benefit chemical storage facilities, where it can detect exothermic reaction risks and trigger preventive measures. In the automotive industry, particularly for electric vehicle (EV) battery management, integrating the MACD algorithm could potentially monitor for signs of thermal runaway. This integration can enhance safety by enabling early cooling measures or isolating affected battery cells before thermal runaway starts.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. An improved method for fire detection in a first unit load device (ULD) from a plurality of ULDs in a cargo compartment, the method comprising the steps of:

measuring a plurality of instances of temperature of the first ULD over a first period of time through at least one first RFID sensor installed on or within the first ULD, the at least one first RFID sensor wirelessly in communication with a computing device in a fire detection system;

measuring a plurality of instances of temperature of one or more reference ULDs through at least one second RFID sensor installed on or within the one or more reference ULDs over the first period of time, the at least one second RFID sensor wirelessly in communication with the computing device in the fire detection system;

executing, by the computing device, a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generating, by the computing device, a control signal for a fire warning alarm based on the ROR temperature differential exceeding a fire detection activation threshold.

2. The method of claim 1, wherein the multiple time-series-based, trend-following algorithm comprises a Moving Average Convergence Divergence (MACD) algorithm.

3. The method of claim 2, comprising the steps of:

determining, by the computing device, a short-term moving average line of temperatures and a long-term moving average line of temperatures from the plurality of instances of temperature measured through the at least one first RFID over a second period of time; and calculating, by the computing device, a heat detection MACD line by subtracting the long-term moving average of temperatures line from the short-term moving average of temperatures line for the at least one first RFID sensor over the second period of time, wherein a rising heat detection MACD line indicates a possible escalation in temperature or a fire event, and a falling heat detection MACD line indicates a possible decrease in temperature or fire suppression.

4. The method of claim 3, further comprising the steps of:

determining, by the computing device, a short-term moving average of temperatures line and a long-term moving average of temperatures line from the plurality of instances of temperature measured through the at least one first RFID over a second period of time; and calculating, by the computing device, a heat detection signal line by subtracting the long-term moving average of temperatures line from the short-term moving average of temperatures line for the at least one second RFID sensor over the second period of time, wherein the ROR temperature differential comprises a histogram line for heat detection determined by calculating a difference between the heat detection MACD line and the heat detection signal line, wherein a growing ROR temperature differential on the histogram line for heat detection indicates a possible thermal hazard.

5. The method of claim 1, wherein the at least one first RFID sensor is installed on a surface of the first ULD and wherein the at least one second RFID sensor is installed on a surface of at least one other of the plurality of ULDs.

6. The method of claim 1, wherein the at least one first RFID sensor is installed on a mount connected to an internal surface of the ULD and wherein the at least one second RFID sensor is installed on an external surface of at least one other of the plurality of ULDs.

7. The method of claim 6, wherein a bottom surface of the mount and the internal surface of shipping container are arranged to define a measurement area, and wherein the height of the measurement area is 6.4 mm.

8. The method of claim 6, wherein the interior surface and exterior surfaces of the ULDs comprise a top surface and wherein the at least one first RFID sensor and at least one second RFID sensor are positioned in the center of the top surface.

9. The method of claim 1, wherein the fire detection system further comprises an RFID reader communicatively coupled to the computing device, and a plurality of RFID reader antennas communicatively coupled to the RFID reader, the RFID reader and antennas located outside of ULDs, the method comprising:

transmitting read signals via the plurality of RFID antennas;

in response to the read signals, causing the at least one first RFID sensor and the at least one second RFID sensors to communicate messages to the computing device, the messages comprising the plurality of instances of temperature of the first ULD and of the one or more reference ULD.

10. The method of claim 9, wherein the messages further comprises a unique RFID sensor identification, and a received signal strength indicator (RSSI), the method further comprising mapping a location of the at least one first RFID sensor and of the at least one second RFID sensors in the cargo compartment based on RSSI, and associating based on location the first ULD and the one or more reference ULDs.

11. The method of claim 1, wherein the one or more reference ULDs comprises a plurality of reference ULDs, each of the reference ULDs are adjacent to the first ULD, and wherein the method comprises determining the ROR temperature differential between the plurality of instances of temperature from the at least one first RFID sensor and the plurality of instances of temperature from a set of second RFID sensors, comprising at least a third RFID sensor associated with a first reference ULD and at least a further RFID sensors associated with a second reference ULD.

12. A system for detecting fire in a first unit load device (ULD) from a plurality of ULDs in a cargo compartment, the system comprising:

a computing device having memory that store executable instructions, and a processor adapted to access the memory, the processor further adapted to execute the executable instructions stored in the memory, the computing device therewith configured to:

measure a plurality of instances of temperature of the first ULD over a first period of time through at least one first RFID sensor installed on or within the first ULD, the at least one first RFID sensor wirelessly in communication with the computing device;

measure a plurality of instances of temperature of one or more reference ULD through at least one second RFID sensor installed on or within the one or more reference ULDs over the first period of time, the at least one second RFID sensor wirelessly in communication with the computing device;

execute a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generate a control signal for a fire warning alarm based on the ROR temperature differential exceeding a fire detection activation threshold.

13. The system of claim 12, wherein the multiple time-series-based, trend-following algorithm comprises a Moving Average Convergence Divergence (MACD) algorithm, the computing device further configured to:

determine a short-term moving average line of temperatures and a long-term moving average line of temperatures from the plurality of instances of temperature measured through the at least one first RFID over a second period of time;

calculate a heat detection MACD line by subtracting the long-term moving average of temperatures line from the short-term moving average of temperatures line for the at least one first RFID sensor over the second period of time, determine a short-term moving average of temperatures line and a long-term moving average of temperatures line from the plurality of instances of temperature measured through the at least one first RFID over a second period of time; and calculate a heat detection signal line by subtracting the long-term moving average of temperatures line from the short-term moving average of temperatures line for the at least one second RFID sensor over the second period of time, wherein the ROR temperature differential comprises a histogram line for heat detection determined by calculating a difference between the heat detection MACD line and the heat detection signal line, wherein a growing ROR temperature differential on the histogram line for heat detection indicates a possible thermal hazard.

14. The system of claim 13, further comprising an RFID reader communicatively coupled to the computing device, and a plurality of RFID reader antennas communicatively coupled to the RFID reader, the RFID reader and antennas located outside of ULDs, the computing device further configured to:

transmit read signals via the plurality of RFID antennas; and in response to the read signals, cause the at least one first RFID sensor and the at least one second RFID sensors to communicate messages to the computing device, the messages comprising the plurality of instances of temperature of the first ULD and of the one or more reference ULD.

15. The system of claim 14, wherein the messages further comprise a unique RFID sensor identification, and a received signal strength indicator (RSSI), the computing device further operable to map a location of the at least one first RFID sensor and of the at least one second RFID sensors in the cargo compartment based on RSSI, and associate based on location the first ULD and the one or more reference ULDs.

16. The system of claim 12, wherein the one or more reference ULDs comprises a plurality of reference ULDs, each of the reference ULDs are adjacent to the first ULD, and wherein the computing device is further operable to determine the ROR temperature differential between the plurality of instances of temperature from the at least one first RFID sensor and the plurality of instances of temperature from a set of second RFID sensors, comprising at least a third RFID sensor associated with a first reference ULD and at least a further RFID sensors associated with a second reference ULD.

17. A non-transitory computer-readable medium storing a set of instructions, the set of instructions comprising: one or more instructions that, when executed by one or more processors of a system, cause the system to:

measure a plurality of instances of temperature of the first ULD over a first period of time through at least one first RFID sensor installed on or within the first ULD, the at least one first RFID sensor wirelessly in communication with the one or more processors of the system;

measure a plurality of instances of temperature of one or more reference ULDs through at least one second RFID sensor installed on or within the one or more reference ULDs over the first period of time, the at least one second RFID sensor wirelessly in communication with the one or more processors of the system;

execute a multiple time-series-based, trend-following algorithm and determining therefrom a rate of rise (ROR) temperature differential between the plurality of instances of temperature from the at least one first RFID sensor and the plurality of instances of temperature from the at least one second RFID over the first period of time; and generate a control signal for a fire warning alarm based on the ROR temperature differential exceeding a fire detection activation threshold.

18. The non-transitory computer-readable medium of claim 17, wherein the multiple time-series-based, trend-following algorithm comprises a Moving Average Convergence Divergence (MACD) algorithm, the executable instructions further cause the system to:

determine a short-term moving average line of temperatures and a long-term moving average line of temperatures from the plurality of instances of temperature measured through the at least one first RFID over a second period of time;

calculate a heat detection MACD line by subtracting the long-term moving average of temperatures line from the short-term moving average of temperatures line for the at least one first RFID sensor over the second period of time;

determine a short-term moving average of temperatures line and a long-term moving average of temperatures line from the plurality of instances of temperature measured through the at least one first RFID over a second period of time; and calculate a heat detection signal line by subtracting the long-term moving average of temperatures line from the short-term moving average of temperatures line for the at least one second RFID sensor over the second period of time, wherein the ROR temperature differential comprises a histogram line for heat detection determined by calculating a difference between the heat detection MACD line and the heat detection signal line, wherein a growing ROR temperature differential on the histogram line for heat detection indicates a possible thermal hazard.

19. The non-transitory computer-readable medium of claim 18, the system further comprising an RFID reader communicatively coupled to the one or more processors of the system, and a plurality of RFID reader antennas communicatively coupled to the RFID reader, the RFID reader and antennas located outside of ULDs, the executable instructions further cause the system to:

transmit read signals via the plurality of RFID antennas; and in response to the read signals, cause the at least one first RFID sensor and the at least one second RFID sensors to communicate messages to the computing device, the messages comprising the plurality of instances of temperature of the first ULD and of the one or more reference ULD.

20. The non-transitory computer-readable medium of claim 19, wherein the messages further comprise a unique RFID sensor identification, and a received signal strength indicator (RSSI), the computing device further operable to map a location of the at least one first RFID sensor and of the at least one second RFID sensors in the cargo compartment based on RSSI, and associate based on location the first ULD and the one or more reference ULDs.

* * * * *